United States Patent
Gourisetti et al.

(10) Patent No.: US 11,409,887 B2
(45) Date of Patent: Aug. 9, 2022

(54) CYBERSECURITY VULNERABILITY MITIGATION FRAMEWORK

(71) Applicant: Battelle Memorial Institute, Richland, WA (US)

(72) Inventors: Sri Nikhil Gupta Gourisetti, Richland, WA (US); Michael E. Mylrea, Alexandria, VA (US); Hirak Patangia, Little Rock, AR (US)

(73) Assignees: Battelle Memorial Institute, Richland, WA (US); Board of Trustees of the University of Arkansas, Little Rock, AR (US)

( * ) Notice: Subject to any disclaimer, the term of this patent is extended or adjusted under 35 U.S.C. 154(b) by 238 days.

(21) Appl. No.: 16/869,378

(22) Filed: May 7, 2020

(65) Prior Publication Data

US 2020/0356678 A1 Nov. 12, 2020

Related U.S. Application Data

(60) Provisional application No. 62/957,010, filed on Jan. 3, 2020, provisional application No. 62/848,442, filed
(Continued)

(51) Int. Cl.
*G06F 21/57* (2013.01)
*H04L 9/40* (2022.01)

(52) U.S. Cl.
CPC ...... *G06F 21/577* (2013.01); *G06F 2221/034* (2013.01); *H04L 63/1433* (2013.01)

(58) Field of Classification Search
None
See application file for complete search history.

(56) References Cited

U.S. PATENT DOCUMENTS 8,256,004 B1 * 8/2012 Hill ............... G06Q 10/00
 726/28
8,516,594 B2 * 8/2013 Bennett ........... G06F 21/577
 713/188
(Continued)

OTHER PUBLICATIONS

ABI Research, "Global Cybersecurity Index: Conceptual Framework," *ITU*, United Kingdom, pp. 1-13, 2014.
(Continued)

*Primary Examiner* — Fatoumata Traore
(74) *Attorney, Agent, or Firm* — Klarquist Sparkman, LLP

(57) ABSTRACT

Systems, methods, and computer media for mitigating cybersecurity vulnerabilities of systems are provided herein. A current cybersecurity maturity of a system can be determined based on maturity criteria. The maturity criteria can be ranked based on importance. Solution candidates for increasing the cybersecurity maturity of the system can be determined based on the ranking. The solution candidates specify cybersecurity levels for the maturity criteria. A present state value reflecting the current cybersecurity maturity of the system can be calculated. For the solution candidates, an implementation state value and a transition state value can be determined. The implementation state value represents implementation of the maturity levels of the solution candidate, and the transition state value represents a transition from the present state value to the implementation state value. Based on the transition state values, a solution candidate can be selected for the system, and the system can be modified accordingly.

16 Claims, 24 Drawing Sheets

Related U.S. Application Data on May 15, 2019, provisional application No. 62/845,122, filed on May 8, 2019.

(56) References Cited

U.S. PATENT DOCUMENTS

| | | | | |
|---|---|---|---|---|
| 9,294,495 | B1* | 3/2016 | Francoeur | H04L 63/1433 |
| 9,426,169 | B2* | 8/2016 | Zandani | G06F 21/57 |
| 2004/0010709 | A1* | 1/2004 | Baudoin | G06Q 40/08 |
| | | | | 726/1 |
| 2014/0143879 | A1* | 5/2014 | Milman | G06F 21/577 |
| | | | | 726/25 |

OTHER PUBLICATIONS

Abrams, "Malicious Control System Cyber Security Attack Case Study—Maroochy Water Services, Australia," in *Annual Computer Security Applications Conference*, pp. 1-16, 2008.

Actiontec, "Smart Home Devices Expected to Experience Double-Digit Growth Through 2022," pp. 1-4, Oct. 2018. [Online]. Available: https://www.actiontec.com/wifi-market-research/smart-home-devices-expected-to-experience-double-digit-growth-through-2022/.

Ahn, "Compatible weighting method with rank order centroid: Maximum entropy ordered weighted averaging approach," *Elsevier European Journal of Operational Research*, vol. 212, No. 3, pp. 552-559, 2011.

Atoum et al., "A holistic cyber security implementation framework," *Information Management & Computer Security Journal*, vol. 22, No. 3, pp. 251-264, 2014.

Atzori et al., "The Internet of Things: A Survey," *Elsevier Journal of Computer Networks*, vol. 54, No. 15, pp. 2787-2805, 2010.

Barfod et al., Multi-criteria decision analysis for use in transport decision making, *Denmark: DTU Lyngby: Technical University of Denmark*, 76 pages, 2014.

Barron et al., "The efficacy of SMARTER—Simple Multi-Attribute Rating Technique Extended to Ranking," *Elsevier Acta Psychologica*, vol. 93, pp. 23-36, 1996.

Blask, "ICS Cybersecurity: Water, Water Everywhere," pp. 1-7, Nov. 2011. [Online]. Available: http://www.infosecisland.com/blogview/18281-ICS-Cybersecurity-Water-Water-Everywhere.html. [Accessed 2017].

Brown et al., "How Probabilistic Risk Assessment Can Mislead Terrorism Risk Analysts," *Risk Analysis*, vol. 31, No. 2, pp. 196-204, 2011.

Buecker et al., "Introducing the IBM Security Framework and IBM Security Blueprint to Realize Business-Driven Security," ibm.com/redbooks, 96 pages, Dec. 2010.

Buecker et al., "Using the IBM Security Framework and IBM Security Blueprint to Realize Business-Driven Security," ibm.com/redbooks, 96 pages, 240 pages, Apr. 2013.

CERT SEI, "CERT® Resilience Management Model, Version 1.2," *CERT Program*, 860 pages, Feb. 2016.

Chi et al., "Ranking generalized fuzzy numbers based on centroid and rank index," *Elsevier Journal on Applied Soft Computing*, vol. 68, pp. 283-292, 2018.

Cox Jr, "Improving Risk-Based Decision Making for Terrorism Applications," *Risk Analysis*, vol. 29, No. 3, pp. 336-341, 2009.

Cox Jr, "Some limitations of 'Risk = Threat × Vulnerability × Consequence,' for Risk Analysis of Terrorist Attacks," *Risk Analysis*, vol. 28, No. 6, pp. 1749-1761, 2008.

CSIS, "Cyber security gap analysis," www.csis.dk, 5 pages.

Cylance Consulting, "NIST Cybersecurity Framework Gap Analysis: Identify Security Weaknesses in your Critical Infrastructure," *Cylance*, Irvine, CA, 2017.

Department of Homeland Security, "Cybersecurity Capability Maturity Model White Paper," *U.S. DHS*, 35 pages, Aug. 2014.

Edwards, "How to Use Multiattribute Utility Measurement for Social Decisionmaking," *IEEE Transactions on Systems, MAN, and Cybernetics*, vol. 7, No. 5, pp. 326-340, May 1977.

Ezell et al., "Probabilistic Risk Analysis and Terrorism Risk," *Risk Analysis*, vol. 30, No. 4, pp. 575-589, 2010.

Feakin et al., "Cyber Maturity in the Asia-Pacific Region," *Australian Strategic Policy Institute*, Barton, Australia, 2014.

Ferraiolo, "Tutorial: The Systems Security Engineering Capability Maturity Model," *Area Systems, Inc.*, 61 pages, Oct. 1998, downloaded from: https://csrc.nist.gov/csrc/media/publications/conference-paper/1998/10/08/proceedings-of-the-21st-nissc-1998/documents/tutorb5.pdf.

Filho et al., "Preference modeling experiments with surrogate weighting procedures for the PROMETHEE method," *European Journal of Operational Research*, vol. 264, No. 2, pp. 453-461, 2018.

Flitter et al., "Suitability analysis," *Geographic Information Technology Training Alliance (GITTA)*, pp. 1-25, Nov. 2013. [Online]. Available: http://www.gitta.info/Suitability/en/html/Normalisatio_learningObject1.html.

Florig et al., "A Deliberative Method for Ranking Risks (I): Overview and Test Bed Development," *Risk Analysis*, vol. 21, No. 5, pp. 913-921, 2001.

Gadyatskaya et al., "Attack Trees for Practical Security Assessment: Ranking of Attack Scenarios with ADTool 2.0," in *International Conference on Quantitative Evaluation of Systems*, Glasgow, UK, pp. 1-5, Aug. 2016.

Ganin et al., "Multicriteria Decision Framework for Cybersecurity Risk Assessment and Management," *Wiley Journal on Risk Analysis*, pp. 1-18, Sep. 2017.

Ghani et al., "Quantitative Assessment of Software Vulnerabilities Based on Economic-Driven Security Metrics," in *International Conference on Risks and Security of Internet and Systems*, 8 pages, 2013.

Glantz et al., "Evaluating the Maturity of Cybersecurity Programs for Building Control Systems," Technical Report, *Pacific Northwest National Laboratory*, pp. 1-12, 2016.

Gourisetti et al., "Application of Rank-Weight Methods to Blockchain Cybersecurity Vulnerability Assessment Framework," in *IEEE The 9th Annual Computing and Communication Workshop and Conference*, Las Vegas, NV, pp. 206-213, 2019.

Gourisetti et al., "Cybersecurity Vulnerability Mitigation Framework Through Empirical Paradigm (CyFEr): Prioritized Gap Analysis," *IEEE Systems Journal*, pp. 1-12, 2019 (under review).

Gourisetti et al., "Multi-Scenario Use Case based Demonstration of Buildings Cybersecurity Framework Webtool," in *IEEE Symposium on Computational Intelligence Applications in Smart Grid*, USA, 8 pages, 2017.

Gubbi et al., "Internet of Things (IoT): A vision, architectural elements, and future directions," *Elsevier Journal of Future Generation Computer Systems*, vol. 29, No. 7, pp. 1645-1660, 2013.

Hamilton, Booz Allen "Cyber Power Index: Findings and Methodology," *The Economist: Economist Intelligence Unit*, 36 pages, 2011.

Hathaway et al., "Cyber Readiness Index 2.0, A Plan for Cyber Readiness: A Baseline and an Index" *Potomac Institute for Policy Studies*, Arlington, VA, 48 pages, Nov. 2015.

Hong et al., "What Vulnerability Do We Need to Patch First?," in *44th Annual IEEE/IFIP International Conference on Dependable Systems and Networks*, pp. 684-689, 2014.

ISM3 Consortium, "Information_Security_Management_Maturity_Model," *ISM³ Handbook*, 24 pages, 2009.

ISO, "ISO/IEC 15408-1:2009: Information technology—Security techniques—Evaluation criteria for IT security—Part 1: Introduction and general model," International Organization for Standardization, 74 pages, Dec. 2009. [Online]. Available: https://www.iso.org/standard/50341.html.

ISO, "ISO/IEC 21827:2008: Information technology—Security techniques—Systems Security Engineering—Capability Maturity Model® (SSE-CMM®)," International Organization for Standardization, 154 pages, Oct. 2008. [Online]. Available: https://www.iso.org/standard/44716.html.

(56) References Cited

OTHER PUBLICATIONS

ISO, "ISO/IEC 27000 Information technology—Security techniques—Information security management systems—Overview and vocabulary," International Organization for Standardization, 34 pages, Feb. 2018. [Online]. Available: https://www.iso.org/isoiec-27001-information-security.html.

Janssen et al., "Analyzing Enterprise Architecture in National Governments: The Cases of Denmark and the Netherlands," in *40th Annual Hawaii International Conference on System Sciences*, Waikoloa, HI, pp. 1-10, 2007.

Jo et al., "Advanced information security management evaluation system," *KSII Transactions on Internet and Information Systems*, vol. 5, No. 6, pp. 1192-1213, Jun. 2011.

Karabacak et al., "A Vulnerability-driven cyber security maturity model for measuring national critical infrastructure protection preparedness," *International Journal of Critical Infrastructure Protection*, vol. 15, pp. 47-59, Oct. 2016.

Keramati, "New Vulnerability Scoring System for Dynamic Security Evaluation," in *8th International Symposium on Telecommunications*, pp. 746-751, 2016.

Ku et al., "National information security policy and its implementation: A case study in Taiwan," *Elsevier Telecommunications Policy Journal*, vol. 33, No. 7, pp. 371-384, 2009.

Le et al., "Can maturity models support cyber security?," in *IEEE 35th International Performance Computing and Communications Conference*, Las Vegas, NV, 7 pages, 2016.

Lichtenstein et al., "Judged Frequency of Lethal Events," *Journal of Experimental Psychology: Human Learning and Memory*, vol. 4, No. 6, pp. 551-578, Nov. 1978.

Lundberg et al., "Deliberative Risk Ranking to Inform Homeland Security Strategic Planning," *Journal of Homeland Security and Emergency Management*, vol. 13, No. 1, pp. 3-33, 2016.

Mell et al., "A Complete Guide to the Common Vulnerability Scoring System Version 2.0," *NIST; Forum of Incident Response and Security Teams*, pp. 1-24, Jul. 2007.

Mesker, "Adapting NIST Cybersecurity Framework for Risk Assessment," *Chevron*, pp. 1-14, Oct. 2014.

Miron et al., "Cybersecurity Capability Maturity Models for Providers of Critical Infrastructure," *Technology Innovation Management Review*, pp. 33-39, Oct. 2014.

Morgan et al., "Categorizing Risks for Risk Ranking," *Risk Analysis*, vol. 20, No. 1, pp. 49-58, 2000.

Morgan et al., "A Deliberative Method for Ranking Risks (II): Evaluation of Validity and Agreement among Risk Managers," *Risk Analysis*, vol. 21, No. 5, pp. 923-937, 2001.

Mylrea et al., "Cybersecurity and Optimization in Smart "Autonomous" Buildings," in *Autonomy and Artificial Intelligence: A Threat or Savior?*, Springer, pp. 263-294, 2017.

Mylrea et al., "An Introduction to Buildings Cybersecurity Framework (BCF)," in *IEEE Symposium on Computational Intelligence Applications in Smart Grid*, USA, 7 pages, 2017.

Mylrea et al., "Insider Threat Cybersecurity Framework Webtool & Methodology: Defending Against Complex Cyber-Physical Threats," in *WRIT*, USA, pp. 207-216, 2018.

Nerc, "SRI Enhancement NERC Performance Analysis Subcommittee," *NERC*, pp. 1-20, Apr. 2014.

NIST, "Framework for Improving Critical Infrastructure Cybersecurity Version 1.1," *NIST*, 55 pages, Apr. 2018.

NIST, "NIST Special Publication 800-53, Security and Privacy Controls for Information Systems and Organizations," Revision 4, *NIST*, 462 pages, Apr. 2013.

NIST, "Program Review for Information Security Assistance," *NIST*, pp. 1-6, 2017. [Online]. Available: https://csrc.nist.gov/Projects/Program-Review-for-Information-Security-Assistance/Security-Maturity-Levels.

NIST, "Risk Management Framework for Information Systems and Organizations," *NIST Special Publication 800-37*, Revision 2, 183 pages, Dec. 2018. [Online]. Available: https://nvlpubs.nist.gov/nistpubs/SpecialPublications/NIST.SP.800-37r2.pdf.

Nnolim, "A Framework and Methodology for Information Security Management," *Lawrence Technological University*, Southfield, MI, 24 pages, Oct. 2007.

Oracle, "Information Security: A Conceptual Architecture Approach [White Paper]," *Oracle*, 28 pages, Apr. 2011.

Otoom et al., "An Implementation Framework (IF) for the National Information Assurance and Cyber Security Strategy (NIACSS) of Jordan," *The International Arab Journal of Information Technology*, vol. 10, No. 4, Jul. 2013.

PCI Security Standards Council, "PCI Quick Reference Guide: Understanding the Payment Card Industry Data Security Standard Version 1.2," 32 pages, 2008.

PCI Security Standards Council, "PCI DSS Quick Reference Guide: Understanding the Payment Card Industry Data Security Standard Version 2.0," 2010.

Ramadlan, "Introduction and implementation OWSAP Risk Rating Management," *OWASP*, 28 pages, 2017.

Roberts, et al., "Weight Approximations in Multi-attribute Decision Models," *Journal of Multi-Criteria Decision Analysis*, vol. 11, pp. 291-303, 2002.

Rossebo et al., "An Enhanced Risk-Assessment Methodology for Smart Grids," *IEEE Computer Society*, pp. 62-71, Apr. 2017.

Rossebo et al., "Including Threat Actor Capability and Motivation in Risk Assessment for Smart Grids," 7 pages, 2016.

Roszkowska, "Rank Ordering Criteria Weighting Methods—A Comparative Overview," *Optimum. Studia Ekonomiczne*, vol. 5, No. 65, pp. 14-33, 2013.

Scarfone et al., "An Analysis of CVSS Version 2 Vulnerability Scoring," in *Third International Symposium on Emperical Software Engineering and Measurement*, pp. 516-525, 2009.

Simplilearn, "What is COBIT? : COBIT Framework and Its Components," downloaded on Apr. 16, 2020 from: https://www.simplilearn.com/what-is-cobit-significance-and-framework-rar309-article, pp. 1-8 (document dated Mar. 22, 2020).

Slovic, "Perception of Risk," *Science*, vol. 236, No. 4799, pp. 280-285, Apr. 1987.

Slovic et al., "Risk as Analysis and Risk as Feelings: Some thoughts about Affect, Reason, Risk, and Rationality," *Risk Analysis*, vol. 24, No. 2, pp. 311-322, 2004.

Stoll et al., "Set Theory," *Encyclopedia Britannica*, pp. 1-17, Feb. 2019. [Online]. Available: https://www.britannica.com/science/set-theory. [Accessed Apr. 16, 2020].

Ten et al., "Cybersecurity for Critical infrastructures: Attack and Defense Modeling," *IEEE Transactions on Systems, MAN, and Cybernetics: Part A: Systems and Humans*, vol. 40, No. 4, pp. 853-865, Jul. 2010.

Ten et al., "Vulnerability Assessment of Cybersecurity for SCADA Systems Using Attack Trees," in *IEEE Power Engineering Society General Meeting*, USA, pp. 1-8, 2007.

Ten et al., "Vulnerability Assessment of Cybersecurity for SCADA Systems," *IEEE Transactions on Power Systems*, vol. 23, No. 4, pp. 1836-1846, Nov. 2008.

U.S. DHS CISA, "https://ics-cert.us-cert.gov/Assessments," *Cybersecurity and Infrastructure Security Agency—Cyber Security Evaluation Tool*, 2 pages, [Online]. Available: https://ics-cert.us-cert.gov/Assessments.

U.S. DOE and EPRI, "Integrating Electricity Subsector Failure Scenarios into a Risk Assessment Methodology," *U.S. DOE, EPRI*, 54 pages, Dec. 2013.

U.S. HHS, "Health Information Privacy: The Security Rule," 2017. [Online]. Available online: https://www.hhs.gov/hipaa/for-professionals/security/index.html.

Von Solms et al., "Information security governance control through comprehensive policy architectures," in *Information Security for South Africa*, Johannesburg, South Africa, 6 pages, 2011.

Wang et al., "Ranking Attacks Based on Vulnerability Analysis," in *43rd Hawaii International Conference on System Sciences*, Hawaii, pp. 1-10, 2010.

Weber, "Internet of Things—New Security and privacy challenges," *Elsevier Journal on Computer Law and Security Review*, vol. 26, No. 1, pp. 23-30, 2010.

(56) References Cited

OTHER PUBLICATIONS

White, "The community cyber security maturity model," in *IEEE International Conference on Technologies for Homeland Security*, pp. 173-178, 2011.
Willis et al., "Prioritizing Environmental Health Risks in the UAE," *Risk Analysis*, vol. 30, No. 12, pp. 1842-1856, 2010.
Xiao, "Discrete Structures Recitation," 7 pages, [Online]. Available: http://people.cs.pitt.edu/~xiangxiao/cs0441/Recitation-7.pdf. [Accessed 2017].
Xiao-Yan et al., "An Information Security Maturity Evaluation Mode," *Elsevier Procedia Engineering*, vol. 24, pp. 335-339, 2011.
Zuccato, "Holistic security management framework applied in electronic commerce," *Elsevier Computers and Security Journal*, vol. 26, No. 3, pp. 256-265, 2007.

\* cited by examiner

$$\left( \left( \begin{pmatrix} 2 & 1 & 0 \\ 0 & 1 & 1 \\ 0 & 0 & 1 \end{pmatrix} \begin{pmatrix} 2 & 1 & 0 \\ 0 & 2 & 0 \end{pmatrix} \begin{pmatrix} 1 & 0 & 0 \\ 0 & 2 & 0 \\ 0 & 0 & 1 \end{pmatrix} \begin{pmatrix} 0 & 1 & 0 \\ 0 & 2 & 0 \\ 1 & 0 & 0 \\ 0 & 1 & 0 \\ 0 & 1 & 0 \\ 0 & 1 & 0 \end{pmatrix} \begin{pmatrix} 1 & 0 & 0 \\ 0 & 1 & 0 \\ 0 & 0 & 1 \end{pmatrix} \right) \begin{pmatrix} \begin{pmatrix} 2 & 0 & 0 \\ 1 & 2 & 0 \\ 0 & 0 & 1 \end{pmatrix} \\ \begin{pmatrix} 1 & 0 & 0 \\ 1 & 0 & 0 \\ 0 & 1 & 1 \\ 0 & 0 & 1 \end{pmatrix} \\ \left( (0\ 0\ 1) \begin{pmatrix} 1 & 1 & 0 \\ 2 & 2 & 0 \\ 0 & 1 & 0 \end{pmatrix} \right) \\ \begin{pmatrix} 1 & 0 & 0 \\ 0 & 2 & 0 \\ 1 & 2 & 2 \\ 0 & 2 & 0 \\ 0 & 1 & 0 \\ 0 & 1 & 0 \end{pmatrix} \\ \begin{pmatrix} 0 & 0 & 1 \\ 0 & 0 & 1 \end{pmatrix} \end{pmatrix} \left( \begin{pmatrix} 0 & 0 & 1 \\ 0 & 0 & 1 \\ 0 & 0 & 1 \end{pmatrix} \begin{pmatrix} 0 & 1 & 0 \\ 0 & 1 & 0 \end{pmatrix} \right) \left( (0\ 0\ 1) \begin{pmatrix} 2 & 0 & 0 \\ 1 & 1 & 0 \\ 0 & 2 & 1 \end{pmatrix} \right) \begin{pmatrix} 0 & 1 & 0 \\ 1 & 0 & 0 \\ 2 & 0 & 0 \\ 0 & 0 & 1 \end{pmatrix} \begin{pmatrix} \begin{pmatrix} 1 & 0 & 0 \\ 0 & 1 & 0 \\ 0 & 2 & 0 \\ 0 & 1 & 0 \\ 0 & 0 & 1 \end{pmatrix} \\ \begin{pmatrix} 0 & 1 & 0 \\ 0 & 1 & 0 \\ 0 & 1 & 0 \\ 0 & 0 & 1 \end{pmatrix} \\ \begin{pmatrix} 1 & 0 & 0 \\ 0 & 1 & 0 \\ 0 & 1 & 0 \\ 0 & 0 & 1 \end{pmatrix} \\ \begin{pmatrix} 0 & 1 & 0 \\ 0 & 0 & 1 \end{pmatrix} \end{pmatrix} \begin{pmatrix} \begin{pmatrix} 1 & 0 & 0 \\ 0 & 1 & 0 \\ 0 & 0 & 1 \end{pmatrix} \\ \begin{pmatrix} 1 & 0 & 0 \\ 0 & 1 & 0 \\ 0 & 1 & 0 \end{pmatrix} \end{pmatrix} \right)$$

1400

CYBERSECURITY VULNERABILITY MITIGATION FRAMEWORK

CROSS REFERENCE TO RELATED APPLICATIONS

This application claims the benefit of and priority to: U.S. Provisional Patent Application No. 62/957,010, filed on Jan. 3, 2020, and titled "CYBERSECURITY VULNERABILITY MITIGATION FRAMEWORK THROUGH EMPIRICAL PARADIGM (CyFEr);" U.S. Provisional Patent Application No. 62/848,442, filed on May 15, 2019, and titled "CYBERSECURITY VULNERABILITY MITIGATION FRAMEWORK THROUGH EMPIRICAL PARADIGM (CyFEr);" and U.S. Provisional Patent Application No. 62/845,122, filed on May 8, 2019, and titled "SECURE DESIGN AND DEVELOPMENT: INTERTWINED MANAGEMENT AND TECHNOLOGICAL SECURITY ASSESSMENT FRAMEWORK;" all of which are incorporated herein by reference in their entirety.

ACKNOWLEDGMENT OF GOVERNMENT SUPPORT

This invention was made with Government support under Contract No. DE-AC05-76RL01830 awarded by the U.S. Department of Energy. The Government has certain rights in the invention.

BACKGROUND

Cybersecurity vulnerability assessment tools, frameworks, methodologies, and processes are used to understand the cybersecurity maturity and posture of a system or a facility. Such tools are typically developed based on standards defined by organizations such as the National Institute of Standards and Technology (NIST) and the U.S. Department of Energy. Although these tools provide an understanding of the current cybersecurity maturity of a system, the tools do not typically provide guidance for addressing cybersecurity vulnerabilities.

SUMMARY

Examples described herein relate to cybersecurity vulnerability mitigation frameworks. Cybersecurity vulnerability mitigation involves identifying vulnerabilities, identifying and prioritizing potential strategies to address those vulnerabilities, and modifying aspects of a system to reach a cybersecurity maturity goal.

In some examples, a current cybersecurity maturity of a system is determined based on cybersecurity maturity criteria. The cybersecurity maturity criteria can be ranked based on importance of the criteria. Solution candidates for increasing the cybersecurity maturity of the system to a cybersecurity goal can be determined based on the ranked cybersecurity maturity criteria. The solution candidates can specify maturity levels for the cybersecurity maturity criteria. A present state value reflecting the current cybersecurity maturity of the system can be calculated. The present state value can be based on current maturity levels for the cybersecurity maturity criteria. For the solution candidates, an implementation state value and a transition state value can be determined. The implementation state value can represent implementation of the maturity levels specified by the solution candidate, and the transition state value can represent a transition from the present state value to the implementation state value. Based on the transition state values, a solution candidate can be selected for use with the system. The system can be modified based on the maturity levels for the cybersecurity maturity criteria of the selected solution candidate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

BRIEF DESCRIPTION OF THE DRAWINGS

FIG. 14 is an example solution structure.

DETAILED DESCRIPTION

I. Overview

Figure 1:
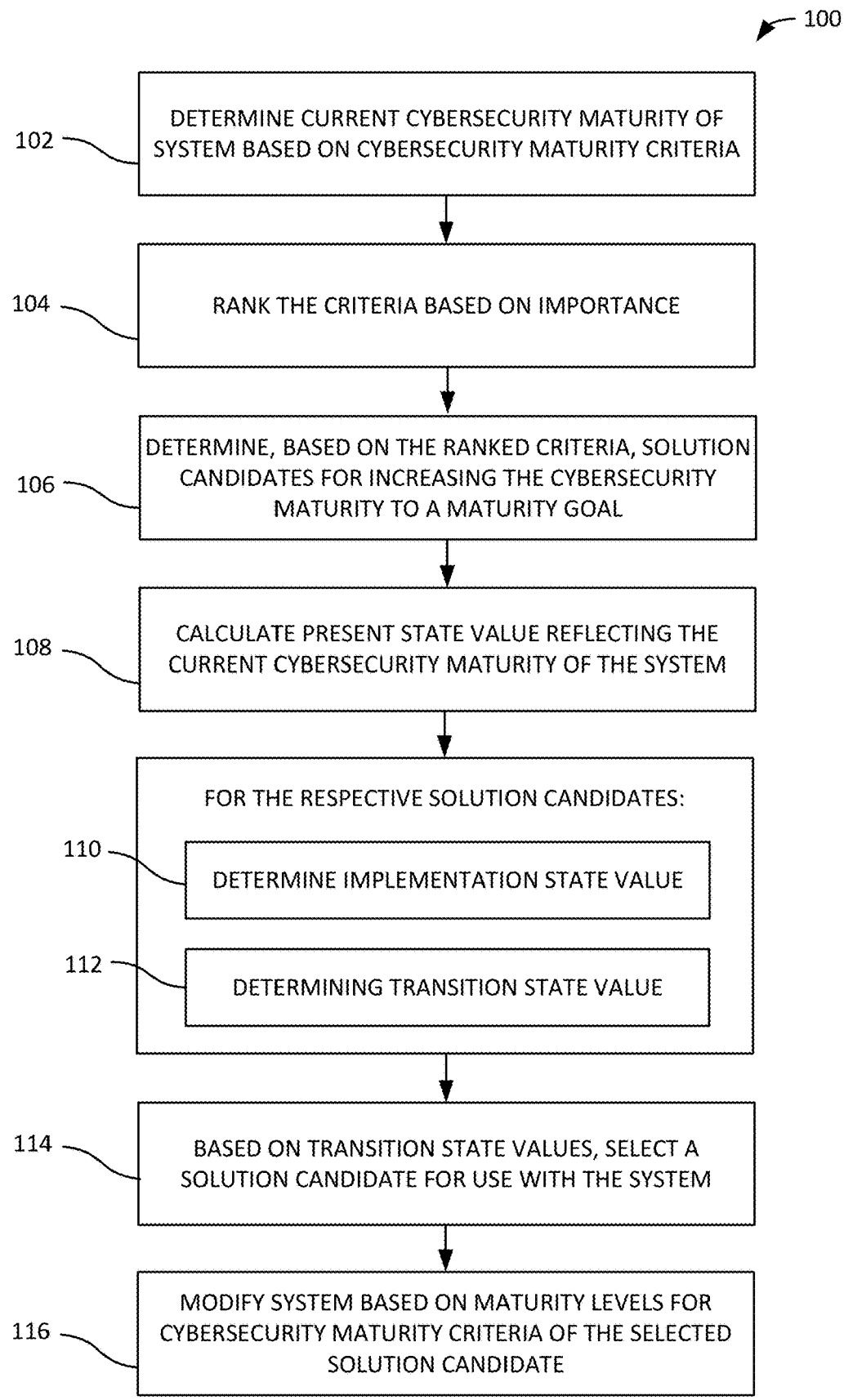
FIG. 1 illustrates an example method of mitigating the cybersecurity vulnerability of a system.

The connected infrastructure of the internet-of-things and networked systems can be divided into the categories of information technology (IT) and operations technology (OT). In some organizations, especially those that are hardware-centric (like power utilities), the OT and IT networks are equally important. Typically, an OT network consists of the industrial control systems (ICSs), which are often referred to as energy delivery systems (EDSs)—these include filed devices and sensors, remote terminal units (RTUs), and programmable logic controllers (PLCs). An IT network typically includes organizational databases, email servers, webservers, human resources, and other attributes. These networks (IT and OT) are typically segregated through the use of firewalls; a network administrator can be the conduit between the two networks. Although the networks are separated, if a cyberattack leads to a breach in the security of the administrator, the attacker can bring down both systems, potentially resulting in the loss of power, loss of life, infrastructure damage, or many other issues. Currently, most networks and devices are not set up to be able to validate data and information that is transferred between them.

A variety of cybersecurity vulnerability assessment tools and methodologies have been developed to address cybersecurity policy compliance. Most such methodologies were designed to address challenges at the systems level and for specific application spaces, thus they are not easily adaptable for other applications. Some frameworks, such as the cybersecurity capability maturity model (C2M2), the National Institute for Standards and Technology (NIST) cybersecurity framework (CSF), and the risk management framework (RMF), can provide a detailed cybersecurity analysis of a system but do not have the ability to provide mitigation plans. The core architectures of CSF and C2M2 are designed so they can be adopted by any application that is focused on cybersecurity policies. However, the tools were not designed with the ability to incorporate the priorities of an organization into the tool. Therefore, the assessments are detailed, but lacking in a sequential, quantified approach to mitigate vulnerabilities.

Some of the described examples use different aspects of CSF and C2M2 to develop new mitigation systems and approaches, also referred to herein as cybersecurity vulnerability mitigation framework through empirical paradigm (CyFEr). As one component of CyFEr, a detailed interconnected rank-weight computation system is used to rank, weight, and prioritize the cybersecurity maturity criteria and their constituent security controls. Many of the examples discussed herein relate to evaluation of various rank-weight methods and their application to a the NIST CSF.

Recognizing the evolving and emerging non-linear cybersecurity threats and challenges, researchers have been developing various vulnerability assessments and maturity models. Three such well-known models are C2M2, CSF, and RMF. These models can be used to guide critical infrastructure owners and operators to evaluate their systems and identify the cybersecurity vulnerabilities. Over the years, various research areas have adopted those base frameworks and customized them for specific applications, including, among others, buildings, oil and gas, electricity generation and distribution. The efficiency and performance of cybersecurity maturity models can be enhanced by feeding their outputs into quantitative frameworks. Such a process could potentially result in defining the security on a quantitative plane leading to the potential development of a mitigation approach. Attempts to develop analytical models that are compatible with some of those maturity models have several limitations.

Attempts to use deep learning models to perform vulnerability mitigation have been limited by training data. The lack of openly available and trustworthy datasets makes it difficult to develop, test, and use deep learning software systems in cybersecurity vulnerability mitigation.

Other approaches lack the ability to incorporate prioritization or any level of criteria ranking to perform a weighted mitigation approach. In addition, such models are typically tailored to specific and potentially proprietary vulnerability analysis/maturity models. To avoid subjective weighting approaches, some approaches have explored the use of rank-weight methods to determine the most critical and least critical vulnerabilities. In those models, an attempt was made to relatively quantify risk value, cyber threats, vulnerabilities, likelihood of events, and consequences. Such models, however, were shown to be effective only at addressing organizational and management level challenges. Due to the amount of subjective analysis involved, it is non-trivial to even test their implementation at system-level and application-level cybersecurity vulnerability prioritization and mitigation.

The approaches described herein use quantitative ranking techniques to perform prioritized vulnerability mitigation based on logical constructs and multi-tiered mathematical filters. The approaches can be used at the application-level, system-level, or organizational and management level. The described approaches are therefore compatible with several existing maturity and vulnerability analysis models, such as C2M2, CSF, RMF, cyber security evaluation tool (CSET), national initiative for cybersecurity education capability maturity model (NICE-CMM), cyber readiness institute (CRI), cyber policy institute (CPI), information security management (ISM), and others.

Previous approaches using criteria-based decision-making calculations that encompass a variety of available criteria that are assigned different priorities and weights are typically very subjective. Validated datasets are typically required to make accurate quantitative decision-making calculations, but the necessary data is not typically available. Some research has looked at using various rank methods for data constrained scenarios, but the use of similar techniques for a cybersecurity vulnerability assessment has not been recorded in the literature.

Cybersecurity vulnerability assessments typically include an analysis of the network, system, or facility through a set of security controls. The number of controls may vary significantly, ranging from 100 to over 500 depending on the tool or framework used (e.g., CSF, C2M2, RMF, etc.). Therefore, unless a prioritized list of criteria has been provided, it is almost impossible to determine the ideal cybersecurity stance. Because of this complexity, a multi-criteria decision analysis (MCDA) can be advantageous. In some MCDA approaches, specific weights that are normalized to a scale of 1 to 100 are assigned to a set of criteria prior to the decision-making process; however, this also adds a layer of complexity onto an already complicated issue (e.g., how are the weights assigned?). In the described examples, the criteria are ranked and then a computational algorithm can calculate relative weights. Currently, there does not appear to be any use in the literature of MCDA techniques with rank-weight methods to solve cybersecurity mitigation issues.

FIG. 1 illustrates a method 100 of mitigating the cybersecurity vulnerability of a system. In process block 102, a current cybersecurity maturity of the system is determined based on cybersecurity maturity criteria. Cybersecurity maturity can be assessed using, for example, C2M2, CSF, or RMF. In process block 104, the cybersecurity maturity criteria are ranked based on importance of the criteria. Ranking can be performed, for example, based on a predetermined priority list or based on input from a system administrator or other entity associated with the system. Ranking can include, for example, determining relative weights for the cybersecurity maturity criteria using a rank-weight analysis. The rank-weight analysis can be a rank sum analysis, a reciprocal rank analysis, a rank exponent analysis, or a rank order centroid analysis. Rank-weight approaches are discussed in below in detail.

In process block 106, a plurality of solution candidates for increasing the cybersecurity maturity of the system to a cybersecurity maturity goal are determined based on the ranked cybersecurity maturity criteria. The individual cybersecurity maturity criteria can each have multiple security controls, and the cybersecurity maturity goal can specify a number or percent of maturity criteria or security controls at a desired maturity level. The solution candidates specify maturity levels for the respective cybersecurity maturity criteria (and/or maturity levels for security controls of the criteria). Maturity levels reflect how completely an area of security is addressed (e.g., "not implemented," "partially implemented," "largely implemented," and "fully implemented.") The more secure the technique/implementation is, the higher the maturity level.

In some examples, one or more filters are applied to both the ranked cybersecurity maturity criteria and the cybersecurity maturity goal for the system. The filters can specify various constraints, including maturity indicator levels of security controls, time constraints, financial constraints, or other resource constraints. In some of the detailed examples presented herein, three filters are used. The modular nature of the described approaches allows additional filters to be added or existing filters to be modified or removed. The plurality of solution candidates can be determined based on outputs of the applied filters. The filters thus help limit the number of solutions that achieve the cybersecurity maturity goal to those acceptable to the party specifying the constraints.

In process block 108, a present state value reflecting the current cybersecurity maturity of the system is calculated. The present state value is based on current maturity levels for the cybersecurity maturity criteria. Detailed example present state value calculations are discussed below in detail. Process blocks 110 and 112 are performed for the respective solution candidates. In process block 110, an implementation state value is determined. The implementation state value represents implementation of the maturity levels specified by the solution candidate. In process block 112, a transition state value is determined. The transition state value represents a transition from the present state value to the implementation state value. Detailed examples of implementation state value and transition state value determination is discussed below in detail.

In process block 114, based on the transition state values, a solution candidate is selected for use with the system. In some examples, the solution candidate is selected by calculating a performance score index (PSI) for the solution candidates based on the transition state values. The PSI can be calculated by relatively ranking the respective criteria across the solution candidates. A rank-weight approach can then be used with the PSI to calculate a weighted performance score (WPS) for each solution candidate, and the solution candidate(s) with the highest WPS value can be selected as the solution candidate to use with the system. Detailed examples of PSI and WPS are discussed below.

In process block 116, the system is modified based on the maturity levels for the cybersecurity maturity criteria of the selected solution candidate. Examples of system modifications can include securing computer systems (implementing password protection, establishing firewalls, deleting files, removing access permissions, changing security keys, implementing encryption, updating software or operating systems, etc.) and securing infrastructure (e.g., communicating with an associated controller to modify system settings, permissions, or other settings, establishing physical security for energy distribution network system components, etc.). Other examples of system modifications include organizational and policy level modifications such as performing inventory management, qualitative and quantitative risk assessment, supply chain management, development of business continuity planning, disaster recovery plans, performing business impact analysis, ensuring policies and point-of-contact are in place for critical cyber-organizational processes, etc. In some examples, in addition to or in place of modifying the system, a data visualization representing the selected solution candidate is generated. In some examples, the data visualization illustrates target maturity levels for the security controls of the cybersecurity maturity criteria to reach the cybersecurity maturity goal for the system. Example data visualizations are shown in FIGS. 6-11 and 15-22.

As discussed in greater detail below, in some examples, dependencies between/among security controls are known or determined. In such examples, the dependencies are used in determination of the implementation state values and transition state values. Examples in which dependencies are considered are referred to herein as "enhanced prioritized gap analysis." Examples in which dependencies are not considered as referred to herein as "prioritized gap analysis."

Figure 2:
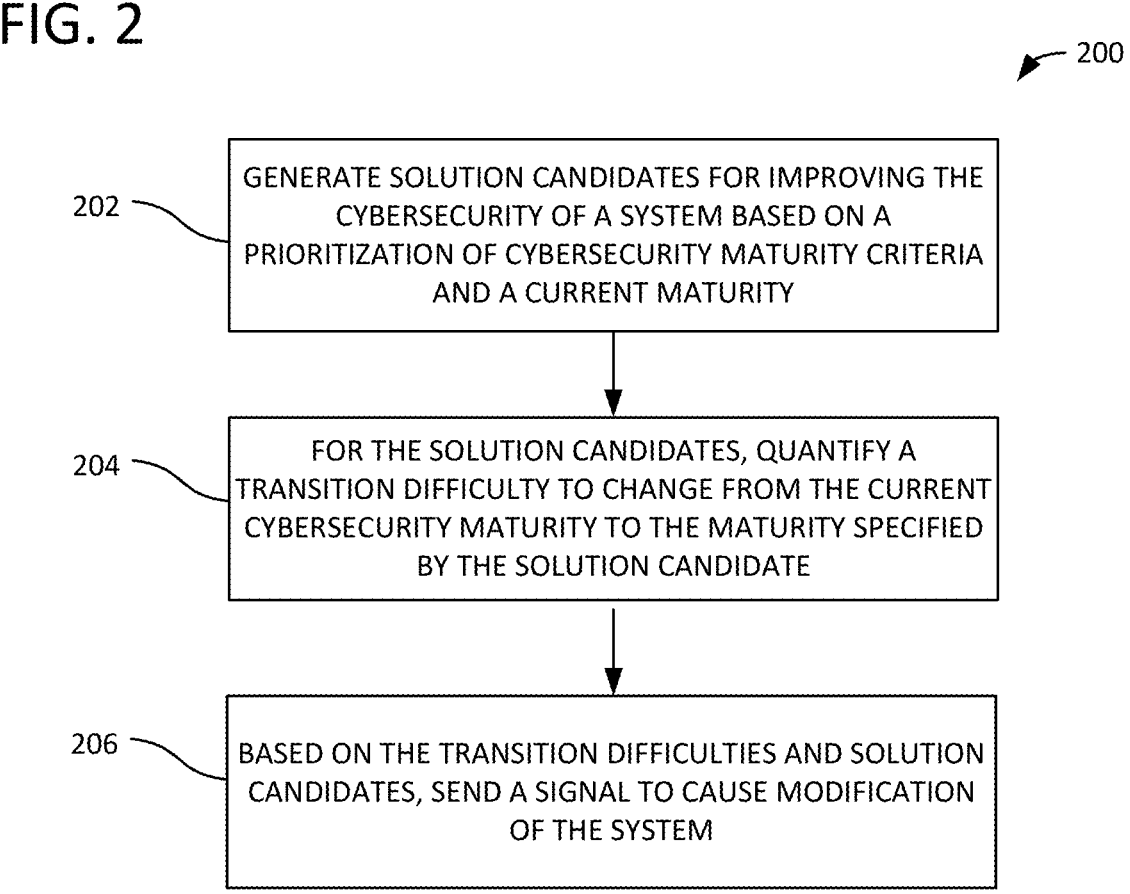
FIG. 2 illustrates an example method of mitigating the cybersecurity vulnerability of a system in which a cybersecurity vulnerability mitigation recommendation is generated.

FIG. 2 illustrates a method 200 of mitigating the cybersecurity vulnerability of a system. In process block 202, one or more solution candidates for improving the cybersecurity of a system are generated based on a prioritization of cybersecurity maturity criteria and a current cybersecurity maturity of the system. The prioritization can be based on rankings and relative weights for security controls of the cybersecurity maturity criteria. A rank-weight approach can be used to determine the relative weights. In some examples, dependencies among security controls of the cybersecurity maturity criteria are known, and the prioritization is based on the dependencies.

For the respective solution candidates, in process block 204, a transition difficulty is quantified for changing from the current cybersecurity maturity of the system to a cybersecurity maturity specified by the solution candidate. The transition difficulty can be quantified by, for example: calculating a present state value reflecting the current cybersecurity maturity of the system; determining an implementation state value representing implementation of the maturity levels specified by the solution candidate; and determining a transition state value representing a transition from the present state value to the implementation state value.

In process block 206, based on the transition difficulties and solution candidates, a signal is sent to cause a modification of the system to improve the cybersecurity maturity of the system. The system can be, for example, an energy distribution system, and the signal can be sent to a controller associated with the energy distribution system. The controller can modify the system.

Figure 3:
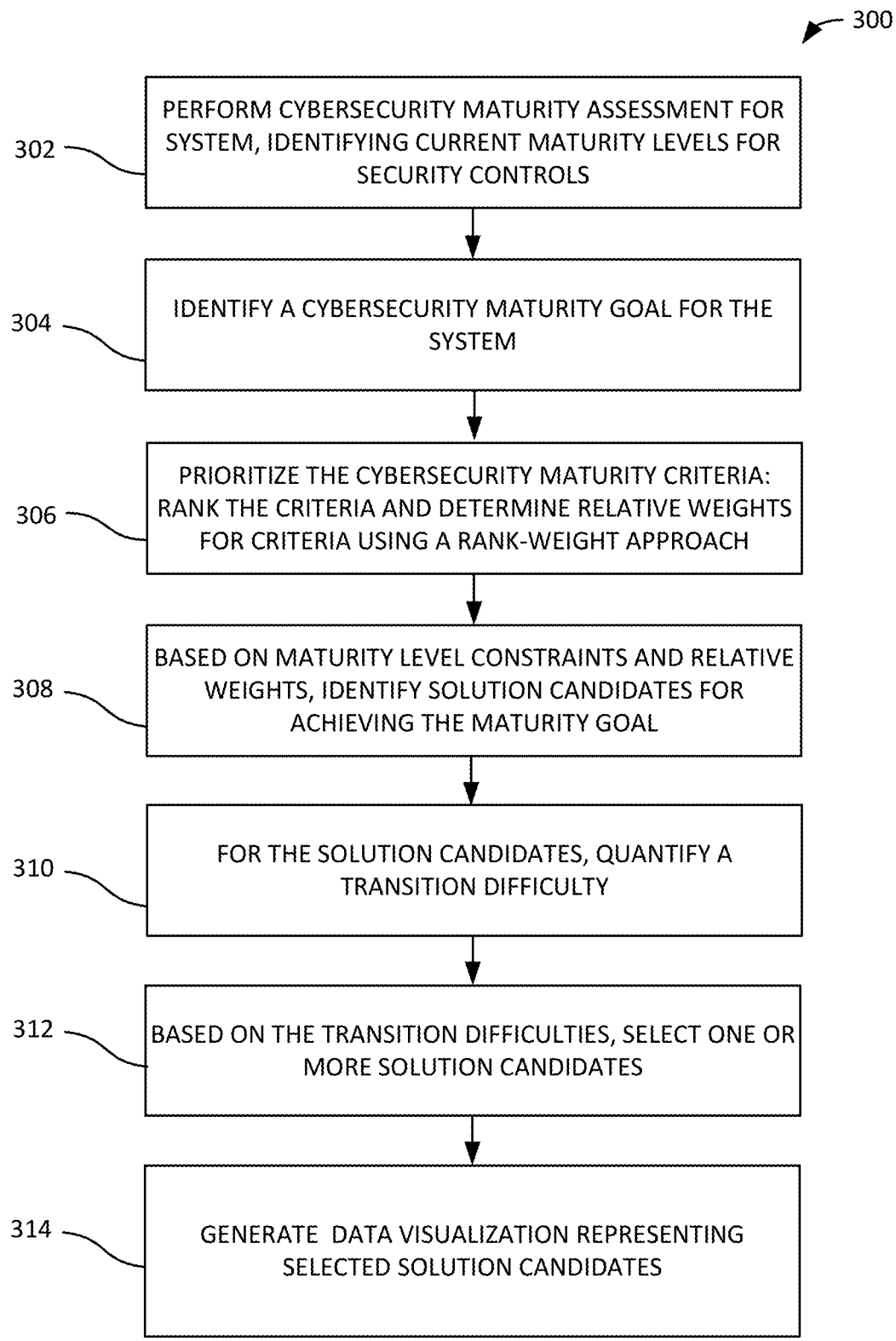
FIG. 3 illustrates an example method of mitigating the cybersecurity vulnerability of a system in which the maturity levels of some security controls are increased based on a selected solution candidate.

FIG. 3 illustrates a method 300 of mitigating the cybersecurity vulnerability of a system. In process block 302, a cybersecurity maturity assessment is performed for the system. The assessment identifies current maturity levels for security controls of cybersecurity maturity criteria. In process block 304, a cybersecurity maturity goal for the system is identified. In process block 306, the cybersecurity maturity criteria are prioritized. Prioritizing can include ranking the cybersecurity maturity criteria and determining relative weights for the respective criteria using a rank-weight approach. In process block 308, solution candidates for achieving the cybersecurity maturity goal for the system are identified based on one or more maturity level constraints and the relative weights. The solution candidates specify maturity levels for the security controls of the cybersecurity maturity criteria.

For the respective solution candidates, a transition difficulty is quantified in process block 310. Quantifying the transition difficulty can be done, for example, by calculating a present state value reflecting a current cybersecurity maturity of the system, determining an implementation state value representing implementation of the maturity levels specified by the solution candidate, and determining a transition state value representing a transition from the present state value to the implementation state value.

Based on the transition difficulties, one or more of the solution candidates are selected in process block 312. For example, the transition state value can be used to calculate a PSI for the solution candidates. The PSI can be calculated by relatively ranking the respective criteria across the solution candidates. A rank-weight approach can then be used with the PSI to calculate a WPS for each solution candidate, and the solution candidate(s) with the highest WPS value can be selected as the solution candidate to use with the system.

In process block 314, a data visualization is generated representing the selected solution candidates. Example data visualizations are shown in FIGS. 6-11 and 15-22. In some examples, the system is modified to increase at least some of the current maturity levels for the security controls to maturity levels specified by the selected solution candidate. In some examples, dependencies among security controls are determined, and the dependencies are used in determination of the quantification of the implementation difficulties.

II. Detailed Examples—Prioritized Gap Analysis

The examples in this section illustrate approaches in which dependencies among security controls and/or maturity criteria are not known or not used, referred to as "prioritized gap analysis" (PGA). Various examples are evaluated by implementation using CSF. Testing of the applicability of the approaches discussed herein to CSF is also performed against a real-world cyber-attack that targeted industrial control systems in a critical infrastructure facility.

A. Introduction

C2M2 and CSF have a proven architecture that performs gap analysis. Therefore, the same architecture is adapted for the purposes of these examples. Neither C2M2 nor CSF, however, can perform a prioritized vulnerability analysis (also referred to as a gap analysis). In the described approaches, a "multi-scenario and criteria based" vulnerability analysis can be performed to facilitate mitigation strategies. To achieve this, a set of logical steps can be performed after the base assessment of the cybersecurity maturity model and framework. The calculations depend on the cybersecurity goals and desired end state.

Figure 4:
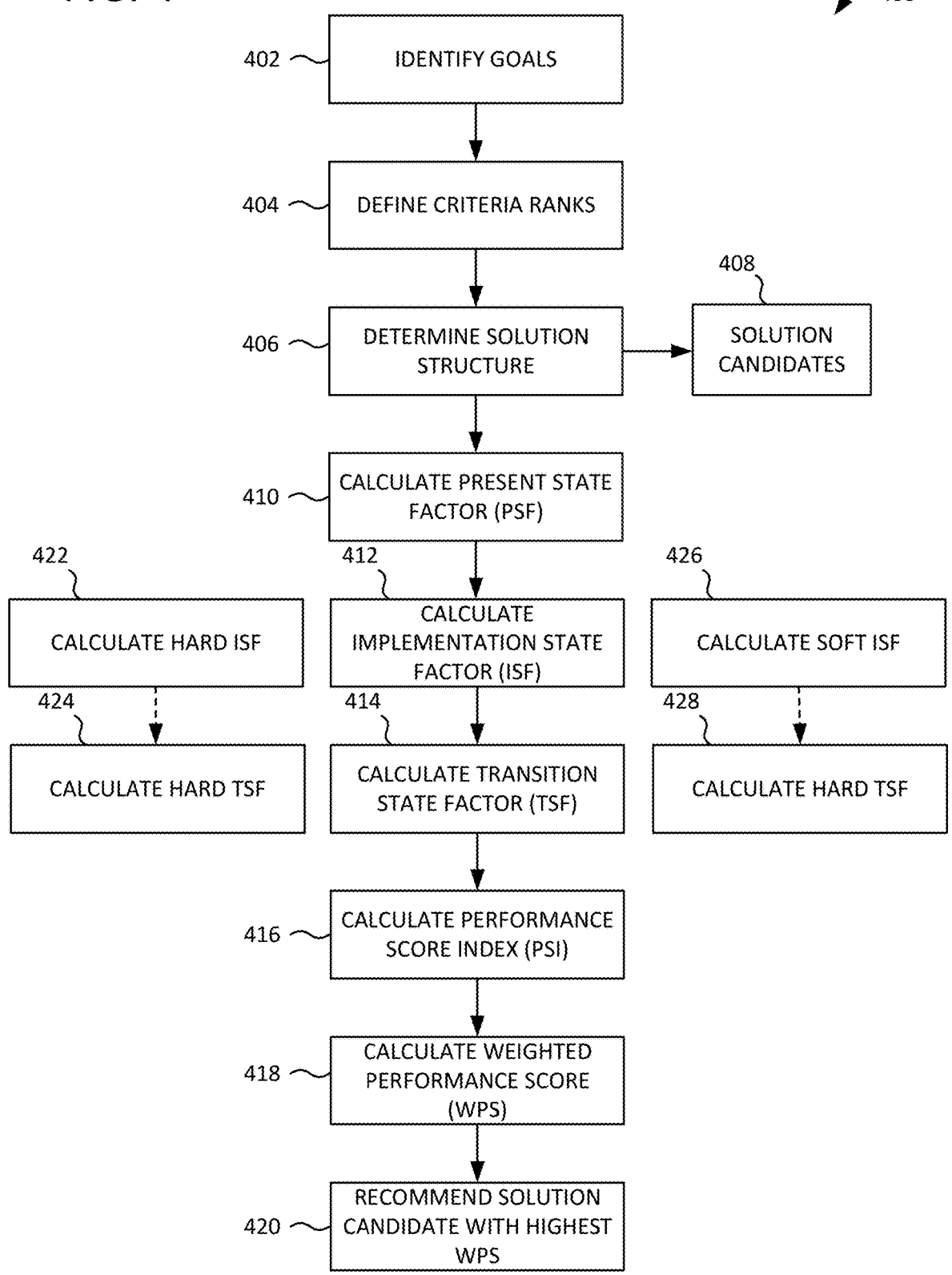
FIG. 4 illustrates an example prioritized gap analysis (PGA) approach.

FIG. 4 illustrates an example prioritized gap analysis (PGA) process 400 that involves a hierarchical execution of various steps. Upon defining the cybersecurity goals in process block 402 and the criteria ranks in process block 404, the CyFEr framework uses a multi-tiered constraint-based optimization approach to filter redundant and unwanted solution structures in process block 406, resulting in solution candidates 408. Upon filtering, the CyFEr framework assesses the current cybersecurity posture and accurately quantifies the effort required to reach a desired state. Process 400 does this by analyzing the discovered cybersecurity postures (solution candidates identified through filtering) and calculates scalar values for the solution candidates based on the state changes of the security controls through calculation of the present state factor (PSF) in process block 410, calculation of the implementation state factor (ISF) in process block 412, and calculation of the transition state factor (TSF) in process block 414.

"Hard" and "soft" approaches to ISF and TSF can be used, as illustrated by optional process blocks 422 and 424 in which hard ISF and hard TSF are calculated and optional process blocks 426 and 428 in which soft ISF and TSF are calculated. "Soft" indicates that the solution candidates can include security controls that are "largely implemented" as well as "fully implemented" (e.g., level "3" or "4"), whereas "hard" indicates that security controls that are modified are only "fully implemented." A soft implementation approach allows implementation cost and difficulty to be factored in for some security controls to allow less than full implementation. The scalar values are used to rank the solution candidates through calculation of a performance score index (PSI) in process block 416 and calculation of a weighted performance score (WPS) in process block 418. The top-ranking solution is determined based on the WPS and is recommended in process block 420 as the cybersecurity path to achieve the desired maturity. A detailed analysis of the prioritized gap analysis illustrated in FIG. 4 follows.

B. Identify the Goal(s)

Identifying the goal means determining the desired cybersecurity maturity. An example of the desired maturity can be "given the current state at 50% maturity, the final maturity should be at 70%." Other thresholds, such as a specific number of mature controls, or other maturity percentages can also be used. Controls in state 3 or 4 (on an integer scale of 1-4) are typically considered to be mature controls.

C. Define the Criteria Ranks

Criteria are the possible attributes that are independent of the goal. The desired criteria can be defined alongside the goal. An example of criteria is "in addition to the desired state, a particular subdomain (e.g., access control or security control) is ranked as 1, asset management is ranked as 2, and so on." Therefore, in this step, all desired criteria are identified, and ranks determined for the individual criteria using one a rank weight method (see Equations 1 to 10) to calculate relative weights (RW). The sum of the RW values of the criteria is called the net-RW ($RW_{net}$). For a single criterion, the RW value=$RW_{net}$=1. For multiple criteria, the RW values are defined for each criterion such that $RW_{net}$=1. Note that a mechanism can be evaluated where a prioritized list of criteria can be defined, and the relative RW values can be automatically computed.

The rank-weight methods discussed here are 1) rank sum, 2) reciprocal rank, 3) rank exponent, and 4) rank order centroid. Other rank-weight methods are also possible. Detailed analysis and formulations are discussed below.

Rank Sum (RS): For n number of criteria, the weight $W_i^{RS}$ of criteria i of rank r is given by Equations 1 and 2:

$$W_i^{RS} = 2(n-r+1) \quad (1)$$

$$W_{i|norm}^{RS} = \frac{w_i}{n(n+1)} = \frac{2(n-r+1)}{n(n+1)} \quad (2)$$

Reciprocal Rank: For n number of criteria, the weight $W_i^{RR}$ of criteria i of rank r is given by Equation 3:

$$W_i^{RR} = \frac{1}{r} \quad (3)$$

The normalized weight of criteria i is calculated in Equation 4 as:

$$W_{i|norm}^{RR} = \frac{W_i^{RR}}{\sum_{i=1}^{n} W_i^{RR}} = \frac{(1/r)}{\sum_{i=1}^{n} W_i^{RR}} \quad (4)$$

Rank Exponent: For n number of criteria, the weight $W_i^{RE}$ of criteria i of rank r is given in Equation 5 by:

$$W_i^{RE} = (n-r+1)^p \quad (5)$$

where p is the controllability parameter to vary the weight distribution across criteria. Note that if p=0, weights of all criteria are equal; if p=1, Equation 7 is the same as Equation 1, which will lead to a rank sum calculation, as shown in Equation 6. This relationship is shown in Equation 8.

$$W_i^{RE} = \begin{cases} (n-r+1)^p, & \forall p \in (0,1) \wedge (1,\infty) \Rightarrow \forall p \in (0,\infty) \ \& \ p \neq 0,1 \infty \\ 1 & \text{if } p = 0 \\ \text{Rank Sum} & \text{if } p = 1 \end{cases} \quad (6)$$

For this rank-weight method, the normalized weight of criteria i is calculated as:

$$W_{i|norm}^{RE} = \frac{W_i^{RE}}{\sum_{i=1}^{n} W_i^{RE}} = \frac{(n-r+1)^p}{\sum_{i=1}^{n} W_i^{RE}} \quad (7)$$

Rank Order Centroid: For n number of criteria, the weight $W_i^{ROC}$ of criteria i of rank r is given by:

$$W_i^{ROC} = W_{i|norm}^{ROC} = \frac{1}{n} \sum_{j=i}^{n} \frac{1}{j} \quad (8)$$

Note that the summation of normalized weights of all criteria is always equal to 1. Therefore, Equations 2, 4, 6, and 8 will always abide by the following constraints listed in equations 9, 10, and 11.

$$\sum_{i=1}^{n} W_{i|norm}^{\alpha} = 1, \alpha \in \{RS, RR, RE, ROC\} \quad (9)$$

$$RW_{net} = \begin{cases} \sum_{k=1}^{p} Criteria_{RW}^{k}; & \text{if } Criteria_{num} > 1 \\ 1; & \text{if } Criteria_{num} = 1 \end{cases} \quad (10)$$

such that $$RW_{net} = 1 \quad (11)$$

where
$Criteria_{RW}^{k}$=RW value of criteria k; $0 \leq k \leq 1$, and
$Criteria_{num}$=Total number of criteria.

D. Determine Solution Structure

Possibility generation (permutation) techniques can be used to discover all converged solutions that attempt to reach the desired cybersecurity state (goal). Constraint-based filtration can be used to eliminate unwanted solutions. With a base state of 0% maturity, there are over ~$2^{32}$ possible solutions. Based on testing, the total number of constraints were narrowed down to three. Therefore, in these examples, three solution sets will be generated that pertain to those three constraints.

Typically, the security controls in a vulnerability assessment framework such as C2M2 and CSF are given a numerical integer between 1 and 3. This value is called the maturity indicator level (MIL), which indicates the criticality or the maturity of a control. The higher this value is, the more advanced the control is. The described approaches can also be used with vulnerability assessment tools that do not have MIL values. In such cases, it can be assumed that MIL=1 for all the controls and the proposed formulation can be used as is. The MIL values of a control are different from the maturity level or state of a control. For example, a security control of MIL=2 can have a maturity level or state of 1, 2, 3, or 4.

Constraint-1 (Solution Set-1): Given a desired end state of x % maturity, all the possible solutions that show x % of desired maturity being acquired in subdomains (criteria) in the ranked order and in the order of lowest MIL control (MIL1) to highest MIL control (MIL3) should be discovered and grouped until the overall maturity is achieved to be x %. To illustrate this, the algorithm starts with the first ranking criteria and sequentially (MIL1→MIL2→MIL3) transfers the states of controls to state 3 or state 4, then the process is repeated for the $2^{nd}$ ranking criteria, and so on. This would continue until the overall maturity reaches x %. At every control, the algorithm checks for the current maturity. If the maturity reaches x %, the algorithm stops immediately irrespective of the criteria or MIL or control it is currently handling.

Implementation Solution: The above constraint is realized through the formulation shown below in Table 1.

TABLE 1

First Constraint Algorithm

Algorithm - 1: Constraint - 1 (Solution Set - 1)
1: $s \in S_1^{future}$ if $s \notin S_1^{present}$, S.T
2: while $M_{net} \leq x\%$
3: for $C_i, \forall C_i \in \{C_{Total}^{Ranked}\}$, where $C_{Total}^{Ranked} = \{C_1, C_2, \ldots, C_i, \ldots, C_n\}$; n = 23
4: while $M_i^{net} \leq x\%$
5: $\forall Q_n^{MIL1}, Q_i^{MIL1} \rightarrow S_{\{3\|4\}}$
6: Then, $\forall Q_n^{MIL2}, Q_i^{MIL2} \rightarrow S_{\{3\|4\}}$
7: Then, $\forall Q_n^{MIL3}, Q_i^{MIL3} \rightarrow S_{\{3\|4\}}$ In Table 1, line 1 indicates that a particular solution s discovered through the algorithm in lines 2-7 will belong to the solution set $S_1$ under two outstanding conditions: 1) s does not already exist in the current state of $S_1$ (indicated by $S_1^{present}$, or 2) s is bound to the constraints below (line-2 to line-7). Upon satisfying them, s will be appended to the new or future state of $S_1$ (indicated by $S_1^{future}$). Line 2 ensures that the overall maturity $M_{net}$ is always less than or equal to the desired maturity x %. Line 3, ensures the constraint in line 2, for a particular criteria C, in a ranked order $C_{Total}^{Ranked}$ (first criteria chosen is the criteria with rank-1, and so on), while, in line 4, the overall maturity ($M_i^{net}$) of criteria C, is less than or equal to the desired maturity x %, across all MIL1 controls $Q_n^{MIL1}$, transition the state of an MIL1 control $Q_i^{MIL1}$ to state-3 or state-4 indicated by $S_{3\|4}$. (line 5) across all MIL2 controls $Q_n^{MIL2}$, transition the state of an MIL2 control $Q_i^{MIL2}$ to state-3 or state-4 indicated by $S_{3\|4}$, and across all MIL3 controls $Q_n^{MIL3}$, transition the state of an MIL3 control $Q_i^{MIL3}$ to state-3 or state-4 indicated by $S_{3\|4}$ (line 7). Throughout lines 5-7, lines 4 and 2 are constantly checked (indicated by while loops).

Constraint-2 (Solution Set-2): Given a desired end state of x % maturity, all the possible solutions that indicate up to 100% of each MIL control being achieved at either a state-3 or state-4 are discovered and grouped in the order of ranked criteria until the overall maturity is achieved to be x %. To illustrate this, the algorithm, shown in Table 2, starts with the first ranking criteria and transfers up to 100% of controls of MIL1 to state 3 or 4, then moves to the second ranking criteria to do the same, and so on. Once the above is performed for all of the 23 criteria, the algorithm goes back to the first ranking criteria to repeat the process for MIL2 controls. This loop is repeated again for MIL3 controls. At every control, the algorithm checks for the current maturity. If the maturity reaches x %, the algorithm stops, irrespective of the criteria or MIL or control it is currently assessing.

Implementation Solution: The above constrain is realized through the formulation shown below in Table 2.

TABLE 2

Second Constraint Algorithm

Algorithm - 2: Constraint - 2 (Solution Set - 2)
1: $s \in S_2^{future}$ if $s \notin S_2^{present}$, S.T
2: while $M_{net} \leq x\%$
3: for $C_i, \forall C_i \in \{C_{Total}^{Ranked}\}$, where $C_{Total}^{Ranked} = \{C_1, C_2, \ldots, C_i, \ldots, C_n\}$; n = 23
4: $\forall Q_n^{MIL1}, Q_i^{MIL1} \rightarrow S_{\{3\|4\}}$
5: for $C_i, \forall C_i \in \{C_{Total}^{Ranked}\}$, where $C_{Total}^{Ranked} = \{C_1, C_2, \ldots, C_i, \ldots, C_n\}$; n = 23
6: $\forall Q_n^{MIL2}, Q_i^{MIL2} \rightarrow S_{\{3\|4\}}$ TABLE 2-continued Second Constraint Algorithm 7: for $C_i, \forall C_i \in \{C_{Total}^{Ranked}\}$, where $C_{Total}^{Ranked} = \{C_1, C_2, \ldots, C_i, \ldots, C_n\}$; n = 23
8: $\forall Q_n^{MIL3}, Q_i^{MIL3} \rightarrow S_{\{3\|4\}}$ Table 1, line 1 indicates that a particular solution s discovered through the algorithm (line 2-8) will belong to the solution set $S_2$ under two outstanding conditions: 1) s does not already exist in the current state of $S_1$ (indicated by $S_2^{present}$), and 2) s is bound to the constraints below (line-2 to line-8). Upon satisfying them, s will be appended to the new or future state of $S_2$ (indicated by $S_2^{future}$). Line 2 ensures that the overall maturity $M_{net}$ is always less than or equal to the desired maturity x %. While ensuring the constraint in line 2, line 3 specifies that for a particular criteria $C_i$ in a ranked order $C_{Total}^{Ranked}$ (first criteria chosen is the criteria with rank-1, and so on), across all MIL1 controls $Q_n^{MIL1}$, transition the state of an MIL1 control $Q_i^{MIL1}$ to state 3 or state 4 indicated by $S_{3\|4}$ (line 4). While ensuring the constraint in line 2 and that all MIL1 controls of all criteria are either in state 3 or state 4, lines 5 and 6 specify that for a particular criteria C, in a ranked order $C_{Total}^{Ranked}$ (first criteria chosen is the criteria with rank-1, and so on), across all MIL2 controls $Q_n^{MIL2}$, transition the state of an MIL2 control $Q_i^{MIL2}$ to state 3 or state 4 indicated by $S_{3\|4}$. While ensuring the constrain in line 2 and all MIL1 and MIL2 controls of all criteria are either in state 3 or state 4, lines 7 and 8 specify that for a particular criteria C, in a ranked order $C_{Total}^{Ranked}$ (first criteria chosen ranked as #1, and so on), across all MIL3 controls $Q_n^{MIL3}$, transition the state of an MIL3 control $Q_i^{MIL3}$ to state 3 or state 4 indicated by $S_{3\|4}$. Throughout lines 3-8, line 2 is constantly checked (indicated by the while loop).

Constraint-3 (Solution Set-3): Given a desired end state of x % maturity, all the possible solutions that indicate up to 100% of controls being achieved at either a state-3 or state-4 should be discovered and grouped in the order of ranked criteria and in the order of MIL (MIL1→MIL2→MIL3) per criteria until the overall maturity is achieved to be x %. To illustrate this, the algorithm starts with the first ranking criteria and transfers up to 100% of controls (all controls) to state 3 or state 4, then moves to the second ranking criteria to do the same, and so on. At every control, the algorithm checks for the current maturity. If the maturity reaches x %, the algorithm stops, irrespective of the criteria or MIL or control it is currently handling.

Implementation Solution: The above constraint is realized through the formulation below in Table 3.

TABLE 3

Third Constraint Algorithm

Algorithm - 3: Constraint - 3 (Solution Set - 3)
1: $s \in S_3^{future}$ if $s \notin S_3^{present}$, S.T
2: while $M_{net} \leq x\%$
3: for $C_i, \forall C_i \in \{C_{Total}^{Ranked}\}$, where $C_{Total}^{Ranked} = \{C_1, C_2, \ldots, C_i, \ldots, C_n\}$; n = 23
4: $\forall Q_n^{MIL1}, Q_i^{MIL1} \rightarrow S_{\{3\|4\}}$
5: $\forall Q_n^{MIL2}, Q_i^{MIL2} \rightarrow S_{\{3\|4\}}$
6: $\forall Q_n^{MIL3}, Q_i^{MIL3} \rightarrow S_{\{3\|4\}}$ Table 3, line 1, indicates that a particular solution s discovered through the algorithm (lines 2-6) will belong to the solution set $S_3$ under two outstanding conditions: 1) s does not already exist in the current state of $S_3$ (indicated by $S_3^{present}$), and 2) s is bound to the constraints in lines 2-6. Upon satisfying them, s will be appended to the new or future state of $S_3$ (indicated by $S_3^{future}$). Line 2 ensures that the overall maturity $M_{net}$ is always less than or equal to the desired maturity x %. While ensuring the constraint in line 2, line 3 specifies that for a particular criteria $C_i$ in a ranked order $C_{Total}^{Ranked}$ (first criteria chosen is the criteria with rank-1, and so on), line 4 (across all the MIL1 controls $Q_n^{MIL1}$, transition the state of an MIL1 control $Q_i^{MIL1}$ to state 3 or state 4 indicated by $S_{3\|4}$), line 5 (across all the MIL2 controls $Q_n^{MIL2}$, transition the state of an MIL2 control $Q_i^{MIL2}$ to state 3 or state 4 indicated by $S_{3\|4}$), and line 6 (across all the MIL3 controls $Q_n^{MIL3}$, transition the state of an MIL3 control $Q_i^{MIL3}$ to state 3 or state 4 indicated by $S_{3\|4}$) are performed. Throughout lines 3-6, line 2 is constantly checked (indicated by the while loop).

Once three solution sets have been discovered and grouped in their respective families, duplicates are checked for and eliminated, and a final solution set, $S_{final}$, is created. This final solution set is the union of the three solution sets as indicated below in Equation 12. In some examples, additional constraints, for example time, cost, or other resource constraints can be implemented as filters in addition to or in place of the algorithms shown in Tables 1-3 (which filter based on MIL level).

$$S_{final} = \bigcup_{i=1}^{n} S_i, \text{ here } n = 3 \tag{12}$$

E. Calculate the Present State Factor

Once a desired and potential solution set is discovered and obtained ($S_{final}$), the present state factor (PSF) can be computed for the baseline (current cybersecurity maturity or posture). The PSF of a criterion (also referred to as subdomain), shown as $PSF_i$ in Equation 13, is the sum of MIL value ($MIL \in \{1,2,3\}$) of each control in the criteria multiplied by its current state value (state value is not implemented=1, partially implemented=2, largely implemented=3, and fully implemented=4). Note that the CSF has five domains and multiple subdomains spread across those five domains. The terminology domain and subdomain are referred to as domains and subdomains of CSF.

$$PSF_i = C_i^{mil} \times C_i^{(Pstate)} \tag{13}$$

With the PSF acquired for each control, the net PSF for a subdomain, $PSF_{sub}$, is calculated in Equations 14 and 15 as:

$$PSF_{sub} = \sum_{i=1}^{n} PSF_i \tag{14}$$

$$\Rightarrow PSF_{sub} = \sum_{i=1}^{n} C_i^{mil} \times C_i^{(Pstate)} \tag{15}$$

Then, the PSF for the entire domain is calculated in Equations 16a and 16b as:

$$PSF_{dom} = \sum_{sub=1}^{m} PSF_{sub} \tag{16a}$$

$$\Rightarrow PSF_{dom} = \sum_{sub=1}^{m} \left( \sum_{i=1}^{n} C_i^{mil} \times C_i^{(Pstate)} \right)_{sub} \tag{16b}$$

Finally, the PSF for a solution s is calculated in Equations 16c, 16d, and 16e as:

$$PSF_{cuml} = \sum_{dom=1}^{j} PSF_{dom} \tag{16c}$$

$$\Rightarrow PSF_{cuml} = \sum_{dom=1}^{j} \left( \sum_{sub=1}^{m} PSF_{sub} \right)_{dom} \tag{16d}$$

$$\Rightarrow PSF_{cuml} = \sum_{dom=1}^{j} \left( \sum_{sub=1}^{m} \left( \sum_{i=1}^{n} C_i^{mil} \times C_i^{(Pstate)} \right)_{sub} \right)_{dom} \tag{16e}$$

where $mil \in \{1, 2, 3\}$; $state \in \{1, 2, 3, 4\}$, $C_i^{mil}$=Maturity Indicator Level of a control i, $C_i^{(Pstate)}$=Present (chosen) state of a control i, $PSF_i$=PSF for the control i and and $i \in \{1, 2, \ldots, n\}$, $PSF_{sub}$=PSF for sub-domain and $sub \in \{1, 2, \ldots, m\}$, $PSF_{dom}$=PSF for domain and $dom \in \{1, 2, \ldots, j\}$, and $PSF_{cuml}$=Cumulative PSF for the base assessment.

F. Calculate the Implementation State Factor

This portion focuses on determination of the implementation state factor (ISF) for each solution. ISF can be implemented as soft ISF (SISF) or hard ISF (HISF). The soft implementation state factor (SISF) for a subdomain is the sum of the MIL value of each control in the subdomain multiplied by the current state of the control of a solution s. If a control is at the $3^{rd}$ or $4^{th}$ state, that control is already at the final state. Therefore, there are zero jumps and SISF is equal to 0. This is shown in Equations 17a and 17b, below. The hard implementation state factor (HISF) is the sum of the MIL value of each control multiplied by the current state of the control of solution s. If a control is at the $4^{th}$ state (this is the difference between SISF and HISF), that control is already at the final state. Therefore, there are zero jumps. HISF is then equal to 0. This is also shown in equations (17a) and (17b).

$$\{\xi\}ISF_i^s = \begin{cases} C_i^{mil} \times C_{i|state}^s; & \text{if } C_i^{(Pstate)} < \delta \\ 0; & \text{if } C_i^{(Pstate)} \geq \delta \end{cases} \tag{17a}$$

where $$\xi = \begin{cases} S, & \text{for Soft} \\ H, & \text{for Hard} \end{cases} \text{ and } \delta = \begin{cases} 3, & \text{for } \xi = S \\ 4, & \text{for } \xi = H \end{cases} \tag{17b}$$

With the $\{\xi\}ISF$ acquired for each control, the net $\{\xi\}ISF$ for a sub-domain is calculated in Equations 17c and 17d as:

$$\{\xi\}ISF_{sub}^s = \sum_{i=1}^{n} \{\xi\}ISF_i^s \tag{17c}$$

$$\Rightarrow \{\xi\}ISF_{sub}^s = \sum_{i=1}^{n} \begin{cases} C_i^{mil} \times C_{i|state}^s; & \text{if } C_i^{(Pstate)} < \delta \\ 0; & \text{if } C_i^{(Pstate)} \geq \delta \end{cases} \tag{17d}$$

Then, the $\{\xi\}$ISF for the entire domain is calculated in Equations 17e and 17f as:

$$\{\xi\}ISF_{dom}^s = \sum_{sub=1}^{m} \{\xi\}ISF_{sub}^s \qquad (17e)$$

$$\Rightarrow \{\xi\}ISF_{dom}^s = \sum_{sub=1}^{m}\left(\sum_{i=1}^{n}\left\{\begin{array}{ll}C_i^{mil} \times C_{i|state}^s; & \text{if } C_i^{(P_{state})} < \delta \\ 0; & \text{if } C_i^{(P_{state})} \geq \delta\end{array}\right\}\right)_{sub} \qquad (17f)$$

Finally, the $\{\xi\}$ISF for a solutions is calculated in Equations 17g, 17h, and 17i as:

$$\{\xi\}ISF_{cuml}^s = \sum_{dom=1}^{j} \{\xi\}ISF_{dom}^s \qquad (17g)$$

$$\Rightarrow \{\xi\}ISF_{cuml}^s = \sum_{dom=1}^{j}\left(\sum_{sub=1}^{m} \{\xi\}ISF_{sub}^s\right)_{dom} \qquad (17h)$$

$$\Rightarrow \{\xi\}ISF_{cuml}^s = \qquad (17i)$$
$$\sum_{dom=1}^{j}\left(\sum_{sub=1}^{m}\left(\sum_{i=1}^{n}\left\{\begin{array}{ll}C_i^{mil} \times C_{i|state}^s; & \text{if } C_i^{(P_{state})} < \delta \\ 0; & \text{if } C_i^{(P_{state})} \geq \delta\end{array}\right\}\right)_{sub}\right)_{dom}$$

where
- $\{\xi\}ISF_i^s = \{\xi\}$ISF for the control i and $i \in \{1, 2, \ldots, n\}$,
- $C_{i|state}^s =$ State of a control i for solutions,
- $\{\xi\}ISF_{sub}^s = \{\xi\}$ISF for sub-domain; $sub \in \{1, 2, \ldots, m\}$,
- $\{\xi\}ISF_{dom}^s = \{\xi\}$ISF for the domain; $dom \in \{1, 2, \ldots, j\}$, and
- $\{\xi\}ISF_{cuml}^s = \{\xi\}$ISF for the solution s.

G. Calculate the Transition State Factor

The transition state factor (TSF) is a factor that indicates the quantitative effort to transition from a base state (or present state) to a new (or potentially desired) state. TSF can be divided into a soft TSF (STSF) and a hard TSF (HTSF). STSF is calculated using SISF and HTSF is calculated using HISF, as shown in Equations 18a, 18b, and 18c.

$$\{\xi\}TSF_i^s = \{\xi\}ISF_i^s - PSF_i \qquad (18a)$$

where $$\xi = \left\{\begin{array}{l}S, \text{ for Soft} \\ H, \text{ for Hard}\end{array}\right. \text{ and } \delta = \left\{\begin{array}{l}3, \text{ for } \xi = S \\ 4, \text{ for } \xi = H\end{array}\right. \qquad (18b)$$

$$\Rightarrow \{\xi\}TSF_i^s = \left(\left\{\begin{array}{ll}C_i^{mil} \times C_{i|state}^s; & \text{if } C_i^{(P_{state})} < \delta \\ 0; & \text{if } C_i^{(P_{state})} \geq \delta\end{array}\right\} - (C_i^{mil} \times C_i^{(P_{state})})\right) \qquad (18c)$$

Similarly, $\{\xi\}$TSF for a sub-domain is calculated in Equations 18d, 18e, and 18f as:

$$\{\xi\}TSF_{sub}^s = \{\xi\}ISF_{sub}^s - PSF_{sub} \qquad (18d)$$

$$\Rightarrow \{\xi\}TSF_{sub}^s = \left(\sum_{i=1}^{n} \{\xi\}ISF_i^s\right) - \left(\sum_{i=1}^{n} PSF_i\right) \qquad (18e)$$

$$\Rightarrow \{\xi\}TSF_{sub}^s = \qquad (18f)$$
$$\left(\sum_{i=1}^{n}\left\{\begin{array}{ll}C_i^{mil} \times C_{i|state}^s; & \text{if } C_i^{(P_{state})} < \delta \\ 0; & \text{if } C_i^{(P_{state})} \geq \delta\end{array}\right\}\right) - \left(\sum_{i=1}^{n} C_i^{mil} \times C_i^{(P_{state})}\right)$$

Then $\{\xi\}$TSF for a domain is calculated in Equations 18g, 18h, and 18i as:

$$\{\xi\}TSF_{dom}^s = \{\xi\}ISF_{dom}^s - PSF_{dom} \qquad (18g)$$

$$\Rightarrow \{\xi\}TSF_{dom}^s = \left(\sum_{sub=1}^{m} \{\xi\}ISF_{sub}^s\right) - \left(\sum_{sub=1}^{m} PSF_{sub}\right) \qquad (18h)$$

$$\Rightarrow \{\xi\}TSF_{dom}^s = \left(\sum_{sub=1}^{m}\left(\sum_{i=1}^{n}\left\{\begin{array}{ll}C_i^{mil} \times C_{i|state}^s; & \text{if } C_i^{(P_{state})} < \delta \\ 0; & \text{if } C_i^{(P_{state})} \geq \delta\end{array}\right\}\right)_{sub}\right) - \qquad (18i)$$
$$\left(\sum_{sub=1}^{m}\left(\sum_{i=1}^{n} C_i^{mil} \times C_i^{(P_{state})}\right)_{sub}\right)$$

Next, cumulative $\{\xi\}$TSF for a solution s is calculated in Equations 18j, 18k, 18l, and 18m as:

$$\{\xi\}TSF_{cuml}^s = \{\xi\}ISF_{cuml}^s - PSF_{sol} \qquad (18j)$$

$$\Rightarrow \{\xi\}TSF_{cuml}^s = \left(\sum_{dom=1}^{j} \{\xi\}ISF_{dom}^s\right) - \left(\sum_{dom=1}^{j} PSF_{dom}\right) \qquad (18k)$$

$$\Rightarrow \{\xi\}TSF_{cuml}^s = \qquad (18l)$$
$$\left(\sum_{dom=1}^{j}\left(\sum_{sub=1}^{m} \{\xi\}ISF_{sub}^s\right)_{dom}\right) - \left(\sum_{dom=1}^{j}\left(\sum_{sub=1}^{m} PSF_{sub}\right)_{dom}\right)$$

$$\Rightarrow \{\xi\}TSF_{cuml}^s = \qquad (18m)$$
$$\sum_{dom=1}^{j}\left(\sum_{sub=1}^{m}\left(\sum_{i=1}^{n}\left\{\begin{array}{ll}C_i^{mil} \times C_{i|state}^s; & \text{if } C_i^{(P_{state})} < \delta \\ 0; & \text{if } C_i^{(P_{state})} \geq \delta\end{array}\right\}\right)_{sub}\right)_{dom} -$$
$$\sum_{dom=1}^{j}\left(\sum_{sub=1}^{m}\left(\sum_{i=1}^{n} C_i^{mil} \times C_i^{(P_{state})}\right)_{sub}\right)_{dom}$$

where,
- $\{\xi\}TSF_i^s = \{\xi\}$TSF for the control i and $i \in \{1, 2, \ldots, n\}$,
- $\{\xi\}TSF_{sub}^s = \{\xi\}$TSF for the sub-domain,
- $\{\xi\}TSF_{dom}^s = \{\xi\}$TSF for the domain, and
- $\{\xi\}TSF_{cuml}^s = \{\xi\}$TSF for the solution s.

H. Calculate Performance Score Index

To calculate the performance score index, criteria rankings calculated as in section C—define the criteria ranks—(above) are used. The performance score indices (PSI) are calculated for each solution, s. PSI is a relative value (i.e., the smallest PSI is 1 and the largest PSI is the number of constrain-based solutions discovered). For example, Equation (14) results in a total number of solutions that is equal to the length of $S_{final}$. The PSI for a criteria per solution is assigned relative to the PSI for the same criteria across the remaining solutions. Therefore, the PSI calculation and its range can be depicted as shown in Equation 19. According to Equation 19, PSI is an integer, and its value for a particular TSF of solution s pertaining to a criteria c holds a linear relative dependency. This means that the PSI value is equal to the relative state of the TSF for solution s pertaining to criteria c. Therefore, the minimum value of PSI is always 1 and the maximum value is always the total number of discovered solutions through the constrain-based filtration process discussed above.

Note that all the discovered solutions will have the same cybersecurity posture of x % that was as defined in the "goal" or desired maturity. For a criterion, PSIs of the discovered solutions are based on the TSF (separately using a hard factor and a soft factor). Therefore, the PSI of a solution of a criterion (note that criterion=subdomain) depends on the transition state factor of that particular solution for that criterion (subdomain). This relationship is shown in Equation 20.

$$PSI(TSF_c^s) \rightarrow \begin{cases} \exists\, TSF_c^s \in ZPSI(TSF_c^s); & PSI \in \{1, \ldots, \text{len}(S_{final})\} \\ PSI_{max} = \text{len}(S_{final}); & (TSF_c^s)_{high} \\ PSI_{min} = 1; & (TSF_c^s)_{low} \end{cases} \quad (19)$$

$$PSI_{sub}^s \propto TSF_{sub}^s \quad (20)$$

Therefore, a higher TSF means a higher PSI and a lower TSF means the PSI will be lower. For example, when looking at three solutions, if $S_1$ has the highest TSF, and $S_3$ has the lowest TSF, the PSI of $S_1$ is 3, $S_2$ is 2, and $S_3$ is 1.

I. Calculate Weighted Performance Score

The Weighted Performance Score (WPS) is a scalar factor that is calculated using the PSI and the rank-weights (RW) obtained in Section C. This is represented in Equation 21 as:

$$WPS_s = \sum_{i=1}^{n} RW_i \times PSI_s^i \quad (21)$$

where
$WPS_s$=WPS for possibility solution s,
$RW_i$=RW of critetion a for solution s, and
$PSI_s^i$=PSI of critetion i for solutions.

Upon calculating the WPS for all the solutions, the solution with the highest WPS value is seen as the ideal cybersecurity posture for a desired maturity of x %. Upon determining the ideal solution, the critical infrastructure owner can perform a comparative analysis between the current maturity and desired maturity. Such an analysis will show the critical cybersecurity controls that need to be targeted to mitigate the vulnerabilities. This process can be performed in a time-boxed fashion pertaining to the limitations of the available resources. Upon mitigating the discovered vulnerabilities, the state of those controls will mature from "Not Implemented" or "Partially Implemented" to "Largely Implemented" or "Fully Implemented." Such a transition for a system-of-systems indicate that the vulnerabilities are mitigated with respect to the maturity model.

Figure 5:
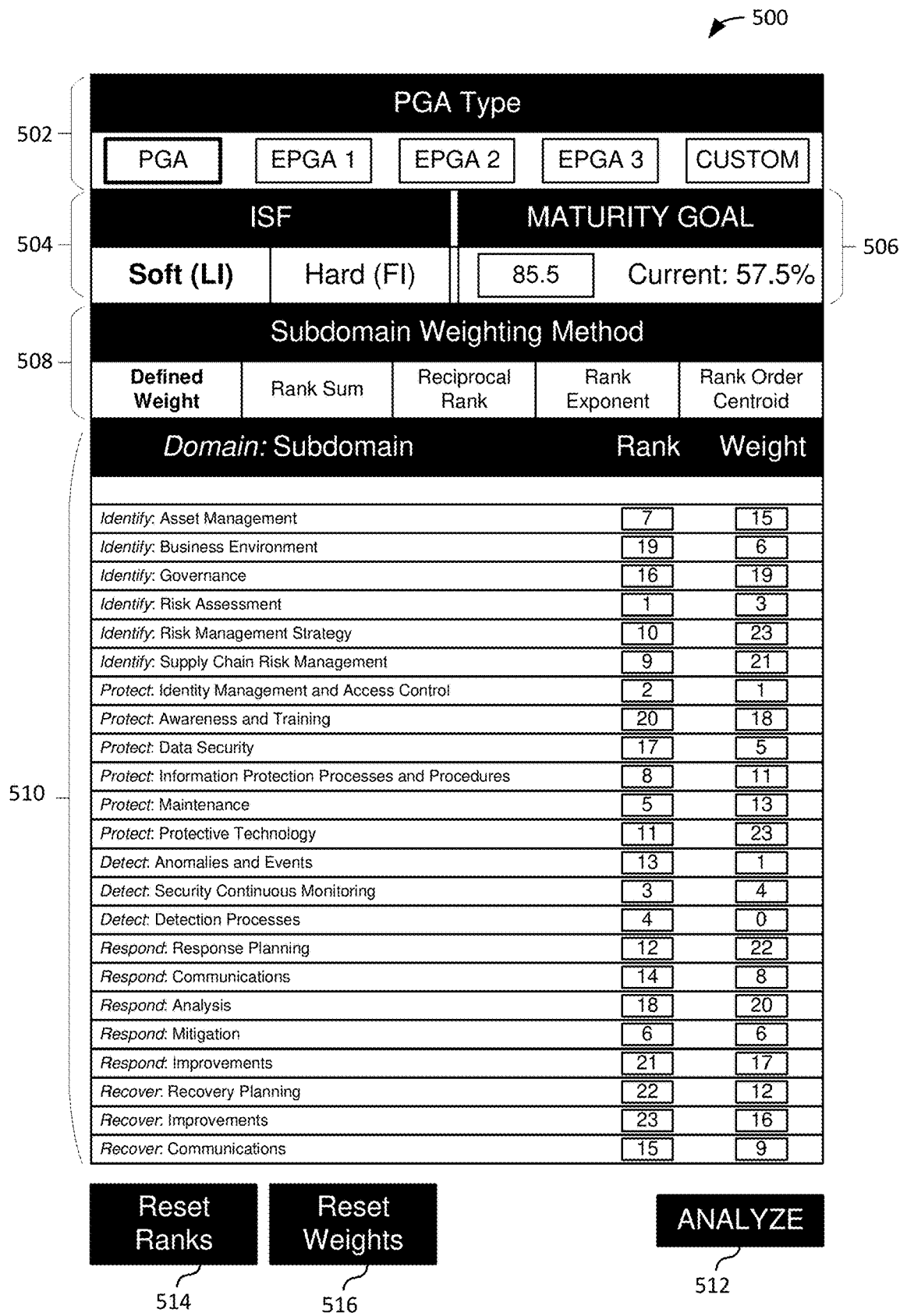
FIG. 5 illustrates an example user interface for a cybersecurity vulnerability mitigation software application.

In some examples, the CyFEr framework is implemented as a web-based software application that can be used to perform a prioritized vulnerability mitigation analysis. This is illustrated in FIG. 5 using the CSF framework. CSF includes five domains: Identify, Protect, Detect, Respond, and Recover. Each domain includes multiple subdomains. For example, the "Identify" domain includes subdomains of Asset Management, Business Environment, Governance, Risk Assessment, Risk Management Strategy, and Supply Chain Risk Management. Each of these subdomains can further include security controls.

FIG. 5 illustrates an example user interface (UI) 500. UI 500 can be part of a web application hosted on a remote server or a local application. UI portion 502 allows a user to pick an analysis type: PGA (prioritized gap analysis), three different varieties of EPGA (enhanced prioritized gap analysis for use when dependencies are known), or a custom analysis that allows the user to modify the other approaches. UI portion 504 allows the user to specify "Soft" (where the solution can include "largely implemented" controls) or "Hard" approaches (where the solution includes transitions to "fully implemented" but not "largely implemented." UI portion 506 allows a user to specify a cybersecurity maturity goal (shown as 85.5) and also shows a current maturity for the system.

UI portion 508 allows the user to select a weighting method for the rank-weight approach to prioritizing subdomains. The options listed in UI portion 508 are defined weight (e.g., user defined), rank sum, reciprocal rank, rank exponent, and rank order centroid. UI portion 510 lists the domains and subdomains for CSF. For each subdomain, there is a rank value and a weight value (between 1-23 because there are 23 subdomains). As discussed above with respect to FIGS. 1-4, the user can rank the subdomains from 1 to 23, select a weighting approach for the rank-weighting, and then select the "analyze" button 512 to produce a recommendation for mitigating the cybersecurity vulnerability of the system. "Reset ranks" button 514 and "reset weights" button 516 allow a user to reset ranks and weights. In some examples, users can specify the format of analysis results, such as data visualization (e.g., type of chart or graph), table, list, etc.

A real-world cyber-attack scenario was simulated using CSF and is discussed below. To simulate the base-case cyber-attack and perform a full experiment, the CSF web application and software testbed is used in combination with the CyFEr frontend web-application (shown in FIG. 5).

J. Real-World Attack-Based Experimental Analysis

An attack-based assessment was performed using the NIST Cybersecurity Framework (CSF) to demonstrate the described approaches. CSF has a total of 23 subdomains that are used as the criteria for this methodology, which will be ranked in a prioritized order. In the "identify" domain, the subdomains are Asset Management (ID.AM), Business Environment (ID.BE), Governance (ID.GE), Risk Assessment (ID.RA), Risk Management Strategy (ID.RM), and Supply Chain Risk Management (ID.SC). In the "protect" domain, the subdomains are Identity Management and Access Control (PR.AC), Awareness and Training (PR.AT), Data Security (PR.DS), Information Protection Processes and Procedures (PR.IP), Maintenance (PR.MA), and Protective Technology (PR.PT). In the "detect" domain, the subdomains are Anomalies and Events (DE.AE), Security Continuous Monitoring (DE.CM); and Detection Processes (DE.DP). In the "respond" domain, the subdomains are Response Planning (RS.RP), Communications (RC.CO), Analysis (RS.AN), Mitigation (RS.MI), and Improvements (RS.IM). In the "recover" domain, the subdomains are Recovery Planning (RC.RP), Improvements (RC.IM), and Communications (RC.CO).

The attack scenario is an insider threat attack by a third-party utility contractor carried out against a utility that caused over 200,000 gallons of sewage water to spill. While employed, the contractor worked on a team to install supervisory control and data application (SCADA) radio-controlled sewage equipment at a water treatment plant. Towards the end of the project, the contractor left his job over some disagreements with his employer. Even though his employment was terminated, the third-party contractor's credentials and access to the plant's critical control systems were not revoked. The contractor still had access to these critical systems and was able to issue radio commands to disable the alarms at four pumping stations and spoof the network address. Through those exploits, he executed a cyber-attack that caused a physical impact. Forensic analysis of the attack suggests that the third-party contractor exploited vulnerable SCADA systems and issued malicious commands without any actionable alarms or monitoring. The utility lacked basic cybersecurity policies, procedures, and systems to prevent such an attack. Notable among them, the water treatment plant's control systems lacked basic access controls defined in NIST SP 800-53. A subjective manual assessment was performed to show a required maturity to avoid or detect such an attack. For the purposes of this experiment, both soft and hard PGA analysis were used to acquire a desired maturity that would have prevented the attack.

Using the described approaches, ranks were determined and relative weights determined for the subdomains. The criteria are ranked by performing attack analysis based on the details of the cyberattack. In scenarios where criteria states are unchanged, those are ranked sequentially as per the NIST domain and sub-domain order. Identified ranks and relative weights determined through rank sum, reciprocal rank, rank exponent, and rank order centroid approaches are shown in Table 4 below.

TABLE 4

CSF Subdomain Ranks and Weights

|  | RANK | RS | RR | RE | ROC |
|---|---|---|---|---|---|
| Identify | | | | | |
| ID.AM | 7 | 0.062 | 0.038 | 0.067 | 0.056 |
| ID.BE | 19 | 0.018 | 0.014 | 0.0058 | 0.01 |
| ID.GV | 16 | 0.029 | 0.017 | 0.015 | 0.018 |
| ID.RA | 1 | 0.083 | 0.27 | 0.12 | 0.16 |
| ID.RM | 10 | 0.051 | 0.027 | 0.045 | 0.039 |
| ID.SC | 9 | 0.054 | 0.03 | 0.052 | 0.044 |
| Protect | | | | | |
| PR.AC | 2 | 0.08 | 0.13 | 0.11 | 0.12 |
| PR.AT | 20 | 0.015 | 0.013 | 0.0037 | 0.0081 |
| PR.DS | 17 | 0.025 | 0.016 | 0.011 | 0.015 |
| PR.IP | 8 | 0.058 | 0.034 | 0.059 | 0.05 |
| PR.MA | 5 | 0.069 | 0.054 | 0.084 | 0.072 |
| PR.PT | 11 | 0.047 | 0.024 | 0.039 | 0.035 |
| Detect | | | | | |
| DE.AE | 13 | 0.04 | 0.021 | 0.028 | 0.027 |
| DE.CM | 3 | 0.076 | 0.089 | 0.1 | 0.097 |
| DE.DP | 4 | 0.072 | 0.067 | 0.092 | 0.083 |
| Respond | | | | | |
| RS.AN | 18 | 0.022 | 0.015 | 0.0083 | 0.013 |
| RS.CO | 14 | 0.036 | 0.019 | 0.023 | 0.024 |
| RS.IM | 21 | 0.011 | 0.013 | 0.0021 | 0.0059 |
| RS.MI | 6 | 0.065 | 0.045 | 0.075 | 0.063 |
| RS.RP | 12 | 0.043 | 0.022 | 0.033 | 0.031 |
| Recover | | | | | |
| RC.CO | 15 | 0.033 | 0.018 | 0.019 | 0.021 |
| RC.IM | 23 | 0.0036 | 0.012 | 0.0002 | 0.0019 |
| RC.RP | 22 | 0.0072 | 0.012 | 0.0009 | 0.0039 |

The use of a particular method may depend on the purpose of the intended analysis (e.g., connecting the results to a financial investment decision or developing a risk calculation model). It is evident from Table 4 that the weight distribution pattern is fairly similar in all the methods across all criteria except the first ranked criteria. This difference may be significant depending on the use of this data. For example, if resource allocation is to be performed based on these weights, through the reciprocal rank approach, the highest ranked criteria (rank=1) demands over ~25% of resources.

1. PGA Soft Analysis

According to the PGA Soft formulation, the maturity of the water facility on which the attack was executed successfully was 57.5% (i.e., the number of controls that were at levels three or four); the maturity should be at 87.7% subject to the ranked order of criteria shown in Table 4. The goal of this experiment was to discover the ideal solution that can result in a maturity of 87.7% under the PGA Soft analysis.

Figure 6:
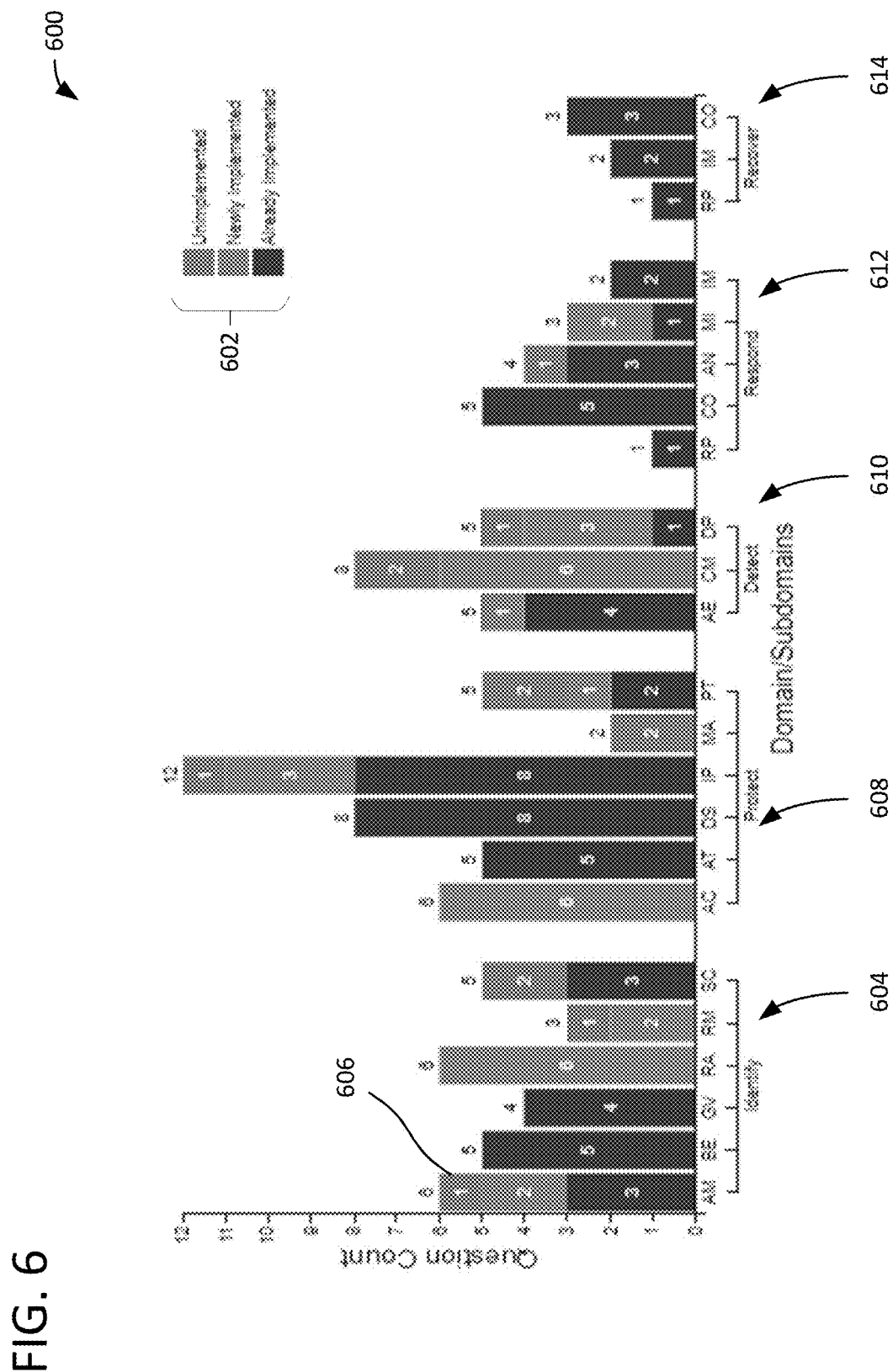
FIG. 6 is a stacked bar chart illustrating impacted controls for an example cybersecurity vulnerability mitigation using a PGA Soft approach.
Figure 7:
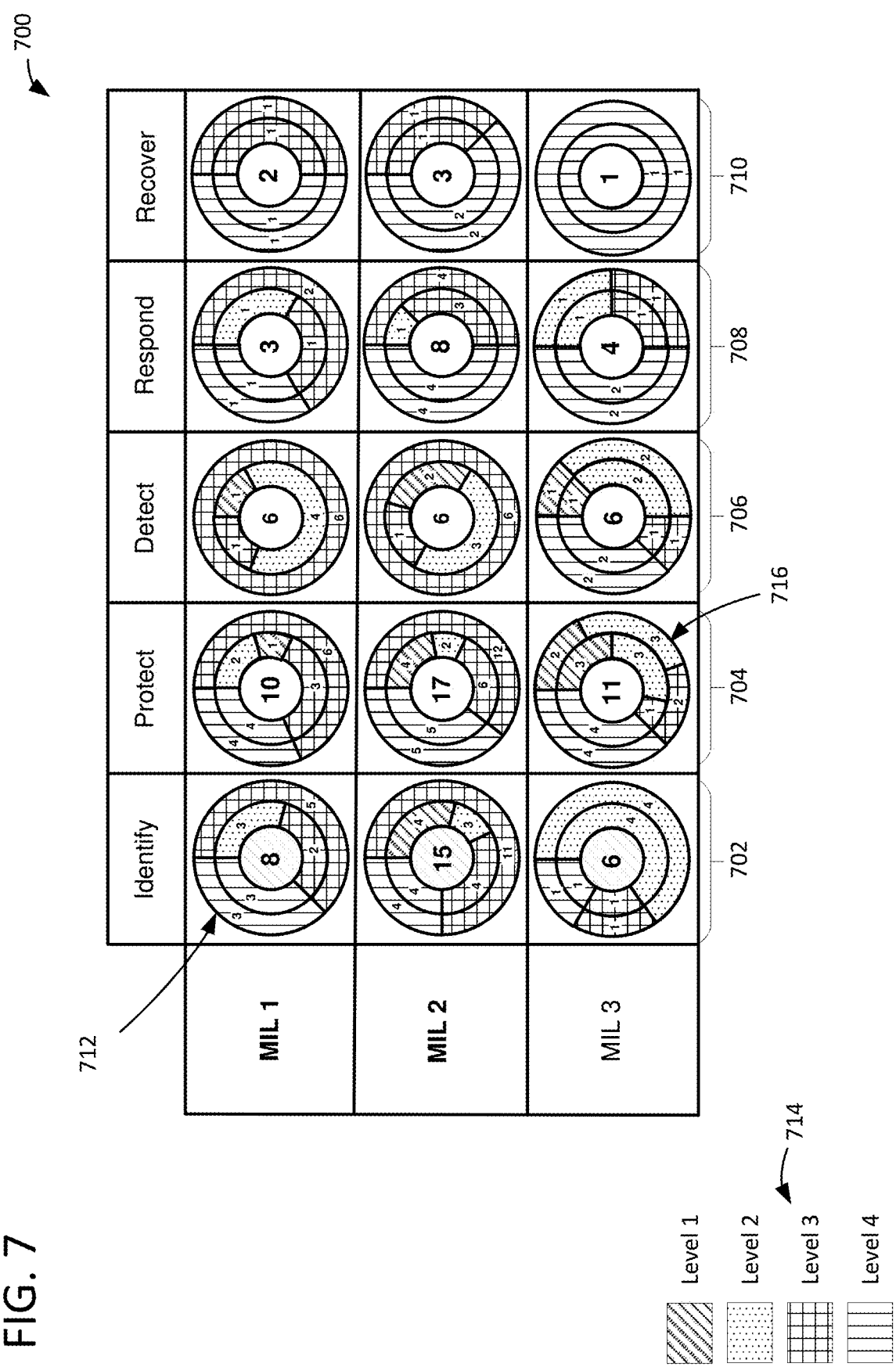
FIG. 7 is a data visualization illustrating a maturity-indicator-level (MIL)-based depiction of impacted controls for the PGA Soft approach illustrated in FIG. 6.
Figure 8:
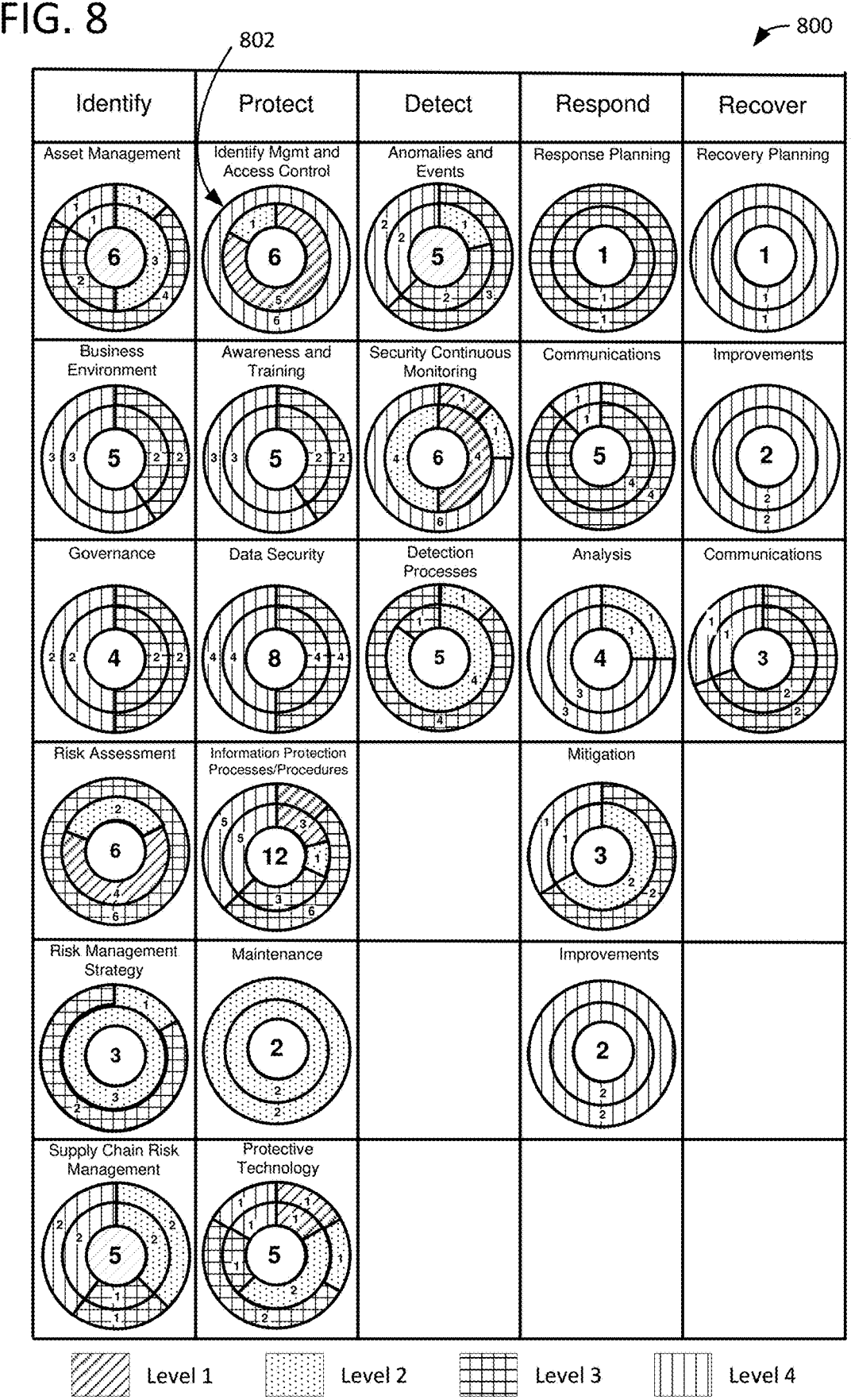
FIG. 8 is a data visualization illustrating a domain-wise depiction of impacted controls for the PGA Soft approach illustrated in FIGS. 6 and 7.

The PGA Soft analysis formulation was translated into a JavaScript-based web application. The application can have a user interface similar to that shown in FIG. 5. The results are shown in FIGS. 6-8. Following the proposed methodology, the highest WPS solution was analyzed, and detailed state changes of the controls were performed. FIG. 6 shows a stacked bar chart 600 of the state transitions of the controls affected in the discovered solution. Legend 602 illustrates, from top to bottom, unimplemented, newly implemented, and already implemented controls. Grouping 604 illustrates the controls for the "Identify" domain and its subdomains. For example, for stacked bar 606 "AM" (ID.AM), one control is unimplemented (top portion of stacked bar 606), two controls are newly implemented (middle portion of stacked bar 606), and three controls were already implemented (bottom portion of stacked bar 606). Similar information is provided for the other subdomains in grouping 604. Groupings 608, 610, 612, and 614 similarly illustrate unimplemented, newly implemented, and already implemented controls for the subdomains in "Protect," "Detect," "Respond," and "Recover," respectively.

Analyzing further at the criteria level, FIGS. 7 and 8 show the total number of controls affected per criteria and per MIL. FIG. 7 is a visualization 700 including a number of nested pie charts. The nested pie charts of group 702 illustrates the number of criteria that are affected for each MIL level (1-3) for the "Identify" domain. Similarly, groups 704, 706, 708, and 710 include nested pie charts illustrating affected criteria for the "Protect," "Detect," "Respond," and "Recover" domains, respectively. For example, in nested pie chart 712, the center circle indicates there are eight security controls of level MIL 1. The inner ring of nested pie chart 712 shows the base assessment for the eight controls with three controls at level four (left side arc segment), three controls at level two (right side arc segment) and two controls at level three (bottom arc segment). The outer ring of nested pie chart 712 shows the values of the eight controls for the solution discovered by the PGA Soft analysis with the three controls on the left still at level four, the two controls of the inner ring on the bottom still at level three, and the three controls of the inner ring at level two (on the right) now transitioned to level three such that the outer ring on the right shows five controls at level three for the solution.

The other nested pie charts in FIG. 7 can be similarly analyzed. Legend 714 illustrates the representation of the control levels. As another example, nested pie chart 716 of group 704 shows 11 controls. The inner ring illustrates three level one controls (upper right inner arc segment), three level two controls (lower right inner arc segment), one level three control (lower left inner arc segment), and four level four controls (upper left inner arc segments). The outer ring of nested pie chart 716 illustrates that in the solution, one level two control transitioned to level three and one level one control transitioned to level two. The level four controls remain unchanged.

FIG. 8 illustrates a data visualization 800 that is a subdomain-based depiction of impacted controls. (FIGS. 7 and 8 both illustrate the change in control levels from the base assessment to the discovered solution.) Nested pie chart 802, for example, illustrates that for the "Identity Management and Access Control" subdomain of the "Protect" domain, there are six controls (center circle) with one control initially being at level two and five controls initially being at level one. The outer ring shows that for the discovered solution, all six controls have transitioned to level three.

As expected, both the criteria rank and the level of effort that was represented by the total number of controls expected to change states were considered by the PGA Soft analysis algorithm when converging to the proposed solution with the desired maturity.

2. PGA Hard Analysis

Figure 9:
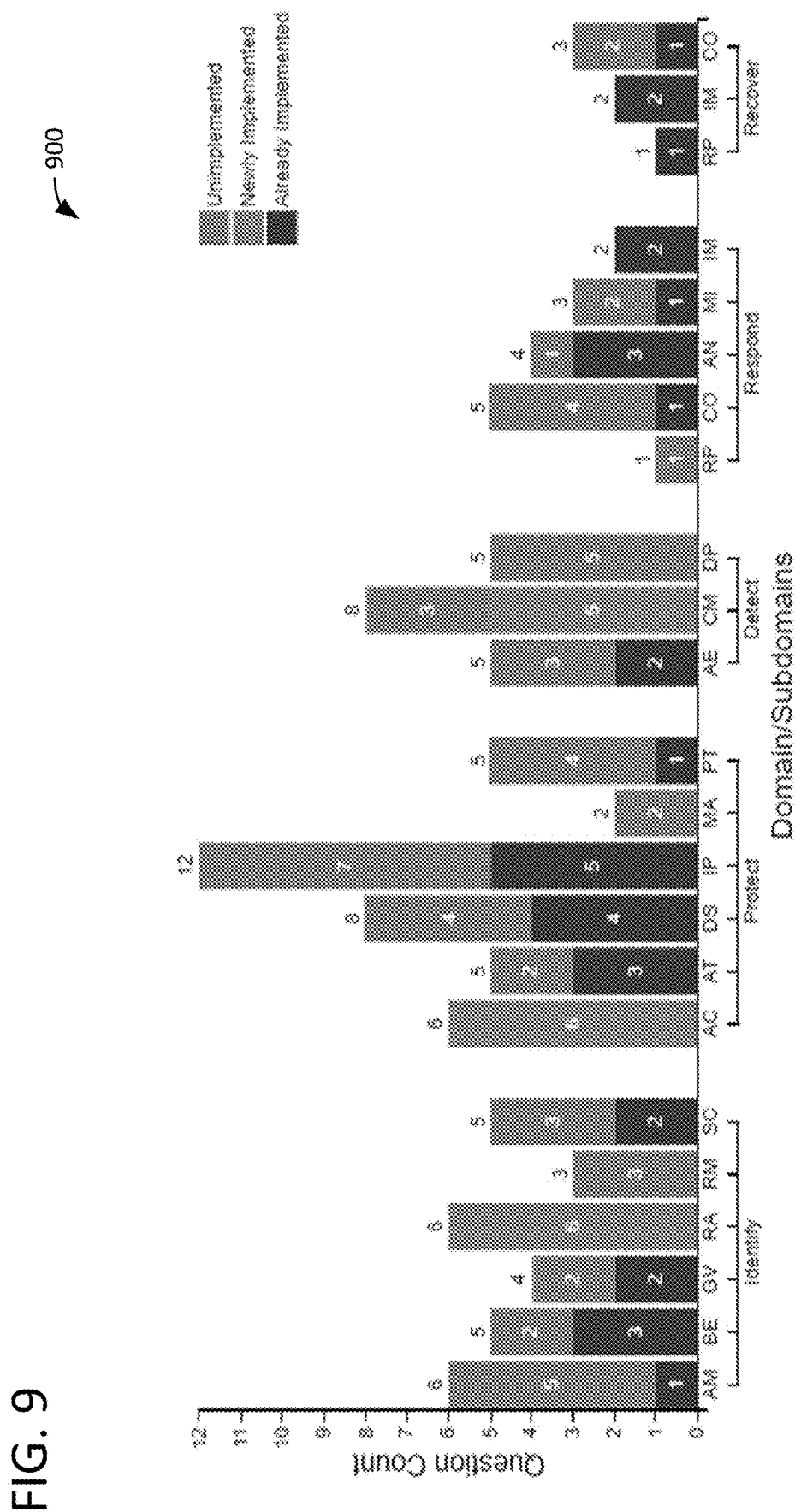
FIG. 9 is a stacked bar chart illustrating impacted controls for the example cybersecurity vulnerability mitigation illustrated in FIGS. 6-8 using a PGA Hard approach.
Figure 10:
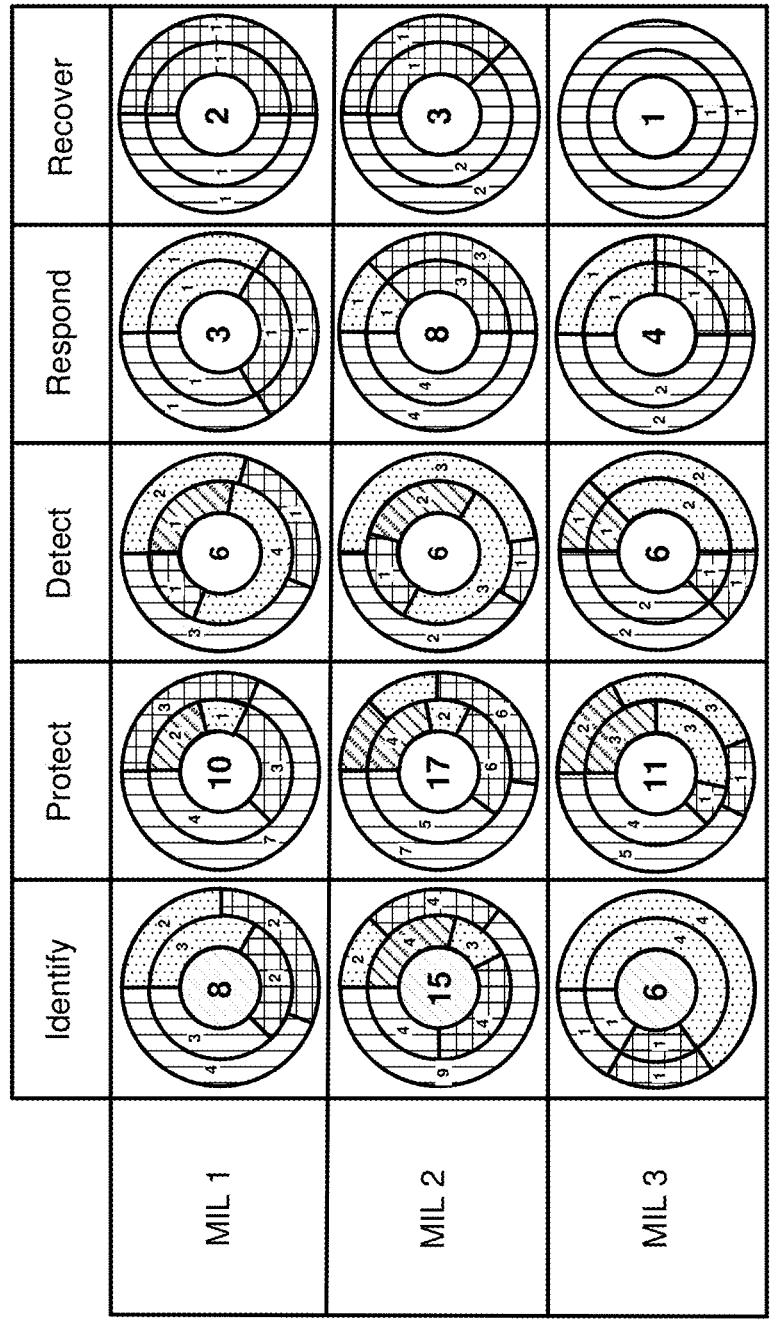
FIG. 10 is a data visualization illustrating a MIL-based depiction of impacted controls for the PGA Hard approach illustrated in FIG. 9.
Figure 11:
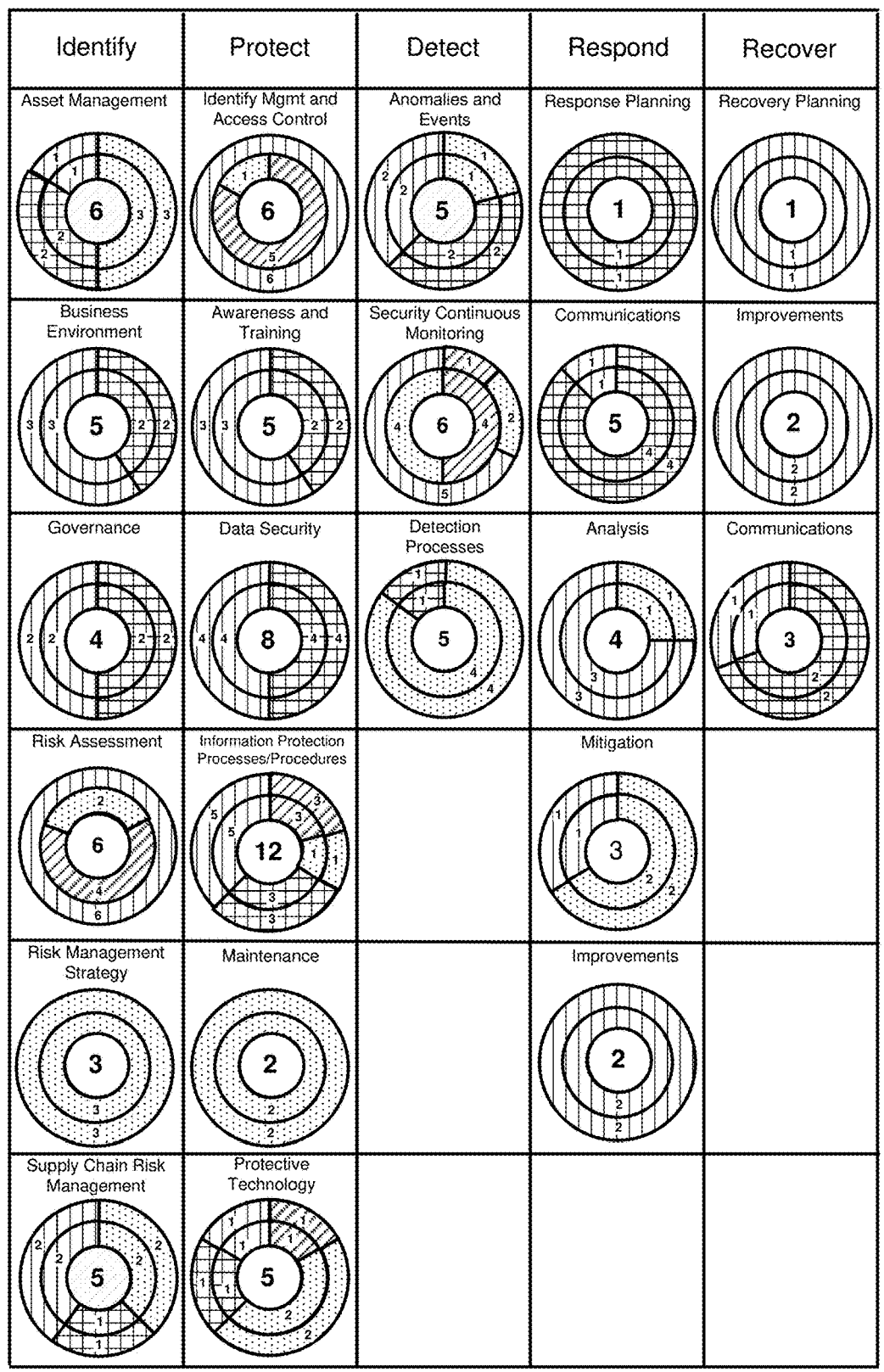
FIG. 11 is a data visualization illustrating a domain-wise depiction of impacted controls for the PGA Hard approach illustrated in FIGS. 9 and 10.

According to the PGA Hard formulation, the maturity of the water facility on which the attack was executed successfully was 32.1% (i.e., the number of controls that are level four); the maturity should be at 47.2% subject to the ranked order of criteria shown in FIG. 4. The goal of this experiment was to discover the ideal solution that can result in a maturity of 47.2% under the PGA Hard analysis. Following the proposed methodology, the highest WPS solution was analyzed, and detailed state changes of the controls are shown in FIGS. 9-11. FIG. 9 illustrates a stacked bar chart 900 for the PGA Hard analysis similar to stacked bar chart 600 for the PGA Soft analysis. FIG. 10 illustrates a data visualization 1000 that is a MIL-based depiction of control transitions for the domains (similar to FIG. 7). FIG. 11 illustrates a data visualization 1100 that is a subdomain-based depiction of control transitions for the domains (similar to FIG. 8).

Since the PGA Hard analysis was aggressive as compared to the PGA Soft analysis, it can be observed that no state changes happened for the Respond and Recover domains for the PGA Hard analysis. It is evident from FIG. 9 that a lower number of control transitions took place as compared to FIG. 6, but the transitioned controls reached maximum acquirable state (fully implemented).

It is clear that the PGA Soft analysis is not as aggressive and attempts to distribute the state changes across several controls. Therefore, an advantage of the PGA Soft algorithm is that it concentrates on a wide range of criteria and minimizes the risk of ignoring the criteria that are less important than the top few criteria. A drawback of PGA Soft is that it does not fully concentrate on forcing a criterion to reach an absolute highest state of maturity. Similarly, an advantage of the PGA Hard algorithm is that it concentrates on a small range of criteria with an aggressive and narrow approach to force the most important criteria to reach an absolute highest state of maturity. However, a drawback of the PGA Hard algorithm is that it strictly prohibits the concept of dilution or distribution of importance across the whole range increasing the risk of ignoring the criteria that are less important than the top few criteria.

Overall, the PGA Soft and PGA Hard analyses eliminate the entire process of subjective analysis while resulting in the same overall domain-level maturity as compared to subjective analysis. Therefore, adopting a solution discovered through PGA Soft or PGA Hard is objective, achievable, and supported by logical constructs, which eliminates flaws of subjective analysis such as human-errors, self-induced bias, and conflict of opinions. Since both PGA Soft and PGA Hard algorithms are executed through a software program, it is apparent that the time taken to discover and adopt a solution would be significantly less than a subjective approach where everything is required to perform through a manual process and through multi-party consensus. PGA analysis also eliminates the requirement to determine the weights of criteria to reflect their importance and criticality; this is often a requirement and a roadblock in a subjective analysis. Overall, PGA, which is an integral part of CyFEr, was shown to be significantly more efficient as compared to the subjective analysis.

III. Detailed Examples—Enhanced Prioritized Gap Analysis

As discussed above, enhanced prioritized gap analysis (EPGA) can be used when dependencies among security controls/subdomains are known. In some examples, a software application implementing the approaches discussed herein allows a user to select between PGA and EPGA (and hard or soft for each).

The digital transformation of the world has been on the rise due to the growing number of smart devices, precise high-speed sensors, and various classes of networked systems that are often referred to under the umbrella of Internet-of-Things (IoT). As part of the ongoing technological advancements, critical infrastructure facilities have been adopting networked smart devices (often referred to as Industrial IoT or IIoT) to streamline various activities, including autonomous control of industrial control systems (ICS), decentralized and advanced sensing, communication technologies, and integration of machine learning and artificial intelligence for precise data analytics. According to a statistical projection, the penetration of such smart devices across the global infrastructure is expected to grow from a current value of 26 billion devices to almost 75 billion devices by 2025. Following a similar trend, critical infrastructure automation systems are expected to grow between 11%-20% by 2022-2026. Such a rise in the use of networked smart devices is leading to an expanding cybersecurity threat landscape and the exacerbation of the emerging cyber threats and security challenges cannot be overstated.

In the present expanding cybersecurity threat landscape, in order for the critical infrastructure organizations to protect their network of smart devices, it is essential for them to assess their infrastructure's security posture and discover vulnerabilities. In order for them to do that effectively, the critical infrastructure owners should be equipped with reliable tools and applications, such as cybersecurity frameworks and maturity models, to assess their overall cybersecurity posture. Cybersecurity frameworks and maturity models have the ability to facilitate the organizational owners and operators to identify and protect their critical systems from evolving cyber threats while also detecting cyber intrusions that could cause disruption to operations. In addition, the organizations should be equipped with capabilities to respond and recover under a critical cyber event. All of these combined factors and processes will potentially enable an organization to perform risk-informed decisions with critical safeguards in place. The described examples demonstrate a methodology and tool that facilitate the critical infrastructure owners and operators to develop autonomous vulnerability mitigation strategies and associated policies in order to withstand and counter sustained cyber-attacks.

In order to address the many cybersecurity policy compliance challenges in the converged information technology (IT) and operational technology (OT) networks, researchers have attempted to create a variety of vulnerability assessment tools, methodologies, and frameworks. However, most of these methodologies address the challenges at a systems level for specific applications, and therefore lack scalability and adaptability. Among the plethora of cybersecurity tools and frameworks, the cybersecurity capability maturity model (C2M2) designed by the U.S. Department of Energy (DOE) and the cybersecurity framework (CSF) designed by the National institute of Standards and Technology (NIST) have gained a positive reputation. In addition, they do not appear to be as constrained as many of the other maturity model-based vulnerability assessment tools.

The core architectures of both CSF and C2M2 are designed so they can be adopted to any particular application that focuses primarily on compliance with cybersecurity policies, standards, and regulations. Although both C2M2 and CSF provide a detailed analysis of the identified cybersecurity vulnerabilities in a critical organization, they do not appear to have a mechanism that can be used by the critical infrastructure owners to prioritize and develop vulnerability mitigation plans and procedures. To address that challenge, the described examples set forth a novel quantitative prioritized vulnerability assessment mechanism and a web-based software application are developed to ingest the core critical elements of the CSF and provide an autonomous mitigation of cybersecurity vulnerabilities. This is achieved by coupling multi-criteria decision analysis (MCDA) techniques with weighted dependency structures.

One factor in cybersecurity research is the availability of data. Since the organizations seldom share findings, such as system and network vulnerabilities, developing machine learning applications and other adaptive software is challenging. Rank-weight methods combined with layered logical constructs have not been extensively used for cybersecurity vulnerability assessments.

In the described examples, the cybersecurity controls from CSF are combined with MCDA techniques and multi-tiered mathematical filters to perform a constrained security analysis. This process results in a hierarchical outcome that the critical infrastructure owners and operators can follow in order to mitigate cybersecurity vulnerabilities. Software applications implementing the approaches can be data agnostic, scalable, and can also be adopted to frameworks and methodologies beyond CSF.

The described examples combine quantitative ranking techniques with dependency structures to perform enhanced prioritized vulnerability mitigation. These novel mitigation processes presented in this paper are based on logical constructs and multi-tiered mathematical filters (discussed in later sections). The proposed framework can be used at the application-level, system-level, or organizational and management level. Therefore, it is compatible with several existing maturity and vulnerability analysis models, such as C2M2, CSF, RMF, CSET, NICE-CMM, CRI, CPI, ISM, and many more. The proposed framework can be thought of as having a three-part process: Part-1: design the dependency structures; Part 2: calculate the priority stages and masses; and Part-3: perform an EPGA. To construct the dependency trees, a mathematical relationship is defined across a set of complex cybersecurity controls that are grouped under a set of pre-defined criteria. The criteria are defined strictly based on the domains and subdomains depicted in the NIST CSF. After designing the dependency trees, the relative masses of the controls are calculated based on one of three methods: 1) relative mass-based calculation; 2) stage, maturity indicator level (MIL), relative mass-based calculation (MIL is a numerical designation associated with a cybersecurity control that defines the criticality, importance, complexity, and associated inter-dependencies of a cybersecurity control); or 3) MIL and relative mass-based calculation. Upon calculating the masses, EPGA is performed. In some examples, EPGA is an eight-step process that incorporates goal identification; rank-based criteria weight calculation; multi-constrained based solution filtration; enhanced present state factor, implementation state factor, and transition state factor calculation; performance score index determination; and weighted performance score calculation. The result is prioritized vulnerabilities to be mitigated in order to reach a targeted cybersecurity maturity.

The efficacy of the presented framework and methodology is demonstrated by testing against a major real-world cyber-attack that targeted critical infrastructure ICS and resulted in a significant loss of property.

Cybersecurity vulnerability assessments through maturity models involve analyzing a network, system, or facility through a set of security controls. The number of security controls can range from 100 to more than 500, depending on which tool or framework is used (e.g., C2M2, CSF, RMF). A comprehensive list of prioritized criteria is useful in order to determine the ideal cybersecurity posture; based on this complexity, the problem at hand is a MCDA problem. When using MCDA, specific weights are assigned to a set of criteria and then normalized to a scale of 1 or 100 before proceeding to the decision-making process. Such a subjective weighting process often adds more complexity to an already complex problem due to the ambiguity in how to assign weights to the criteria and how to choose weights for the individual criteria. This can be simplified by ranking the criteria. Rank-weight methods can be used to design a computational algorithm to use the ranks and calculate the relative weights.

The combination of rank-weight methods and MCDA techniques in cybersecurity vulnerability mitigation has not been explored by many researchers. Some attempts were able to perform relative risk estimation, but those attempts have certain limitations and gaps that restrict their scalability and the ability to use them towards vulnerability mitigation. For example, other methods assume a high-level set of organizational-level vulnerabilities and develop their formulation based on manual grading/scoring methods. Therefore, adopting them to application-level and system-level maturity models, such as the CSF and C2M2, with 100+ security controls is a herculean task. These other methods also do not facilitate the prioritization of the vulnerabilities to mitigate. Therefore, obtaining the overall organizational risk estimates may not fully facilitate the development of vulnerability mitigation plans. Further, due to the level of subjectivity associated with the methods, the end result has very minimal to no mathematical or data-driven support. Therefore, validating the outcomes of the approaches based on logical constructs may not be possible.

The nature of CSF is to categorize controls into three MILs. The C2M2 and CSF defines four MILs, MIL0 through MIL3, that apply independently to each of their domains. The MILs apply independently to each domain. As a result, an organization may be operating at different MIL ratings for different domains. For example, an organization could be operating at MIL1 in one domain, MIL2 in another domain, and MIL3 in a third domain. The MILs are cumulative within each domain. To earn a MIL in a domain, an organization must perform all of the practices in that level and its predecessor level(s). For example, an organization must perform all of the domain practices in MIL1 and MIL2 to achieve MIL2 in the domain. Similarly, the organization would have to perform all practices in MIL1, MIL2, and MIL3 to achieve MIL3. Establishing a target MIL for each domain is an effective strategy for using the C2M2 and CSF to guide cybersecurity program improvement. Organizations should become familiar with the practices in the C2M2 and CSF prior to determining target MILs. Gap analysis and improvement efforts should then focus on achieving those target levels. Practice performance and MIL achievement need to align with business objectives and the organization's cybersecurity strategy. Striving to achieve the highest MIL in all domains may not be optimal. Organizations should evaluate the costs of achieving a specific MIL against potential benefits.

C2M2 and CSF, however, do not define interconnected dependencies between those cybersecurity controls. The CSFs identify vulnerabilities, but do not provide an analysis to prioritize the vulnerabilities. The following discussion is focused on designing dependency trees for the control structure and connecting them to the EPGA core formulation. The overall CyFEr workflow, using EPGA rather than PGA, is illustrated in FIG. 12.

Figure 12:
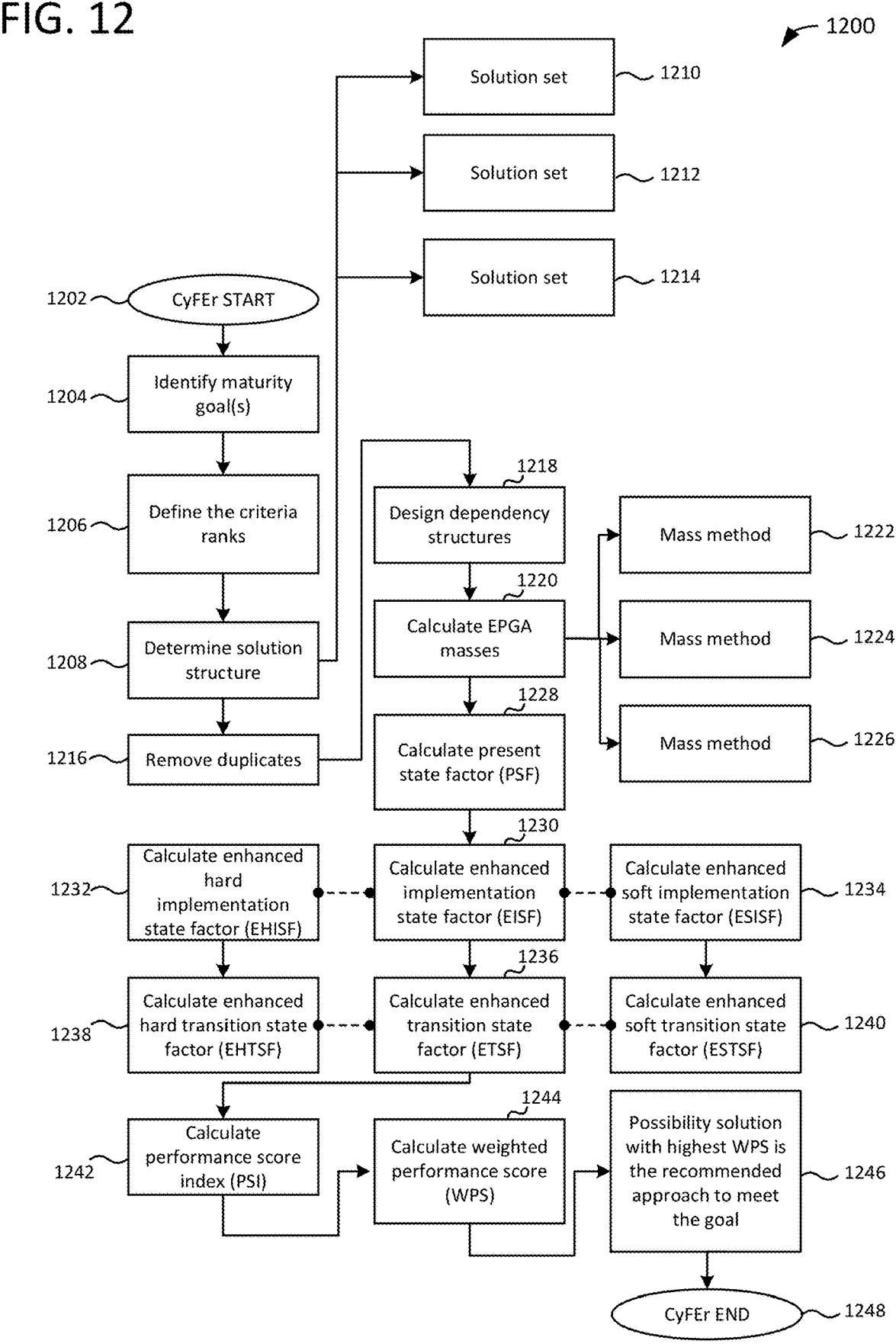
FIG. 12 is an example enhanced prioritized gap analysis (EPGA) approach.

FIG. 12 illustrates a method 1200 for mitigating cybersecurity vulnerabilities of a system. Method 1200 begins at process block 1202. In process block 1204, a base cybersecurity assessment is performed. In process block 1204, a cybersecurity maturity goal(s) is defined in terms of desired cybersecurity posture. In process block 1206, cybersecurity criteria are ranked (e.g., domains, subdomains, and/or security controls). Process blocks 1204 and 1206 can be performed by a user or can be selected based on predetermined user preferences or rules.

In process block 1208, CyFEr uses built-in filters (e.g., MIL level-based filters) in combination with any user-defined filters (e.g., cost, time, or other resource constraints) to identify the most relevant solutions based on the goals. The solutions are solution sets 1210, 1212, and 1214. In FIG. 12, CyFEr applies three filters. Upon acquiring the solutions from each filter, in process block 1216, CyFEr ensures that none of the solutions are repeated by running an internal process to remove duplicates.

Dependency structures are designed in process block 1218. Example details for designing dependency structures are discussed below. In process block 1220, EPGA masses are calculated. This can be done, for example, using built-in dependency structures, or the dependency structures can be defined by the user. The masses can be calculated in different ways, including methods 1222, 1224, and 1226. Once the masses are calculated in process block 1220, CyFEr computes the PSF in process block 1228. the enhanced implementation state factor (EISF) is calculated in process block 1230. In some examples, the EISF can either be hard or soft (similar to hard and soft with PGA) as indicated by dotted lines connecting process blocks 1232 and 1234. In process block 1236, an enhanced transition state factor (ETSF) is determined. As with EISF, ETSF can be either hard or soft, indicated by dotted lines connecting process blocks 1238 and 1240. A performance score index (PSI) is calculated in process block 1242, and a weighted performance score (WPS) is calculated in process block 1244. The discovered solution with the highest WPS is recommended to achieve the cybersecurity maturity goal. Process 1200 ends at process block 1248. Determination of PSF, EISF, ETSF, PSI, and WPS can be done similarly to the corresponding steps described with respect to the PGA approach.

During the ISF calculation, the user can choose from soft or hard methods. Based on the choice, CyFEr will perform soft or hard TSF. In some examples, the tool does not let user to mix soft and hard. For example, if ESISF is chosen, the tool automatically performs ESTSF as the next step.

A. Dependency Structures

A logical relationship can be defined across a set of complex cybersecurity controls through dependency structures. Design of dependency structures discussed below can correspond to process block 1218 of FIG. 12. To design the dependency structures, concepts of "set theory" are used where each subdomain (or criteria) is treated as a "set." In this scenario, the "objects of the set" are the "controls of the subdomain/criteria." Therefore, the mathematical construct is defined as follows:

Definition: The parent-child relationship between a set of security controls, $C_i$, in a criterion is irreflexive and asymmetric for those controls to form a logical, relative, and linear dependency structure.

Logical Construct: Let each subdomain be a set denoted as $C_i$, shown in Equation 22a, such that, $$C_i \in \{C_1, C_2, \ldots, C_n\} \tag{22a}$$

Let dependency relationships of intra subdomain controls be denoted by R, such that, in Equation 22b:

$$R \subset C_i \times C_j, S.T.\{C_i, C_j\} \in \{C_1, C_2, \ldots, C_n\} \tag{22b}$$

Equation 22b implies that R is a relation of $C_i$ and $C_j$. An example of R may look like: R={$(C_1,C_2)$, $(C_2,C_4)$, $(C_3,C_6)$, ... }. Therefore, R is a finite set of ordered pairs of the form, $(C_1,C_2)$, where, $(C_1,C_2) \in \{C_i,C_j\}$, where $C_1$=Child Control and $C_2$=Parent Control. Based on the above analysis, the dependency relationship can be expressed as:

1. Irreflexive: For every element, $C_1 \in C_i$, $(C_1,C_1) \notin R$
2. Asymmetric: For all $C_1, C_2 \in C_i$, if $(C_1,C_2) \in R$, then $(C_2,C_1) \notin R$ and $(C_1,C_1) \notin R$.

Based on the above definition and hypothesis, the relationships between the security controls of CSF are established pertaining to the below constraints:

1. The MIL of a parent security control should be greater than or equal to the MIL of their respective child security controls. Therefore, MIL3 security controls are qualified to be parents to the security controls that belong to MIL3, MIL2, and MIL1. This relationship is maintained across the security controls that belong to all the MILs. This is illustrated in Equations 22c and 22d.

$$C_i^{MILa} \rightarrow C_j^{MILb}, S.T \; a \leq b; \tag{22c}$$

$$\Rightarrow C_i^{MIL3} \rightarrow \begin{cases} C_j^{MIL3} \\ C_k^{MIL2} \\ C_m^{MIL1} \end{cases}; C_i^{MIL2} \rightarrow \begin{cases} C_k^{MIL2} \\ C_m^{MIL1} \end{cases}; C_i^{MIL1} \rightarrow \{C_m^{MIL1} \tag{22d}$$

" $\rightarrow$ " indicated parent to

2. The relationship between parent controls and their child controls is based on one requirement—child controls are the absolute pre-requisites of the parent controls. The term "absolute pre-requisites" indicate that without mitigating the security vulnerabilities related to the child controls, the security vulnerabilities associated with the parent control cannot be mitigated.

3. MILs & stages are mutually exclusive. I.e., a control can reside at a stage regardless of its MIL and dependencies.

B. Priority Stages and Relative Masses

Once the dependency trees are established across all of the CSF criteria, the relative masses of the security controls can be determined. The approach to determining relative masses detailed below can be performed in process block 1220 of FIG. 12.

The relative masses of the security controls can be calculated based on one of the three methods shown in this section (or other methods). To calculate the relative masses, a relative base mass that is valid for all the controls is defined. In conjunction with the already defined scale of MILs (i.e., MIL1, 2, and 3), the relative base masses (denoted as base) are defined as below in Equation 23:

$$C_{i|MIL1}{}^{base}=0.1; C_{i|MIL2}{}^{base}=0.2; C_{i|MIL3}{}^{base}=0.3; \qquad (23)$$

The base masses, MIL value, and stage of the control are used to calculate the relative mass of the control through one of the below methods. Here, the term stage is defined as the total number of child layers leading to a parent control. For example, in the dependency structure $C_a \to C_b \to C_c$, the total number of stages associated with $C_b$ are one and the total number of stages associated with $C_c$ are two.

Method 1: The relative mass of a control, $C_i$, is $C_i^{mass}$; this can be obtained by the summation of masses of the dependencies and the base mass of the control, $C_i$, as shown in Equation 24.

$$C_i^{mass} = C_i^{base} + \sum_{k=1}^{n} C_k^{mass} \qquad (24)$$

Method 2: The relative mass of a control, $C_i$, is $C_i^{mass}$; this can be obtained by the summation of masses of dependencies and the product of base mass and the stage-MIL factor of the control, $C_i$, as shown in Equation 25a.

$$C_i^{mass} = \left(C_i^{base} \times C_i^{stage-MIL}\right) + \sum_{k=1}^{n} C_k^{mass} \qquad (25a)$$

The stage-MIL factor of $C_i$ is shown in Equations 25b and 25c:

$$C_i^{stage-MIL} = \qquad (25b)$$

$$C_i^{stage} + C_i^{MIL} \Rightarrow C_i^{mass} = (C_i^{base} \times \{C_i^{stage} + C_i^{MIL}\}) + \sum_{k=1}^{n} C_k^{mass}$$

where $$C_k^{mass} = (C_k^{base} \times \{C_k^{stage} + C_k^{MIL}\}) \qquad (25c)$$

Method 3: The relative mass of a control, $C_i$, is $C_i^{mass}$: this can be obtained by the summation of mass of the dependencies and the product of base mass and MIL of the control, $C_i$, as shown in Equations 26a and 26b.

$$C_i^{mass} = (C_i^{base} \times C_i^{MIL}) + \sum_{k=1}^{n} C_k^{mass} \qquad (26a)$$

where $$C_k^{mass} = (C_k^{base} \times C_k^{MIL}) \qquad (26b)$$

where:
$C_i^{mass}$ is the mass of the parent control $Q_i$,
$C_i^{base}$ is the base mass of the parent control $Q_i$,
$C_i^{stage}$ is the stage at which the parent control $Q_i$,
$C_i^{MIL}$ is the MIL at which the parent control $Q_i$,
$C_k^{mass}$ is the mass of the child control $k \in \{1, 2, \ldots, n\}$,
$C_k^{base}$ is the base mass of the child control $k$,
$C_k^{stage}$ is the stage of the child control $k$,
$C_k^{MIL}$ is the MIL of the child control $k$.

In the above approach, note that the children (dependencies) and the respective parent controls are not at the same stage.

C. EPGA Formulation

The core formulation of EPGA can be implemented and executed following a pre-defined sequence of steps that are coupled with the dependency structures and relative masses calculated in the previous sections. The following sequence of steps demonstrates an example core formulation of EPGA.

1. Identify the Goal(s)

The first step in the analysis is to identify the goal(s) of the analysis. An example of the desired state can be as simple as "given the current state at 50% maturity (Note: Any control that is in state 3 or 4 (largely or fully implemented) is typically considered to be a mature control), the final posture or desired state should be at 70% maturity."

2. Define the Criteria Ranks

In the presented framework, the weight of each criterion is determined using the rank-weight formulation defined by Equations 27a-27d.

For the rank sum approach, for n number of criteria, the normalized weight $W_{i|norm}^{RS}$ of criteria i of rank r is given by Equation 27a:

$$W_{i|norm}^{RS} = \frac{2(n - r + 1)}{n(n+1)} \qquad (27a)$$

For the reciprocal rank approach, for n number of criteria, the normalized weight $W_{i|norm}^{RR}$ of criteria i of rank r is given by Equation 27b:

$$W_{i|norm}^{RR} = \frac{(1/r_i)}{\sum_{j=1}^{n} (1/r_j)} \qquad (27b)$$

For the rank exponent approach, for n number of criteria, the normalized weight $W_{i|norm}^{RE}$ of criteria i of rank r is given by Equation 27c:

$$W_{i|norm}^{RE} = \frac{(n - r_i + 1)^p}{\sum_{j=1}^{n}(n - r_j + 1)^p} \qquad (27c)$$

$$\Rightarrow W_{i|norm}^{RE} = \frac{\begin{cases} (n - r_i + 1)^p, & \forall p \in (0,1) \land (1,\infty) \Rightarrow \\ & \forall p \in (0, \infty) \,\&\, p \neq 0, 1, \infty \\ 1 & \text{if } p = 0 \\ \text{Rank Sum} & \text{if } p = 1 \end{cases}}{\sum_{j=1}^{n}(n - r_j + 1)^p}$$

For the rank order centroid approach, for n number of criteria, the normalized weight $W_{i|norm}^{ROC}$ of criteria i of rank r is given by Equation 27d:

$$W_{i|norm}^{ROC} = \frac{1}{n} \sum_{j=i}^{n} \frac{1}{r_j} \qquad (27d)$$

Note that the summation of normalized weights of all criteria is always equal to 1. Therefore, Equations 27a will abide by the following constraint:

$$\sum_{i=1}^{n} W_{i|norm}^{\alpha} = 1, \; \alpha \in \{RS, RR, RE, ROC\} \qquad (27e)$$

The normalized relative weights computed in Equations 27a through 27e are used to identify potential solution(s) that will result in a desired cybersecurity posture.

$$RW_{net} = \begin{cases} \sum_{k=1}^{p} Criteria_{RW}^{k}; & \text{if } Criteria_{num} > 1 \\ 1; & \text{if } Criteria_{num} = 1 \end{cases} \quad (28a)$$

such that $$RW_{net} = 1 \quad (28b)$$

where
$Criteria_{RS}^{k}$=RW value of criteria k; $0 \leq k \leq 1$
$Criteria_{num}$=Total number of criteria In Equations 28a and 28b, for a single criterion, RW value=$RW_{net}$=1; for multiple criteria, the RW values should be defined for each criterion such that $RW_{net}$=1.

In addition to the above rank-weight methods, other rank-weight methods can also be used.

3. Determine Solution Structure

This portion is further divided into two parts. The first part focuses on developing the sequential structure ($M_S$) that encapsulates all the controls of the vulnerability assessment framework. For example, the NIST Cybersecurity Framework has five domains, 23 subdomains, and 106 controls. $M_S$ therefore includes five elements, with each element representing a domain-structure. Each element of those domain-structures represents a subdomain-structure. Each subdomain-structure is denoted as $PS_j$ (mat($t_{1|2|3}m_{i|2|3}$)), in which $PS_j$ represents a particular subdomain, $S_j$, in domain P; mat($t_{1|2|3}m_{1|2|3}$) represents an N×M structure (N: total stages exists in subdomain; M: total MILs exists in subdomain), in which each element represents the total number of controls that falls into a particular stage and that belongs to a particular MIL. For example, an element in that shows $t_1m_1$ would be the total number of controls that are MIL1 residing in the first stage for subdomain $S_j$ in domain P.

The second part focuses on using possibility generation (permutations) techniques to discover all the converged solutions that attempt to reach the desired cybersecurity state (goal). Constraint-based filtration can be used to eliminate unwanted solutions. With a base state of 0% maturity, there are over ~$2^{32}$ possible solutions. Through testing, the total number of constrains were narrowed down to three, and solution sets were generated for those three constrains. The algorithm that encapsulates all three constraints is shown in Tables 5 and 6. The algorithm in Tables 5 and 6 loops through the sequential structure ($M_S$) to call each constraint as functions to discover the solution sets.

Constraint-1 (Solution Set-1): Given a desired end state of x % maturity, all the possible solutions that show x % of desired maturity being acquired in subdomains (criteria) should be discovered and grouped in the ranked order and in the order of lowest MIL control (MIL1) to highest MIL control (MIL3) until the overall maturity is achieved at x %.

Constraint-2 (Solution Set-2): Given a desired end state of x % maturity, all the possible solutions that indicate up to 100% of each MIL control being achieved at either a state-3 or state-4 should be discovered and grouped in the order of ranked criteria until the overall maturity is x %.

Constraint-3 (Solution Set-3): Given a desired end state of x % maturity, all the possible solutions that indicate up to 100% of controls being achieved at either a state-3 or state-4 should be discovered and grouped in the order of ranked criteria and in the order of MIL (MIL1→MIL2→MIL3) per criteria until the overall maturity is x %.

TABLE 5

Solution Structure Determination Part 1

01: form structural matrix $M_S$
02: for $M_S$
03:   call function method1( ) → $S_1$
04:   call function method2( ) → $S_2$
05:   call function method3( ) → $S_3$
06: end for 07: compute final solution set → $S_{final} = \bigcup_{i=1}^{n} S_i$, here $n = 3$ 08: function method1( ) { //function method1( ) start
09:   new solution s appended to new final solution set → $s \in S_1^{future}$
10:   if new solution is not in current final solution set, S.T → $s \notin S_1^{present}$
11:     while current maturity ≤ desired maturity → $M_{net} \leq x\%$
12:       for a criterion in a prioritized ranked criteria order
          for $C_i$, $\forall C_i \in \{C_{Total}^{Ranked}\}$, where $C_{Total}^{Ranked} = \{C_1, C_2, \ldots, C_i, \ldots, C_n\}$; n = 23
13:         while current maturity ≤ desired maturity → $M_i^{net} \leq x\%$
14:           move mil1 controls to li or fi → $\forall Q_n^{MIL1}, Q_i^{MIL1} \to S_{\{3\|4\}}$
15:           then, move mil2 controls to li or fi → $\forall Q_n^{MIL1}, Q_i^{MIL2} \to S_{\{3\|4\}}$
16:           then, move mil3 controls to li or fi → $\forall Q_n^{MIL1}, Q_i^{MIL3} \to S_{\{3\|4\}}$
17:         end while
18:         criteria++ //go to next criteria
19:       end for
20:     end while
21:   return final solution set from method1 → $S_1$ }  //function method1( ) end
22: function method2( ) { //function method2( ) start
23:   new solution s appended to new final solution set → $s \in S_2^{future}$
24:   if new solution is not in current final solution set, S.T → $s \notin S_2^{present}$
25:     while current maturity ≤ desired maturity → $M_{net} \leq x\%$
26:       for a criterion in a prioritized ranked criteria order →
          for $C_i$, $\forall C_i \in \{C_{Total}^{Ranked}\}$, where $C_{Total}^{Ranked} = \{C_1, C_2, \ldots, C_i, \ldots, C_n\}$; n = 23

TABLE 6

Solution Structure Determination Part 2

```
27:         move mil1 controls to li or fi → ∀Q_n^{MIL1}, Q_i^{MIL1} → S_{{3||4}}
28:         criteria++ //go to next criteria
29:       end for
30:       for a criterion in a prioritized ranked criteria order →
            for C_i, ∀C_i ∈ {C_{Total}^{Ranked} }, where C_{Total}^{Ranked} =
            {C_1, C_2, . . . , C_i, . . . , C_n}; n = 23
31:         move mil1 controls to li or fi → ∀Q_n^{MIL2}, Q_i^{MIL2} → S_{{3||4}}
32:         criteria++ //go to next criteria
33:       end for
34:       for a criterion in a prioritized ranked criteria order →
            for C_i, ∀C_i ∈ {C_{Total}^{Ranked} }, where C_{Total}^{Ranked} =
            {C_1, C_2, . . . , C_i, . . . , C_n}; n = 23
35:         move mil1 controls to li or fi → ∀Q_n^{MIL3}, Q_i^{MIL3} → S_{{3||4}}
36:         criteria++ //go to next criteria
37:       end for
38:     end while
39:   return final solution set from method2 → S_2 } //function method2( )
      end
40: function method3( ) { //function method3( ) start
41:   new solutions s appended to new final solution set → s ∈ S_3^{future}
42:   if new solution is not in current final solution set, S.T → s ∉ S_3^{present}
43:     while current maturity ≤ desired maturity → M_{net} ≤ x%
44:       for a criterion in a prioritized ranked criteria order
            for C_i, ∀C_i ∈ {C_{Total}^{Ranked} }, where C_{Total}^{Ranked} =
            {C_1, C_2, . . . , C_i, . . . , C_n}; n = 23
45:         move mil1 controls to li or fi → ∀Q_n^{MIL1}, Q_i^{MIL1} → S_{{3||4}}
46:         move mil1 controls to li or fi → ∀Q_n^{MIL2}, Q_i^{MIL2} → S_{{3||4}}
47:         move mil1 controls to li or fi → ∀Q_n^{MIL3}, Q_i^{MIL3} → S_{{3||4}}
48:         criteria++
49:       end for
50:     end while
51: return final solution set from method3 → S_3 } //function method3( )
    end
```

Figure 13:
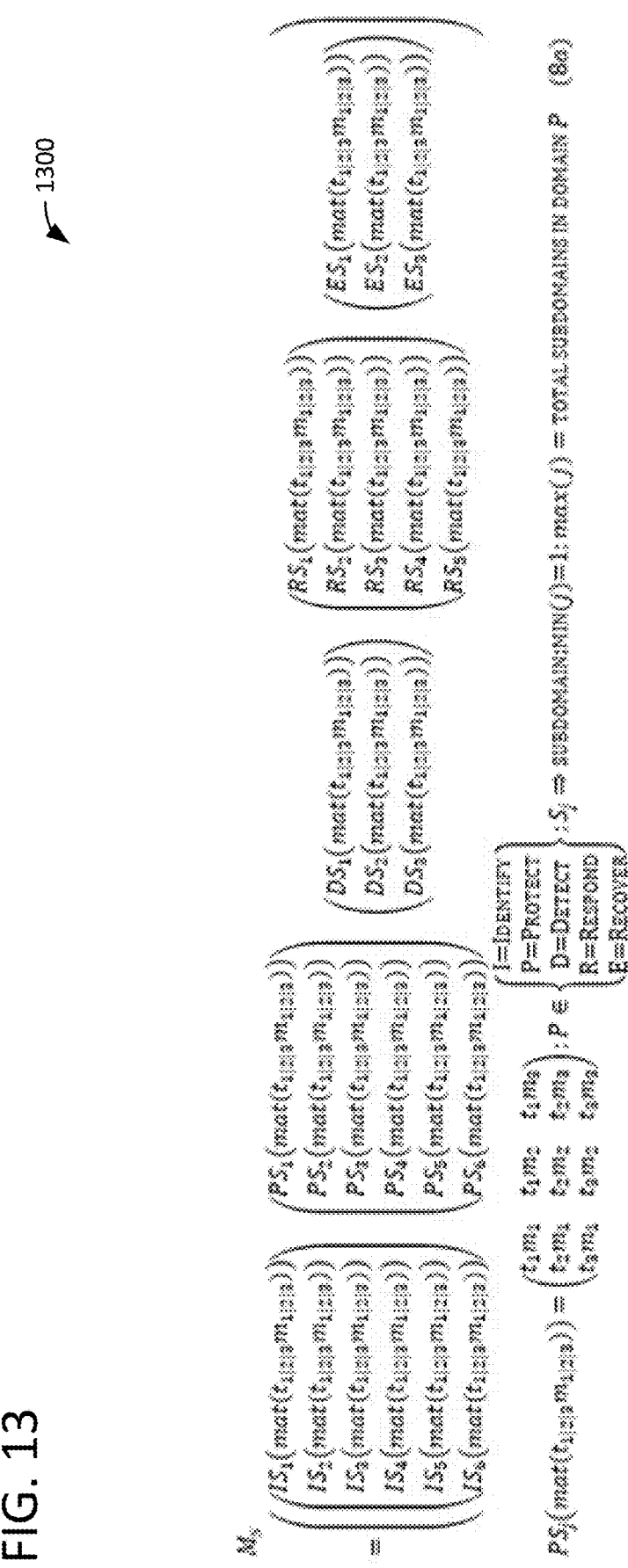
FIG. 13 is an example solution structure.

An example solution structure, $M_S$, is shown by structure 1300 in FIG. 13. Once the three solution sets are discovered and grouped in their respective families, the algorithm will check for duplicates, eliminate the duplicates, and create a final solution set, $S_{final}$. This final solution set, $S_{final}$, is the union of all the three solution sets, as indicated in equation (8b).

$$S_{final} = \bigcup_{i=1}^{n} S_i, \text{ here } n = 3 \qquad (29)$$

4. Calculate the Enhanced Present State Factor

Now that a desired and potential solution set is discovered and obtained ($S_{final}$), the enhanced present state factor (EPSF) can be computed for the baseline (current cybersecurity maturity or posture). EPSF of the controls, subdomains (criteria), domains, and for the overall baseline is calculated through Equations 30a, 30b, 30c, and 30d. To start with, EPSF for a control i can be calculated in Equation 30a as:

$$EPSF_i = C_i^{mass} \times C_u^{(Pstate)} \qquad (30a)$$

Following the three methods (M1, M2, M3 in Equations 24-26b) of relative mass calculation, the above equation can be written as:

$$EPSF_i^{M1} = \left( C_i^{base} + \sum_{k=1}^{n} C_k^{mass} \right) \times C^{(Pstate)} \qquad (30b)$$

$$EPSF_i^{M2} = \left( \left( C_i^{base} \times \{C_i^{stage} + C_i^{MIL}\} \right) + \sum_{k=1}^{n} C_k^{mass} \right) \times C_i^{(Pstate)} \qquad (30c)$$

$$EPSF_i^{M3} = \left( \left( C_i^{base} \times C_i^{MIL} \right) + \sum_{k=1}^{n} C_k^{mass} \right) \times C_i^{(Pstate)} \qquad (30d)$$

where
mil ∈ {1, 2, 3}; state ∈ {1, 2, 3, 4};
$C_i^{mil}$ = Maturity Indicator Level of a control
$C_i^{(Pstate)}$ = Present (chosen) state of a control
$EPSF_i$ = EPSF for the control i and and i ∈ {1, 2, . . . , n}

5. Enhanced Implementation State Factor

This portion focuses on the calculation of the enhanced implementation state factor (EISF) for each solution candidate. EISF is divided into soft enhanced implementation state factor (SEISF) and hard enhanced implementation state factor (HEISF). For a security control i, the EISF is the product of mass of the security control and its state. If a control is at $3^{rd}$ or $4^{th}$ state, that control is already at the final state; therefore, zero jumps and SEISF is equal to 0. This is shown in Equation 31a. HEISF is the sum of relative mass value of each control multiplied by the current state of control of solution s. If a control is at $4^{th}$ state (this is the main difference between SEISF and HEISF), that control is at the final state; therefore, zero jumps. Thus, HISF is equal to 0. These relationships are shown in Equation 31b.

$$[\xi]EISF_i^s = \begin{cases} C_i^{mass} \times C_{i|state}^s; & \text{if } C_i^{(Pstate)} < \delta \\ 0; & \text{if } C_i^{(Pstate)} \geq \delta \end{cases} \qquad (31a)$$

$$\xi = \begin{cases} S, & \text{for Soft} \\ H, & \text{for Hard} \end{cases} \text{ and } \delta = \begin{cases} 3, & \text{for } \xi = S \\ 4, & \text{for } \xi = H \end{cases} \qquad (31b)$$

Following the three methods (M1, M2, M3) of relative mass calculation, Equations 31a and 31b can be rewritten as Equations 31c, 31d, and 31e:

$$[\xi]EISF_i^{s|M1} = \begin{cases} \left( C_i^{base} + \sum_{k=1}^{n} C_k^{mass} \right) \times C_{i|state}^s; & \text{if } C_i^{(Pstate)} < \delta \\ 0; & \text{if } C_i^{(Pstate)} \geq \delta \end{cases} \qquad (31c)$$

$$[\xi]EISF_i^{s|M2} = \begin{cases} \left( \left( C_i^{base} \times \{C_i^{stage} + C_i^{MIL}\} \right) + \sum_{k=1}^{n} C_k^{mass} \right) \times C_{i|state}^s; & \text{if } C_i^{(Pstate)} < \delta \\ 0; & \text{if } C_i^{(Pstate)} \geq \delta \end{cases} \qquad (31d)$$

$$[\xi]EISF_i^{s|M3} = \begin{cases} \left( \left( C_i^{base} + C_i^{MIL} \right) + \sum_{k=1}^{n} C_k^{mass} \right) \times C_{i|state}^s; & \text{if } C_i^{(Pstate)} < \delta \\ 0; & \text{if } C_i^{(Pstate)} \geq \delta \end{cases} \qquad (31e)$$

6. Calculate the Enhanced Transition State Factor

Enhanced transition state factor (ETSF) indicates the quantitative effort to transition from a base state (or present state) to a new (or potentially desired) state. ETSF is divided into soft enhanced transition state factor (SETSF) and hard enhanced transition state factor (HETSF). For a security control, i, the SETSF is calculated using SEISF; HETSF is calculated using HEISF.

$$\{\xi\}ETSF_i^s = \{\xi\}EISF_i^s - EPSF_i \tag{32a}$$

where $$\xi = \begin{cases} S, & \text{for Soft} \\ H, & \text{for Hard} \end{cases} \text{ and } \delta = \begin{cases} 3, & \text{for } \xi = S \\ 4, & \text{for } \xi = H \end{cases} \tag{32b}$$

$$\{\xi\}EISF_i^s = \left\{ \begin{cases} C_i^{mass} \times C_{i|state}^s; & \text{if } C_i^{(Pstate)} < \delta \\ 0; & \text{if } C_i^{(Pstate)} \geq \delta \end{cases} \right\} - \left( C_i^{mass} \times C_i^{(Pstate)} \right) \tag{32c}$$

Following the three methods (M1, M2, M3) of relative mass calculation, Equation 32c can be written as Equations 32d, 32e, and 32f:

$$\{\xi\}EISF_i^{s|M1} = \left( \left\{ \begin{cases} \left( C_i^{base} + \sum_{k=1}^{n} C_k^{mass} \right) \times C_{i|state}^s; & \text{if } C_i^{(Pstate)} < \delta \\ 0; & \text{if } C_i^{(Pstate)} \geq \delta \end{cases} \right\} - \left( \left( C_i^{base} + \sum_{k=1}^{n} C_k^{mass} \right) \times C_i^{(Pstate)} \right) \right) \tag{32d}$$

$$\{\xi\}EISF_i^{s|M2} = \left( \left\{ \begin{cases} \left( C_i^{base} \times \{C_i^{stage} + C_i^{MIL}\} \right) + \\ \sum_{k=1}^{n} C_k^{mass} \end{cases} \right\} \times C_{i|state}^s; & \text{if } C_i^{(Pstate)} < \delta \\ 0; & \text{if } C_i^{(Pstate)} \geq \delta \end{cases} \right\} - \left( \left( C_i^{base} \times \{C_i^{stage} + C_i^{MIL}\} \right) + \sum_{k=1}^{n} C_k^{mass} \right) \times C_i^{(Pstate)} \right) \tag{32e}$$

$$\{\xi\}EISF_i^{s|M3} = \left( \left\{ \begin{cases} \left( (C_i^{base} \times C_i^{MIL}) + \sum_{k=1}^{n} C_k^{mass} \right) \times C_{i|state}^s; & \text{if } C_i^{(Pstate)} < \delta \\ 0; & \text{if } C_i^{(Pstate)} \geq \delta \end{cases} \right\} - \left( \left( (C_i^{base} \times C_i^{MIL}) + \sum_{k=1}^{n} C_k^{mass} \right) \times C_i^{(Pstate)} \right) \right) \tag{32f}$$

7. Calculate Performance Score Index

This portion uses the criteria rankings calculated in part two. Once the criteria rates are determined, the performance score indices (PSI) for each solution s can be calculated. PSI is a relative value (i.e., the smallest PSI is always 1 and the largest PSI is the number of constrain-based solutions discovered). As an example, Equation 29 results in a total number of solutions that is equal to the length of $S_{final}$. The PSI for a criteria per solution is assigned relative to PSI for the same criteria across the remaining solutions. Therefore, the PSI calculation and its range can be depicted as shown in Equation 33a. According to Equation 33a, PSI is an integer and its value for a particular TSF of solution s pertaining to a criteria c holds a linear relative dependency. Thus, the PSI value is equal to the relative state of ETSF for solution s relating to criteria c.

$$PSI(ETSF_c^s) \rightarrow \begin{cases} \exists ETSF_c^s \in ZPSI(ETSF_c^s); & PSI \in \{1, \ldots, \text{len}(S_{final})\} \\ PSI_{max} = \text{len}(S_{final}); & (ETSF_c^s)_{high} \\ PSI_{min} = 1; & (ETSF_c^s)_{low} \end{cases} \tag{33a}$$

Note that all the discovered solutions will have the same cybersecurity posture of x %, which was as defined in the "goal" or desired maturity. For a criterion, the PSIs of the discovered solutions are based on the transition factor (separately using hard factor and soft factor). Therefore, the PSI of a solution of a criterion (note that the criteria=subdomain) depends on the transition state factor of that particular solution for that criteria (subdomain). This relationship is shown in Equation 33b:

$$PSI_{sub}^s \alpha ETSF_{sub}^s \tag{33b}$$

Therefore, a higher ETSF means a higher PSI and a lower TSF means a lower PSI (e.g., for three solutions, if $S_1$ has highest ETSF and $S_3$ has lowest ETSF, the PSI of $S_1$ is 3, $S_2$ is 2, and $S_3$ is 1).

8. Calculate Weighted Performance Score

The weighted performance score (WPS) is a scalar factor that is calculated using the PSI and the rank-weights (RW) obtained in part two. Equation 34 illustrates WPS:

$$WPS_s = \sum_{i=1}^{n} RW_i \times PSI_s^i \tag{34}$$

where
WPS$_s$=WPS for possibility solution s
RW$_i$=RW of criterion for solution s
PSI$_s^i$=PSI of criterion i for solution s Upon calculating the WPS for all the solutions, a particular solution with the highest WPS value can be selected for use with the system and thought of as the "ideal" cybersecurity posture for the desired maturity of x %.

D. Real-World Attack-Based Experiment

A cyber-attack-based assessment was performed using the NIST Cybersecurity Framework (CSF) to demonstrate the proposed methodologyCSF has a total of 23 subdomains that are used as the criteria; those criteria are preferentially ranked. As mentioned in the previous sections, the dependency structures are constructed by ingesting cybersecurity requirements defined in the NIST Cybersecurity Framework report and the MIL values associated with the controls in a criterion. If the dependency trees are changed, the algorithm is flexible and will be adapted to the new trees. Combining the dependency trees with the solution structure 1300 in FIG. 13 results in structure 1400 in FIG. 14, which is used for the reminder of the calculations.

The attack scenario is as discussed above with respect to PGA. A third-party utility contractor carried out an insider attack on his ex-employer that caused over 200,000 gallons of sewage water to spill. Although the contractor had left his job due to disagreements with his employer, his credentials and access to the plant's critical control systems had not been revoked. Because he still had access to the critical systems, he was able to carry out a cyber-attack that produced a physical impact. A forensic analysis of the attack showed that the third-party contractor exploited weak SCADA systems and issued malicious commands while avoiding any monitoring or actionable alarms. The utility lacked basic cybersecurity systems, procedures, and policies that would prevent such an attack, including basic access controls defined in NIST SP 800-53. An independent manual assessment was completed to determine the required maturity to avoid or detect such an attack. For the purpose of this experiment, both soft and hard EPGA analysis was used to obtain a desired maturity without using a subjective methodology.

Table 4 (also used in the PGA analysis) shows the criteria ranks and the computed relative weights based on the given ranks (note that the controllability parameter, p, for the rank exponent method is assumed to be 2). The criteria are ranked through the performance of an attack analysis that was based on the attack. When criteria states are unchanged, they are ranked sequentially using the NIST domain and subdomain order.

1. EPGA Soft Analysis

According to the EPGA Soft formulation, the maturity of the facility that the attack was executed on was 57.5%; however, based on a performed subjective assessment, the maturity should have been at 87.7% according to the ranked order of criteria shown in Table 4. This experiment was completed to determine a solution candidate that results in a maturity of 87.7% using the EPGA Soft analysis.

Figure 15:
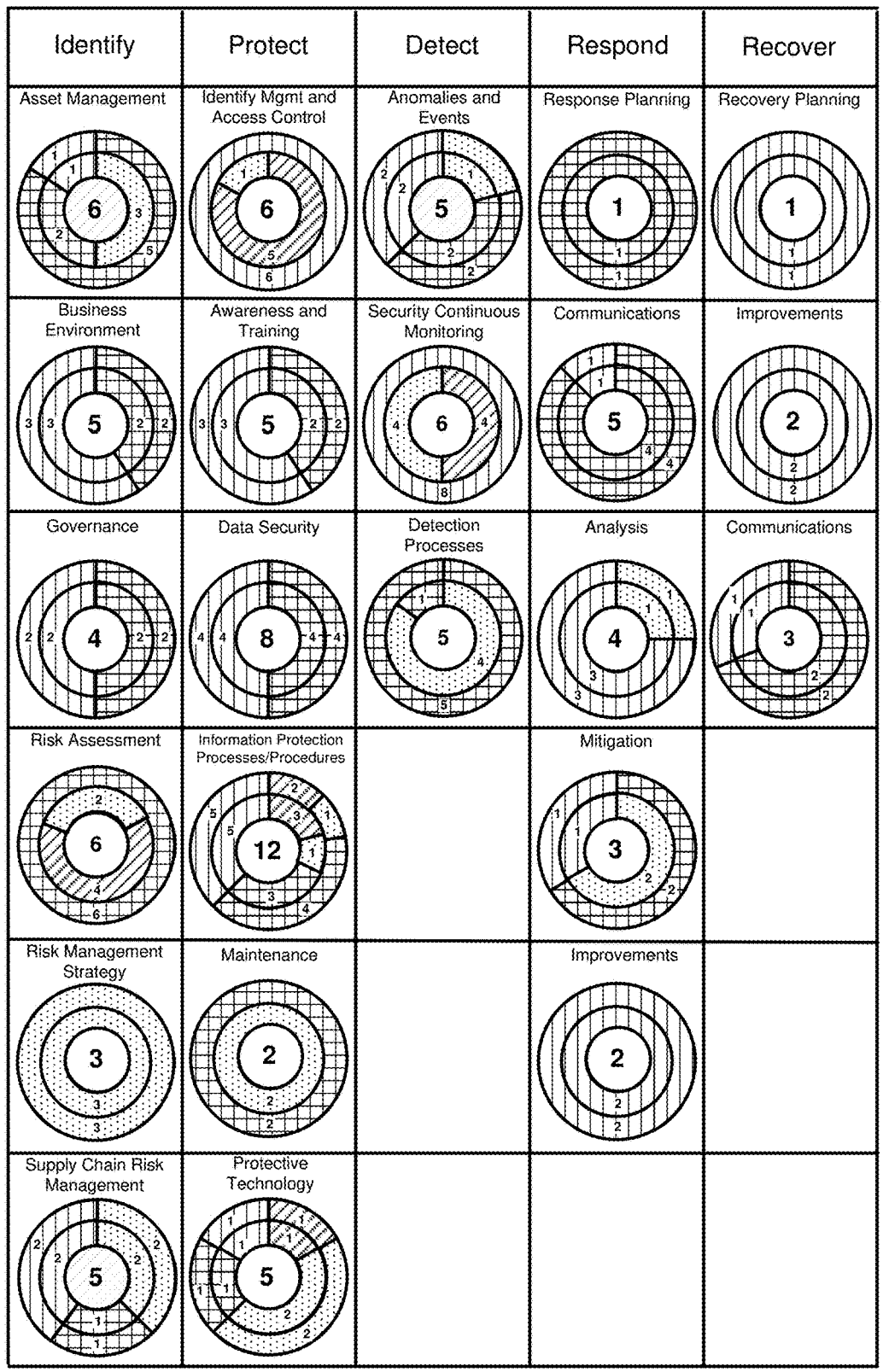
FIG. 15 is a data visualization illustrating a domain-wise depiction of impacted controls for an example cybersecurity vulnerability mitigation EPGA Soft approach.
Figure 16:
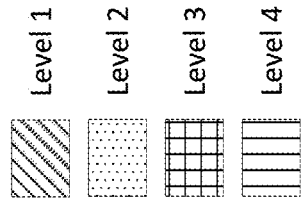
FIG. 16 is a data visualization illustrating a MIL-wise depiction of impacted controls for the EPGA Soft approach.
Figure 17:
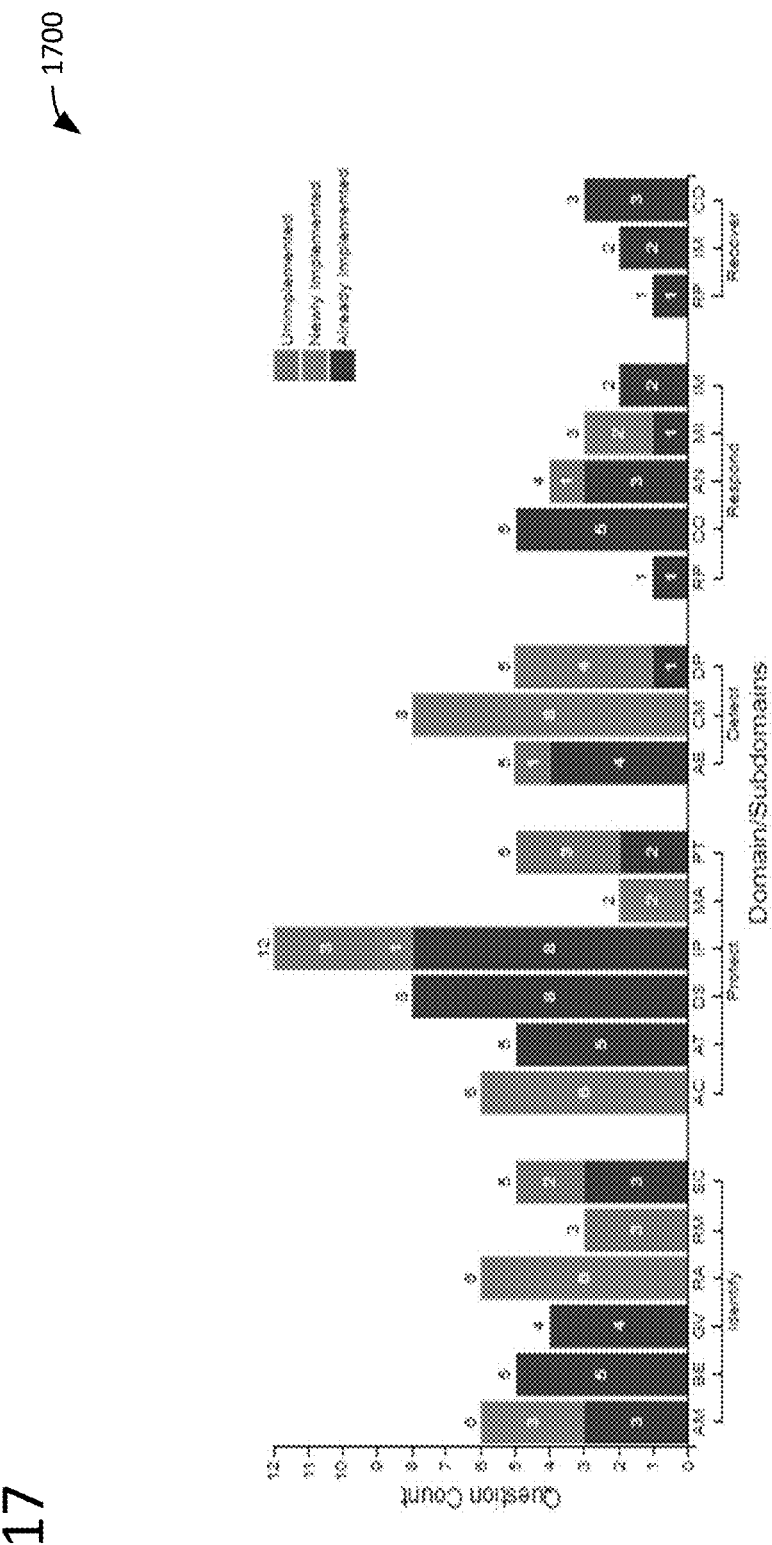
FIG. 17 is a stacked bar chart illustrating impacted controls for the EPGA Soft approach.

The results of the EPGA Soft analysis translated into a JavaScript-based web application are shown in FIGS. 15 and 16. The highest WPS solution was analyzed, and detailed state changes of the controls were performed using the presented methodology. Data visualization 1500 in FIG. 15 shows the number of controls affected per subdomain, and data visualization 1600 in FIG. 16 shows the total number of controls affected per MIL. As shown above, the EPGA Soft analysis considered both the criteria rank and the level of effort represented by the total number of controls expected to change states when determining the proposed solution with the desired maturity. As was the case in FIGS. 7, 8, 10, and 11, the total controls for each pie chart are in the center, the inner pie chart rings are the base assessment, and the outer pie chart rings represent the solution candidate. Stacked bar chart 1700 in FIG. 17 presents another view of affected security controls (similar to that shown in FIG. 6).

2. EPGA Hard Analysis

Figure 18:
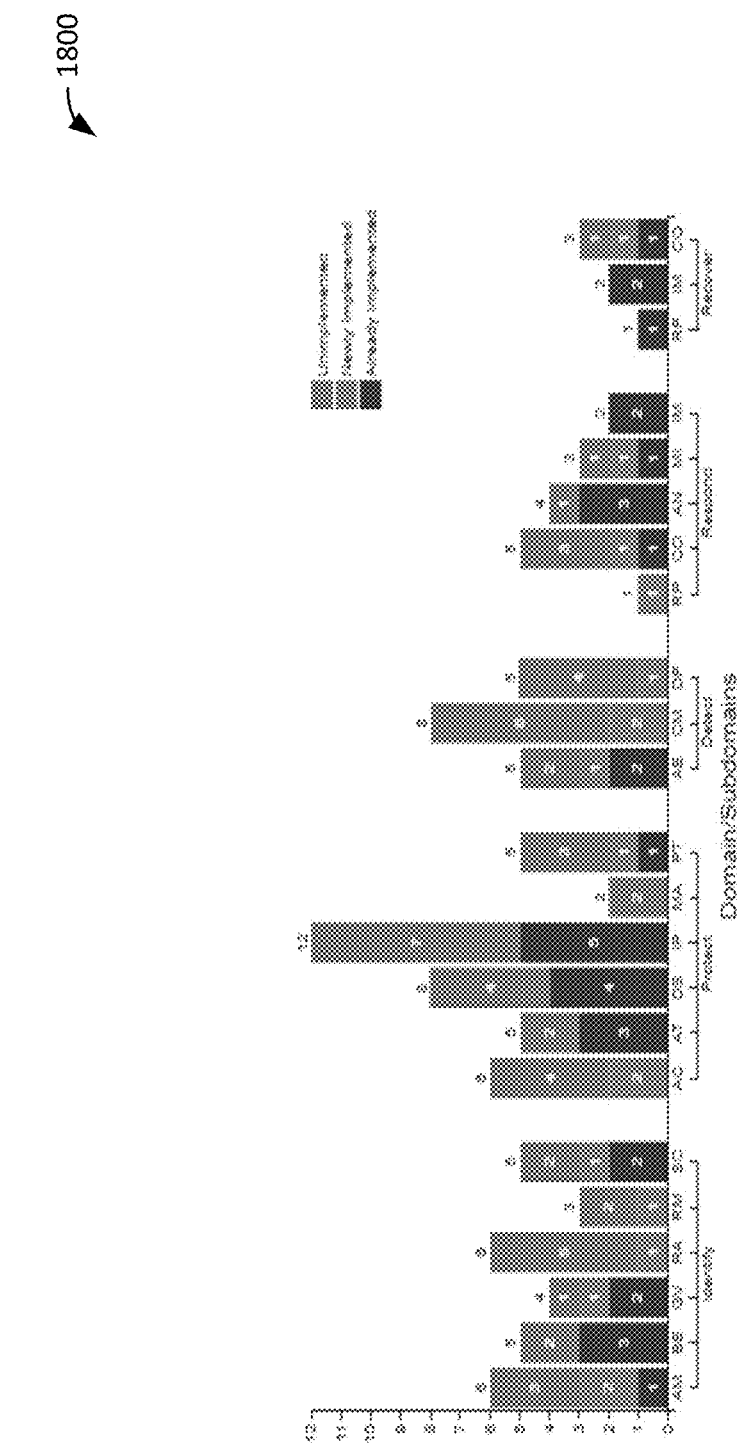
FIG. 18 is a stacked bar chart illustrating impacted controls for the example cybersecurity vulnerability mitigation example illustrated in FIGS. 15-17 using an EPGA Hard approach.
Figure 19:
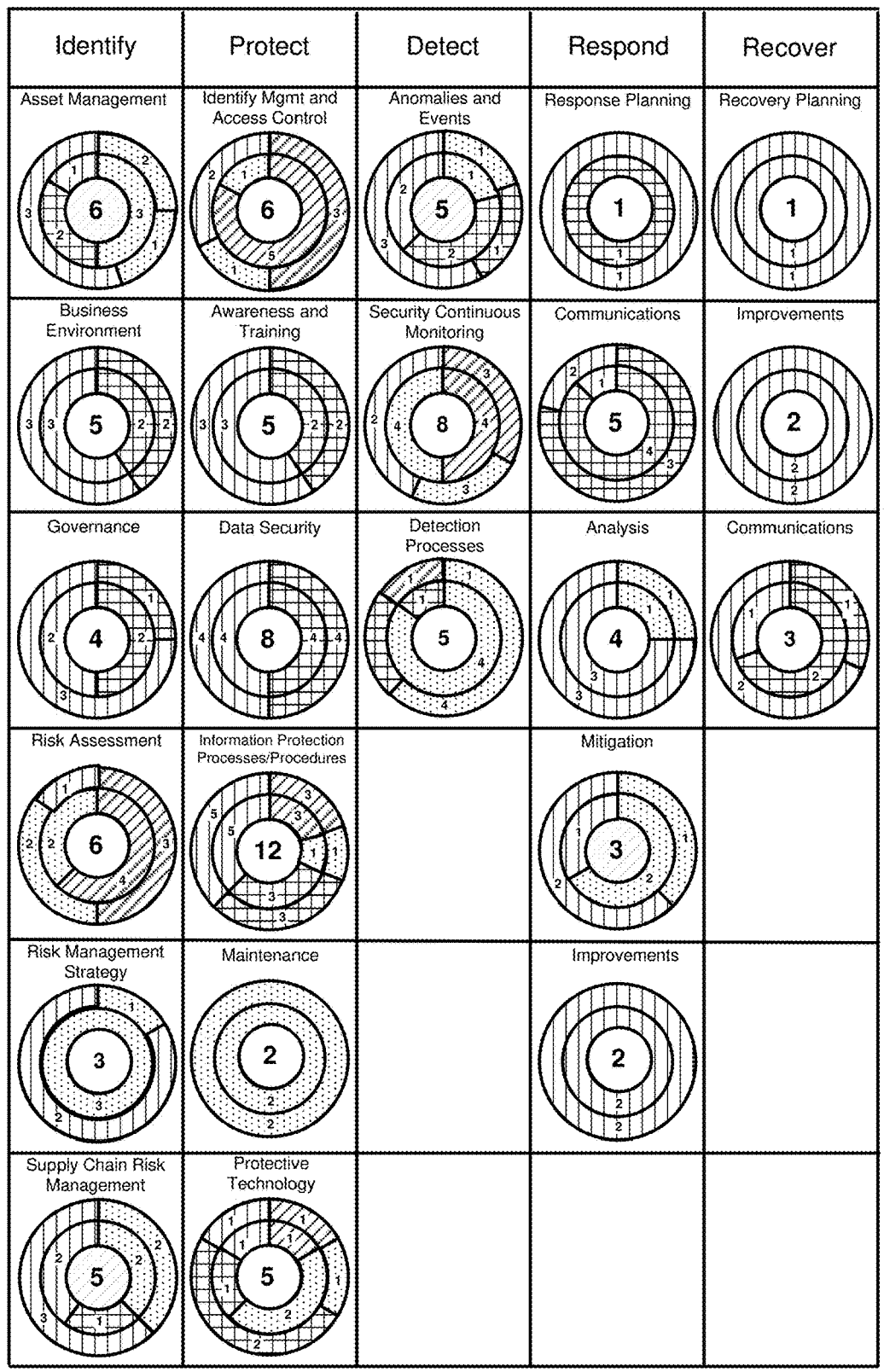
FIG. 19 is a data visualization illustrating a domain-wise depiction of impacted controls for the EPGA Hard approach.
Figure 20:
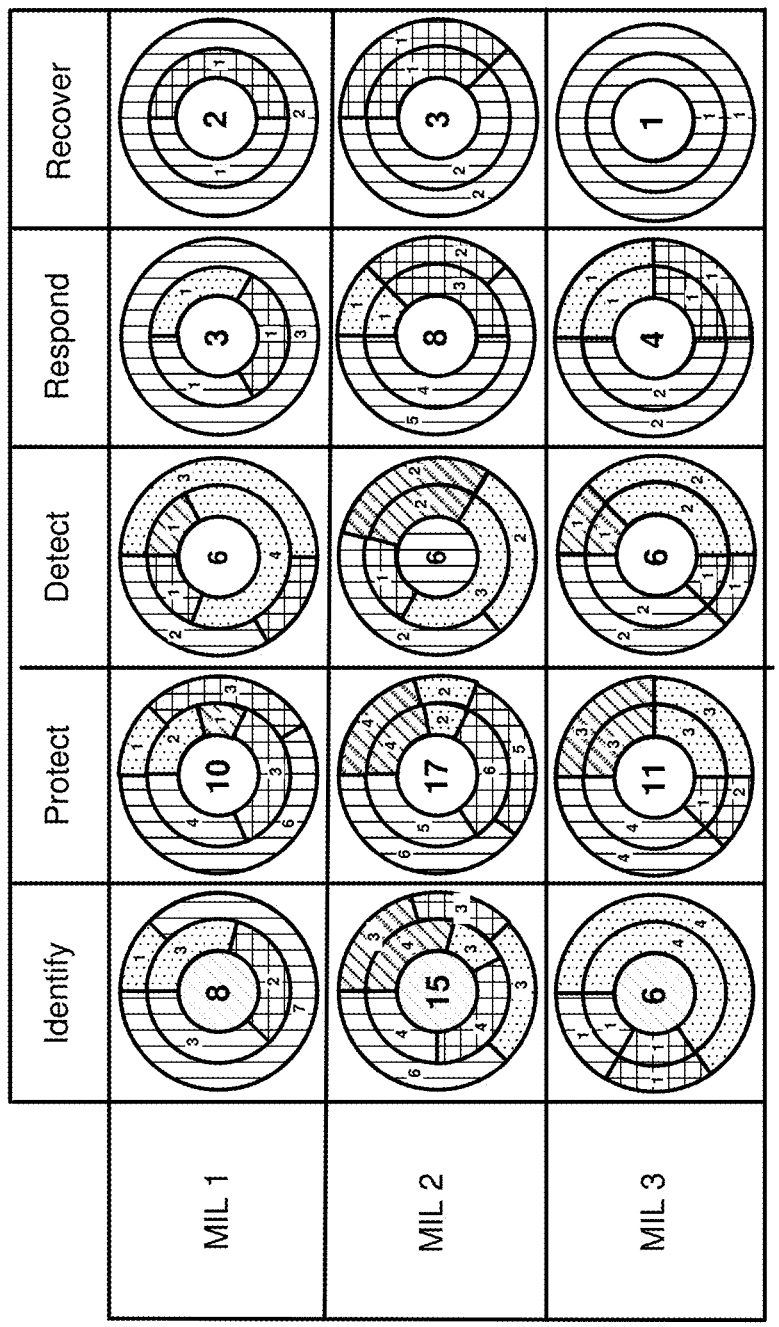
FIG. 20 is a data visualization illustrating a MIL-wise depiction of impacted controls for the EPGA Hard approach.

According to the EPGA Hard formulation, the maturity of the facility that the attack was executed on was 32.1%; however, based on the performed subjective assessment, the maturity should have be at 47.2% according to the ranked order of criteria shown in Table 4. This experiment was completed to determine the solution candidate that will result in a maturity of 47.2% using the EPGA Hard analysis. The highest WPS solution was analyzed. Stacked bar chart 1800 of FIG. 18 illustrates the affected security controls (similarly to FIG. 17). Data visualization 1900 in FIG. 19 and data visualization 2000 in FIG. 20 illustrate state changes at the subdomain and MIL, respectively. It can be observed from FIG. Comparing FIG. 20 with FIG. 16, it can be observed that the security control transitions for EPGA Hard are fewer than for EPGA Soft; however, the controls that were transitioned reached the "fully implemented" state. The EPGA Hard analysis algorithm considered both the criteria rank and the level of effort represented by the total number of controls expected to change states when finding a solution with the desired maturity.

The following discussion is a comparison of PGA and EPGA. For contextual overview, PGA performs prioritized mitigation without accounting for dependency structures and relative mass values; the analysis is based on MIL values only. By setting that premise, note that the phrases Base Soft and Sub Soft indicate that for the base and subjective assessments, a control is fully mature if its state is either Largely Implemented or Fully Implemented. Similarly, the phrases Base Hard and Sub Hard indicate that for the base and subjective assessments, a control is fully mature if its state is Fully Implemented. The overall maturity across the five domains is comparable between the five solutions (PGA Soft, EPGA Soft, PGA Hard, EPGA Hard, and subjective).

When compared to the base maturity, it is clear that the EPGA analysis can provide a desired solution and eliminate a biased and rigorous process that a subjective decision-making analysis entail. The EPGA Soft analysis result focuses on the Detect domain, with slightly less emphasis on the Identify and Protect domains. However, the EPGA Hard analysis focused on the Recover domain, unlike PGA Hard targets (Identify and Protect). Comparing these outcomes with the dependency structures of CSF, the above observations make logical sense; the EPGA algorithm approaches the solution of the given problem in a hierarchical fashion that is defined by the dependency trees. In such an approach, the EPGA algorithm gives its highest importance to the minimum required controls (also referred to as child controls). Therefore, domains with a highly controlled MIL distribution may gain a slightly higher importance. Note that the bias introduced through EPGA is very minimal and shows a promising balance in targeting the controls to transition them to a higher maturity. The EPGA result is better distributed and balanced across all domains when compared to the PGA distribution.

When comparing and analyzing the results at the MIL-level, EPGA behavior appears to be quite complex compared to PGA behavior. Behavioral inferences include the following. 1) EPGA Soft tends to be similar to PGA Soft for MIL1 controls, with a slightly higher emphasis on Detect, and EPGA Soft seems to target MIL3 controls more than MIL2 controls (which is quite opposite to PGA Soft behavior). 2) EPGA Hard clearly has a significant amount of affiliation to MIL1 controls, with about twice the emphasis on the Response and Recover domains as compared to PGA Hard. It can be noted that as the MIL increases, the EPGA solution tends to stay close to the PGA solution, with the exception of having a somewhat strong emphasis in the later domains (e.g., Response domain emphasis for MIL2 controls and Detect domains emphasis for MIL3 controls). EPGA appears to strictly follow the MIL progressive importance, distribution with fairly interesting domain-wise distribution patterns as compared to PGA (with the PGA seeming to be more concentrated in the beginning domains). Overall, it is clear that the subjective assessment/analysis tends to ignore that requirement, while the EPGA algorithm strictly follows the requirement pertaining to MIL progressiveness. Therefore, the solution discovered through the EPGA analysis is practical and achievable compared to the solution acquired through a subjective analysis. Based on the top three criteria the PGA algorithm is expected to give the most importance to are Identify—Risk Assessment, Protect—Identity Management and Access Control, and Detect—Security Continuous Monitoring.

It is evident that the criteria ranking is strictly respected; this is exclusively reflected in the EPGA Hard analysis. The EPGA Soft analysis appears to be less aggressive and distributes state changes over several controls. Thus, the EPGA Soft algorithm's advantage is that it focuses on a wide range of criteria as well as reduces the risk of ignoring less important criteria. However, the EPGA Soft algorithm also has a drawback—it does not completely focus on forcing a criterion to reach the highest state of maturity. Similarly, the benefit of the EPGA Hard algorithm is that it focuses on a small range of criteria with a narrow and aggressive tactic to force the most important criteria to achieve the highest state of maturity. However, the EPGA Hard algorithm also has a drawback—it strictly prohibits the idea of distribution or dilution of importance across the entire range, which increases the risk of ignoring the less important criteria.

The significant inferences based on the obtained results are as follows: 1) The subjective solution lags significantly behind the EPGA Soft and EPGA Hard solutions. 2) The subjective solution included goals that may not be attainable due to the violation of sequential domain-wise and criteria-wise approaches and MIL progressiveness; the EPGA Hard and EPGA Soft solutions both respected those requirements. 3) Both the EPGA Hard and EPGA Soft analyses eliminate the whole process of a subjective analysis but obtain the same overall domain-level maturity as the subjective analysis. Therefore, using a solution that was found using the EPGA Soft or EPGA Hard algorithm is achievable, objective, and supported by logical constructs—this removes the flaws of a subjective analysis, such as conflict of opinions, human-errors, and self-induced bias. 4) Since both the EPGA Hard and Soft algorithms are performed using a software program, the time needed to find and adopt a solution is much less than for a subjective approach, where everything must occur through a manual process and use a multi-party consensus. 5) An EPGA analysis removes the requirement of weighting criteria to reflect criticality and importance, which can be a roadblock (and often a requirement) in a subjective analysis. Overall, EPGA was found to be significantly efficient than a subjective analysis.

Based on the detailed cyber-attack-based experimental analysis demonstrated in this section, it is evident that the objectives defined at the beginning of this section are clearly fulfilled. The EPGA Soft and Hard analyses identify the vulnerabilities that were needed to be mitigated to avoid the above attack. In addition, EPGA Soft covers a broader range of security controls to achieve the minimum acceptable maturity state for the security control whereas the EPGA Hard covers a small range of security controls to achieve the maximum acceptable maturity state for those identified security controls/vulnerabilities. The performance of EPGA Soft analysis perfectly aligns with the subjective analysis, whereas the EPGA Hard analysis attempts to reach that alignment but falls slightly short due to the desired maturity limitations. Given the aggressive and selective nature of EPGA Hard, the behavior of the EPGA Hard analysis is expected.

With the advancements in various technologies, such as IoT/IIoT, there has been a growing affinity towards integration of smart devices and networked systems across the global critical infrastructure landscape. Although such connected intelligent networks bear several benefits, such as precise data acquisition, decentralized automation and controls, and others, they are not inherently capable of protecting themselves from cyber-attacks. Therefore, it is the responsibility of the critical infrastructure owners and operators to ensure that their facility of networked systems is protected from and defended against cyber-attacks. In order to protect those systems, it is essential for the operators to understand their cybersecurity posture and a prioritized list of existing vulnerabilities that needs to be mitigated. To address the growing security needs, over the last few decades cybersecurity researchers and government agencies have developed several maturity model-based vulnerability assessments tools and frameworks.

These tools and frameworks were designed to equip the critical infrastructure owners to assess their facilities and networks and understand the cybersecurity posture. A cybersecurity vulnerability assessment is an efficient way to determine the cybersecurity maturity and posture of a critical infrastructure facility. Several of the existing cybersecurity frameworks, models, and tools are designed to efficiently identify cybersecurity vulnerabilities in a facility, network, or system. However, several of those tools are qualitative and provide little to no means to develop plans and procedures to mitigate the discovered vulnerabilities. Realizing that need, researchers have been developing relative quantification-based risk assessment techniques and methodologies. Although these techniques can perform an effective risk analysis, they still lack the ability to precisely evaluate and ingest large-scale, system-level security controls to develop prioritized vulnerability mitigation strategies based on the desired cybersecurity maturity. The presented framework addresses that gap by prioritizing the vulnerabilities that need to be mitigated. Such a process will lead to a cybersecure path forward to defend and protect the critical infrastructure smart and networked systems against cyber intrusions.

The examples described herein represent a novel methodology and a framework—PGA and EPGA—that can be employed along with some of the vulnerability analysis frameworks (e.g., CSF, C2M2, and RMF) to not only perform cybersecurity vulnerability analysis, but also perform prioritized vulnerability mitigation analysis. In addition, the effectiveness of PGA and EPGA were demonstrated by testing the framework on a real-world cyber-attack. Through the use of the attack-based analysis presented in this paper, it was indicated that the mitigation methodologies called PGA and EPGA, which are part of CyFEr, were able to efficiently evaluate several thousands of possible solutions and identify the ideal solution to reach a desired cybersecurity maturity. CyFEr determined the possible model solutions that could allow cybersecurity maturity to be met while ensuring all the user requirements were achieved. EPGA (and CyFEr) also can integrate with maturity models and frameworks beyond CSF and C2M2.

E. Additional EPGA Example

The following example demonstrates a walkthrough of the EPGA steps through a simple problem. Below are some important clarifications.

First, the demonstrated problem is extremely simplified with only six possible solutions. In reality, the problems tend to be complicated, with 100+ security controls. For example, C2M2 has 10 domains, over 30 subdomains (criteria), and over 350 controls. Similarly, CSF has five domains, 23 subdomains (criteria), and over 100 controls. Also, note that in reality, a software tool mentioned earlier executes the steps discussed.

Second, because this example has a small number of controls, criteria, and domains, the effectiveness of the dependency structures is not fully reflected. These computations are performed manually in the example below to show the progress through each step.

In this example, there are three criteria with five controls across them. According to Table 7 below, the current state of maturity is 20% and the desired maturity is 60%. The EPGA Soft analysis with the method-2 mass calculation is used to discover the solution candidate.

TABLE 7

Stages, MILs, masses, and base states of the illustrative security controls.

| Domain | Criteria | Control | Parent to | Stage | MIL | Mass (M2) | Base State |
|---|---|---|---|---|---|---|---|
| D1 | C1 | Q1 | — | 1 | 1 | 0.1 × (1 + 1) = 0.2 | 2 |
|  |  | Q2 | Q1 | 2 | 3 | (0.3 × (2 + 3)) + 0.2 = 1.7 | 1 |
|  | C2 | Q3 | — | 1 | 2 | 0.2 × (1 + 2) = 0.6 | 4 |
|  |  | Q4 | Q3 | 2 | 3 | (0.3 × (2 + 3)) + 0.6 = 2.1 | 2 |
| D2 | C3 | Q5 | — | 1 | 1 | 0.1 × (1 + 1) = 0.2 | 2 |

The current state can be calculated using:

$$\text{Maturity} = \frac{\sum_{i=1}^{n} Q_i; S.T. \text{ state of } Q_i = 3 \| 4}{\sum_{i=1}^{m} Q_i; \text{ for } m \text{ controls}} \times 100 \quad (35)$$

$$\Rightarrow \text{Maturity} = \frac{(Q_3)}{5(Q_1 : Q_5)} \times 100 = 20\%$$

Identify the goal: Reach a desired maturity of 60%.

Define the criteria ranks: Use the approaches in section III(C)(2). The relative weights for the four different weighting approaches are shown below in Table 8.

TABLE 8

Ranks and associated relative weights of the illustrative criteria

| Criteria | Rank | $w^{RS}_i$ | $w^{RR}_i$ | $w^{RK}_i$ | $w^{hac}_i$ |
|---|---|---|---|---|---|
| C1 | 2 | 0.333 | 0.2727 | 0.2857 | 0.2778 |
| C2 | 3 | 0.167 | 0.1818 | 0.0714 | 0.1111 |
| C3 | 1 | 0.5 | 0.5455 | 0.6429 | 0.6111 |

Determine Solution Structure: Because there are only five controls, potential solutions are easily discovered. In the case of CSF with a given base maturity and desired maturity, possible solutions may be in the range of at least ~$2^{20}$ to ~$2^{32}$ and potential solutions may be in the range of few thousands.

TABLE 9

Discovered solution sets for the illustrative example.

| Solution | Final States (Maturity = 60%) |
|---|---|
| S1 | {[3],[3],4,2,2} |
| S2 | {[3],1,4,[3],2} |
| S3 | {[3],1,4,2,[3]} |
| S4 | {2,[3],4,[3],2} |
| S5 | {2,[3],4,2,[3]} |
| S6 | {2,1,4,[3],[3]} |

Note that since the EPGA Soft analysis is performed, remaining solutions that result in a state change to "4" for either $Q_1$, $Q_2$ or $Q_4$ or $Q_5$ are not considered. In Table 9, state changes of the controls across discovered solutions are shown in square brackets.

Calculate Present State Factor: Following section III(C)(4), the EPSF is determined through Equation 36.

$$PSF_{Q1} = 0.2 \times 2 = 0.4; \quad (36)$$
$$PSF_{Q2} = 1.7 \times 1 = 1.7;$$
$$PSF_{Q3} = 0.6 \times 4 = 2.4;$$
$$PSF_{Q4} = 2.1 \times 2 = 4.2;$$
$$PSF_{Q5} = 0.2 \times 2 = 0.4$$

$$\Rightarrow \begin{cases} PSF_{C1} = PSF_{Q1} + PSF_{Q2} = 0.4 + 1.7 = 2.1; \\ PSF_{C2} = PSF_{Q3} + PSF_{Q4} = 2.4 + 4.2 = 6.6; \\ PSF_{C3} = PSF_{Q5} = 0.4 \end{cases}$$

Calculate Soft Implementation State Factor: Following section III(C)(5), calculation of SISF is shown in Table 10.

TABLE 10

SISF calculation for the illustrative example.

| | |
|---|---|
| S1 | $SISF_{Q1}^{S1} = 0.2 \times 3 = 0.6$; $SISF_{Q2}^{S1} = 1.7 \times 3 = 5.1$; $SISF_{Q3}^{S1} = 0.6 \times 4 = 2.4$; $SISF_{Q4}^{S1} = 2.1 \times 2 = 4.2$; $SISF_{Q5}^{S1} = 0.2 \times 2 = 0.4$ $SISF_{C1}^{S1} = 0.6 + 5.1 = 5.7$; $SISF_{C2}^{S1} = 2.4 + 4.2 = 6.6$; $SISF_{C3}^{S1} = 0.4$ |
| S2 | $SISF_{Q1}^{S1} = 0.2 \times 3 = 0.6$; $SISF_{Q2}^{S1} = 1.7 \times 1 = 1.7$; $SISF_{Q3}^{S1} = 0.6 \times 4 = 2.4$; $SISF_{Q4}^{S1} = 2.1 \times 3 = 6.3$; $SISF_{Q5}^{S1} = 0.2 \times 2 = 0.4$ $SISF_{C1}^{S1} = 0.6 + 1.7 = 2.3$; $SISF_{C2}^{S1} = 2.4 + 6.3 = 8.7$; $SISF_{C3}^{S1} = 0.4$ |
| S3 | $SISF_{Q1}^{S1} = 0.2 \times 3 = 0.6$; $SISF_{Q2}^{S1} = 1.7 \times 1 = 1.7$; $SISF_{Q3}^{S1} = 0.6 \times 4 = 2.4$; $SISF_{Q4}^{S1} = 2.1 \times 2 = 4.2$; $SISF_{Q5}^{S1} = 0.2 \times 3 = 0.6$ $SISF_{C1}^{S1} = 0.6 + 1.7 = 2.3$; $SISF_{C2}^{S1} = 2.4 + 4.2 = 6.6$; $SISF_{C3}^{S1} = 0.6$ |
| S4 | $SISF_{Q1}^{S1} = 0.2 \times 2 = 0.4$; $SISF_{Q2}^{S1} = 1.7 \times 3 = 5.1$; $SISF_{Q3}^{S1} = 0.6 \times 4 = 2.4$; $SISF_{Q4}^{S1} = 2.1 \times 3 = 6.3$; $SISF_{Q5}^{S1} = 0.2 \times 2 = 0.4$ $SISF_{C1}^{S1} = 0.4 + 5.1 = 5.5$; $SISF_{C2}^{S1} = 2.4 + 6.3 = 8.7$; $SISF_{C3}^{S1} = 0.4$ |
| S5 | $SISF_{Q1}^{S1} = 0.2 \times 2 = 0.4$; $SISF_{Q2}^{S1} = 1.7 \times 3 = 5.1$; $SISF_{Q3}^{S1} = 0.6 \times 4 = 2.4$; $SISF_{Q4}^{S1} = 2.1 \times 2 = 4.2$; $SISF_{Q5}^{S1} = 0.2 \times 3 = 0.6$ $SISF_{C1}^{S1} = 0.4 + 5.1 = 5.5$; $SISF_{C2}^{S1} = 2.4 + 4.2 = 6.6$; $SISF_{C3}^{S1} = 0.6$ |
| S6 | $SISF_{Q1}^{S1} = 0.2 \times 2 = 0.4$; $SISF_{Q2}^{S1} = 1.7 \times 1 = 1.7$; $SISF_{Q3}^{S1} = 0.6 \times 4 = 2.4$; $SISF_{Q4}^{S1} = 2.1 \times 3 = 6.3$; $SISF_{Q5}^{S1} = 0.2 \times 3 = 0.6$ $SISF_{C1}^{S1} = 0.4 + 1.7 = 2.1$; $SISF_{C2}^{S1} = 2.4 + 6.3 = 8.7$; $SISF_{C3}^{S1} = 0.6$ |

Calculate Soft Transition State Factor: Following section III(C)(6), calculation of STSF is shown in Table 11.

TABLE 11

STSF calculation for the illustrative example.

| | |
|---|---|
| S1 | $\left( \begin{array}{l} STSF_{C1}^{S1} = SISF_{C1}^{S1} - PSF_{C1} = 5.7 - 2.1 = 3.6 \\ STSF_{C2}^{S1} = SISF_{C2}^{S1} - PSF_{C2} = 6.6 - 6.6 = 0 \\ STSF_{C3}^{S1} = SISF_{C3}^{S1} - PSF_{C3} = 0.4 - 0.4 = 0 \end{array} \right)$ |
| S2 | $\left( \begin{array}{l} STSF_{C1}^{S2} = SISF_{C1}^{S2} - PSF_{C1} = 2.3 - 2.1 = 0.2 \\ STSF_{C2}^{S2} = SISF_{C2}^{S2} - PSF_{C2} = 8.7 - 6.6 = 2.1 \\ STSF_{C3}^{S2} = SISF_{C3}^{S2} - PSF_{C3} = 0.4 - 0.4 = 0 \end{array} \right)$ |
| S3 | $\left( \begin{array}{l} STSF_{C1}^{S3} = SISF_{C1}^{S3} - PSF_{C1} = 2.3 - 2.1 = 0.2 \\ STSF_{C2}^{S3} = SISF_{C2}^{S3} - PSF_{C2} = 6.6 - 6.6 = 0 \\ STSF_{C3}^{S3} = SISF_{C3}^{S3} - PSF_{C3} = 0.6 - 0.4 = 0 \end{array} \right)$ |
| S4 | $\left( \begin{array}{l} STSF_{C1}^{S4} = SISF_{C1}^{S4} - PSF_{C1} = 5.5 - 2.1 = 3.4 \\ STSF_{C2}^{S4} = SISF_{C2}^{S4} - PSF_{C2} = 8.7 - 6.6 = 2.1 \\ STSF_{C3}^{S4} = SISF_{C3}^{S4} - PSF_{C3} = 0.4 - 0.4 = 0 \end{array} \right)$ |

TABLE 11-continued

STSF calculation for the illustrative example.

| | |
|---|---|
| S5 | $STSF_{C1}^{S5} = SISF_{C1}^{S5} - PSF_{C1} = 5.5 - 2.1 = 3.4$ <br> $STSF_{C2}^{S5} = SISF_{C2}^{S5} - PSF_{C2} = 6.6 - 6.6 = 0$ <br> $STSF_{C3}^{S5} = SISF_{C3}^{S5} - PSF_{C3} = 0.6 - 0.4 = 0.2$ |
| S6 | $STSF_{C1}^{S6} = SISF_{C1}^{S6} - PSF_{C1} = 2.1 - 2.1 = 0$ <br> $STSF_{C2}^{S6} = SISF_{C2}^{S6} - PSF_{C2} = 8.7 - 6.6 = 2.1$ <br> $STSF_{C3}^{S6} = SISF_{C3}^{S6} - PSF_{C3} = 0.6 - 0.4 = 0.2$ |

Calculate Performance Score Index: Following section III(C)(7), the PSI is determined as shown in Table 12.

TABLE 12

PSI calculation of the illustrative example.

| Criteria | S1 | S2 | S3 | S4 | S5 | S6 |
|---|---|---|---|---|---|---|
| C1 | 6 | 2 | 2 | 4 | 4 | 1 |
| C2 | 1 | 4 | 1 | 4 | 1 | 4 |
| C3 | 1 | 1 | 4 | 1 | 4 | 4 |

Calculate Weighted Performance Score: Following section III(C)(8), the WPS is determined as shown in Table 13.

TABLE 13

WPS calculation for the illustrative example

RANK SUM METHOD

| | |
|---|---|
| S1 | (6 × 0.3333) + (1 × 0.167) + (1 × 0.5) = 2.6668 |
| S2 | (2 × 0.3333) + (4 × 0.167) + (1 × 0.5) = 1.8346 |
| S3 | (2 × 0.3333) + (1 × 0.167) + (4 × 0.5) = 2.8336 |
| S4 | (4 × 0.3333) + (4 × 0.167) + (1 × 0.5) = 2.5012 |
| S5 | (4 × 0.3333) + (1 × 0.167) + (4 × 0.5) = 3.5002 |
| S6 | (1 × 0.3333) + (4 × 0.167) + (4 × 0.5) = 3.0013 |

RECIPROCAL RANK METHOD

| | |
|---|---|
| S1 | (6 × 0.2727) + (1 × 0.1818) + (1 × 0.5455) = 2.3635 |
| S2 | (2 × 0.2727) + (4 × 0.1818) + (1 × 0.5455) = 1.8181 |
| S3 | (2 × 0.2727) + (1 × 0.1818) + (4 × 0.5455) = 2.9092 |
| S4 | (4 × 0.2727) + (4 × 0.1818) + (1 × 0.5455) = 2.3635 |
| S5 | (4 × 0.2727) + (1 × 0.1818) + (4 × 0.5455) = 3.4546 |
| S6 | (1 × 0.2727) + (4 × 0.1818) + (4 × 0.5455) = 3.1819 |

RANK EXPONENT METHOD

| | |
|---|---|
| S1 | (6 × 0.2857) + (1 × 0.0714) + (1 × 0.6429) = 2.4285 |
| S2 | (2 × 0.2857) + (4 × 0.0714) + (1 × 0.6429) = 1.4999 |
| S3 | (2 × 0.2857) + (1 × 0.0714) + (4 × 0.6429) = 3.2144 |
| S4 | (4 × 0.2857) + (4 × 0.0714) + (1 × 0.6429) = 2.0713 |
| S5 | (4 × 0.2857) + (1 × 0.0714) + (4 × 0.6429) = 3.7858 |
| S6 | (1 × 0.2857) + (4 × 0.0714) + (4 × 0.6429) = 3.1429 |

RANK ORDER CENTROID METHOD

| | |
|---|---|
| S1 | (6 × 0.2778) + (1 × 0.1111) + (1 × 0.6111) = 2.2389 |
| S2 | (2 × 0.2778) + (4 × 0.1111) + (1 × 0.6111) = 1.6111 |
| S3 | (2 × 0.2778) + (1 × 0.1111) + (4 × 0.6111) = 3.1111 |
| S4 | (4 × 0.2778) + (4 × 0.1111) + (1 × 0.6111) = 2.1667 |
| S5 | (4 × 0.2778) + (1 × 0.1111) + (4 × 0.6111) = 3.6667 |
| S6 | (1 × 0.2778) + (4 × 0.1111) + (4 × 0.6111) = 3.1666 |

It is clear from the scores in Table 13 that the solution candidate to reach the desired maturity of 60% ensuring the criticality of criteria and MIL of the controls are accounted for is solution S5. An interesting observation is the significant fluctuation across various rank-weights methods. It is clearly not an equal displacement across the solution's WPS values. Since the problem demonstrated has a very small amount of controls, all the methods converged at the same solution. However, it may be quite possible that if the number of controls is more realistic (at CSF level: 100+; C2M2 level: 300+), the converged solution may be different across the four depicted rank-weight methods.

IV. Additional Examples

The examples herein have been discussed with respect to the NIST CSF framework. The CyFEr approaches can be used with other of the 25-plus frameworks as well. System modifications based on cybersecurity vulnerability recommendations determined through the described approaches can use organizational priorities to automatically eliminate irrelevant gaps discovered through the approaches. A system can be modified to generate raw data output that can be used with other organizational systems such as historians, databases, etc. Further, multiple CyFEr assessments can be performed, and systems can perform an automatic comparative analysis to see overall maturity changes and the impact of resource allocations based on the different recommendations based on the assessments. For example, if an end-user has been performing CyFEr assessments for five years, doing an assessment every six months, e.g., the ten assessments can be compared to see resource allocation impacts.

Figure 21:
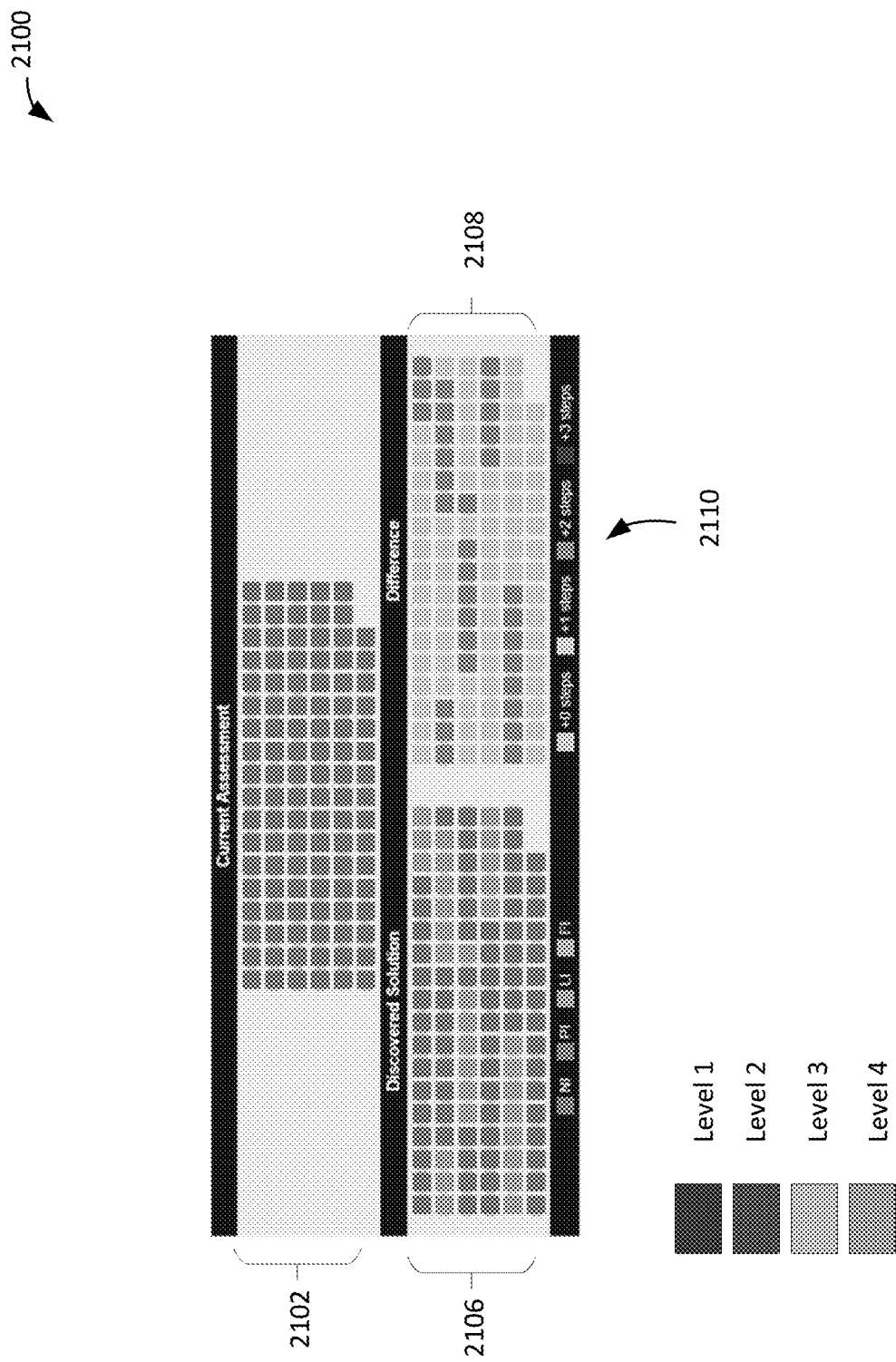
FIG. 21 is a data visualization illustrating security control transitions for a discovered solution.

FIG. 21 illustrates a data visualization 2100 that can be generated through the PGA or EPGA processes. Data visualization 2100 can be, for example, generated as part of method 100 of FIG. 1, method 200 of FIG. 2, method 300 of FIG. 3, method 400 of FIG. 4, and method 1200 of FIG. 12. In data visualization 2100, section 2102 represents a current assessment of the system. Each square represents a security control. Legend 2104 indicates the representations of each level. In section 2102, all of the controls are at level one. Section 2106 identifies the discovered solution candidate. In section 2106, 32 controls have changed from level one to level three. Section 2108 shows the controls that have transitioned, along with the magnitude of the transition, as indicated by legend 2110 (from left to right, +0, +1, +2, and +3). In section 2108, 32 controls that changed from level one to level three in section 2106 are indicated as "+2."

Figure 22:
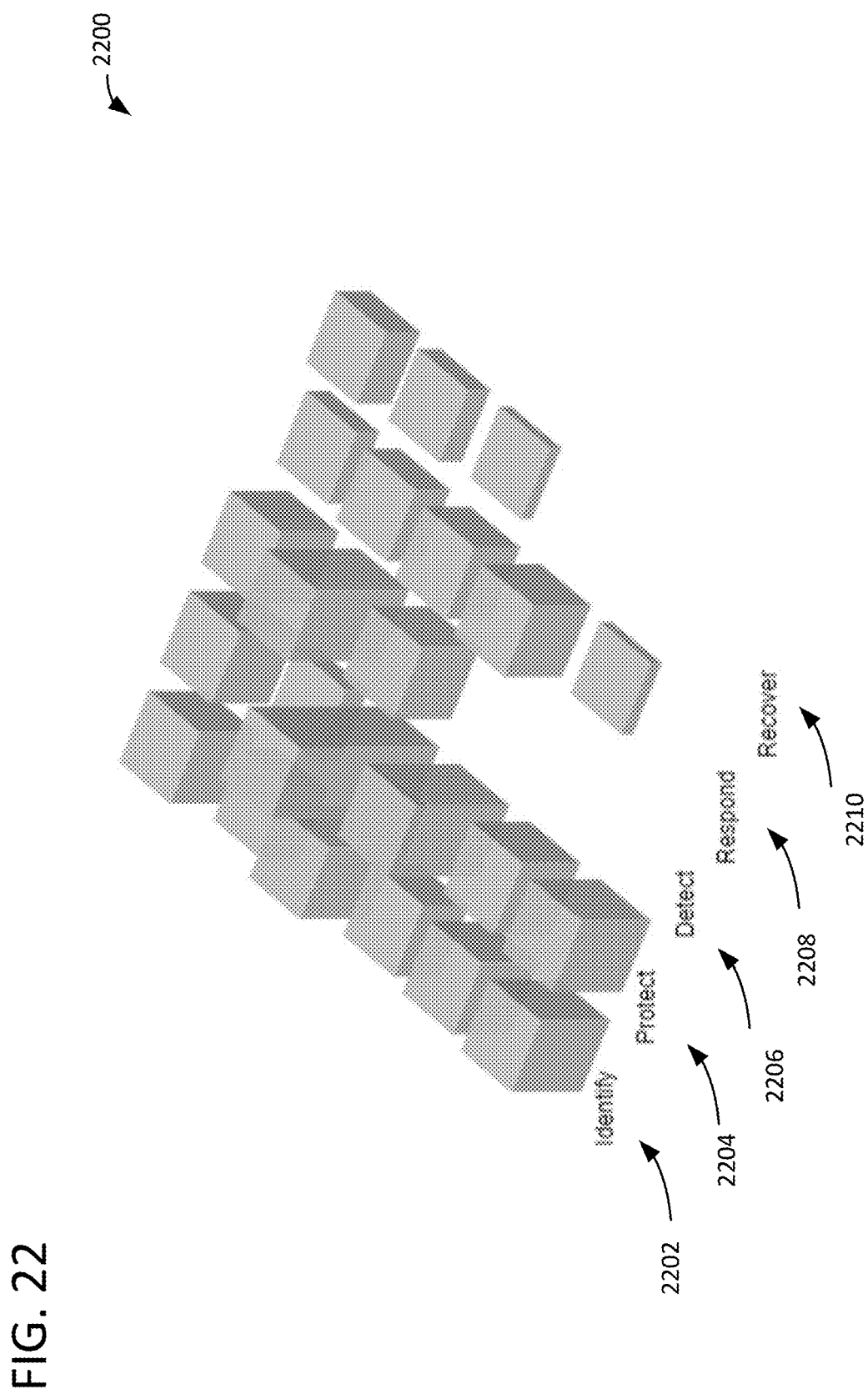
FIG. 22 is a three-dimensional data visualization illustrating the security control transitions illustrated in FIG. 21.

FIG. 22 illustrates a data visualization 2200, which is a three-dimensional bar chart representing the identified solution illustrated in FIG. 21. Visualization 2200 is organized by domain and subdomain and shows subdomains/security controls that have changed states. Row 2202 represents the subdomains (not labeled) in "Identify," row 2204 represents the subdomains in "Protect," row 2206 represents the subdomains in "Detect," row 2208 represents the subdomains in "Respond," and row 2210 represents the subdomains in "Recover." In Respond and Recover, no controls are transitioned in the solution. In Detect, all of the controls in the lower two subdomains are transitioned, but not the controls in the upper subdomain. The other rows can be similarly analyzed.

Data visualizations 2100 and 2200 can be generated with any of the described examples. Various other visualizations, such as charts indicating transitions on a control basis, tables, graphs, or other visualizations can also be generated. The various data visualizations can be used by organizations or entities to implement changes to the system in question to achieve the desired cybersecurity maturity.

In some examples, the control transition information is generated by a software application and transmitted to a controller or other computerized management device to automatically implement some or all of the security control transitions specified by the selected solution candidate. For example, passwords can be required, user access can be restricted, firewalls can be implemented, encryption can be implemented or changed, users can be locked or unlocked, etc. In some examples, a controller is in communication with energy infrastructure, such as generation facilities, substations, and other infrastructure.

Figure 23:
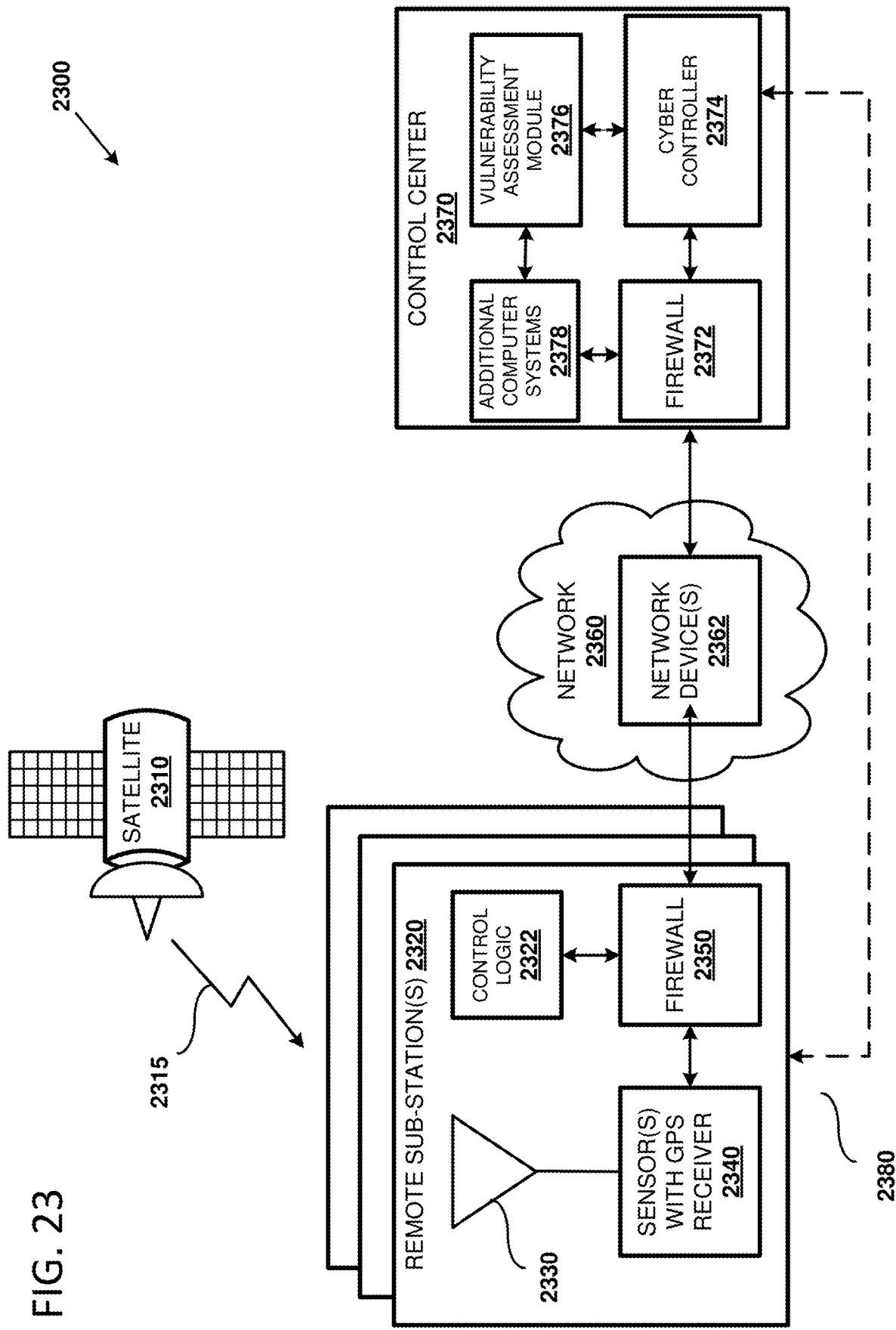
FIG. 23 is an example cyber-physical system capable of implementing the described examples.

FIG. 23 is a system diagram of an example of cyber-physical system 2300 including a cyber controller 2374 and a vulnerability assessment module 2376. For example, the system 2300 can be a supervisory control and data acquisition (SCADA) system, such as a power system. In the illustrated system, the power system includes a synchrophasor system having components in a physical domain and in a cyber domain, but as will be readily understood to one of ordinary skill in the art having the benefit of the present disclosure, other configurations of power systems are suitably adapted to use methods disclosed herein. The system 2300 can be geographically distributed, including one or more remote sub-stations 2320 in communication with a control center 2370. The remote sub-stations 2320 can be electrical sub-stations of an electrical generation and transmission system, cellular base-stations in a telecommunications network, medical equipment and systems in a hospital, and so forth.

The system 2300 can include communication connections (e.g., network 2360 and dedicated control path 2380) to create a SCADA network to enable the implementation of a closed-loop control system between multiple, geographically dispersed remote stations 2320 and a control center 2370 connected to one another using technologies such as fiber optics, microwave, Ethernet, and/or twisted-pair connections. The remote sub-stations 2320 can include measurement devices and/or sensors 2340 for measuring properties of the systems within the remote sub-stations 2320. Measurement signals originating from remote stations 2320 can be relayed to the control center 2370 by network devices 2362 using a communications protocol, such as Internet Protocol (IP) based communication protocols (e.g., Distributed Network Protocol (DNP)). Similarly, control commands determined by processing these measurements can be sent back from the control center 2370 to the remote stations 2320 for execution, such as by the control logic 2322. For some applications (e.g., fault protection), the different remote stations 2320 can directly communicate with each other.

The interconnection network 2360 can be utilized to interconnect various electrical components of the system 2300 and the control center 2370. The interconnection network 2360 can include one or more network devices 2362, such as switches, routers, and so forth. The interconnection network 2360 can include plain old telephone service (POTS) signal lines, a local-area network (LAN), a wide-area network (WAN), and/or the Internet, for example. As a specific example, the interconnection network 2360 can include multiple tiers of network infrastructure using routers and firewalls with site-to-site encryption, but local networks are unencrypted. It should be appreciated by one of ordinary skill in the art having the benefit of the present disclosure, that the network topology illustrated for the network 2360 has been simplified and that many more networks and networking devices can be utilized to interconnect the various electrical components of the system 2300. As illustrated, the network 2360 is external to the remote sub-station 2320 and the control center 2370. However, the network 2360 can include network devices that are integrated within the remote sub-station 2320 and the control center 2370. The cyber controller 2374 can communicate with the network devices 2362 to configure and/or reconfigure the network devices 2362 to potentially improve cybersecurity of the system 2300.

The remote stations 2320 and the control center 2370 can be protected by firewalls 2350 and 2372, respectively. A firewall is computer hardware, software, or a combination of computer hardware and software that separates and connects a more-trusted portion of a network from a less-trusted portion of the network. Firewalls can filter (e.g., selectively discard) communications packets based on network protocol information, among other things. The firewalls 2350 and 2372 can include software, a processor, a microcontroller, programmable logic (e.g., a field-programmable gate array (FPGA)), hardwired finite state machines, programmable microcode, or other suitable control circuits for filtering communications packets. As one example, a firewall can be configured with a table of network addresses that can be forwarded or blocked by the firewall. As another example, a firewall can be configured to block different port numbers associated with an IP packet. The cyber controller 2374 can communicate with the firewalls 2372 and 2350 and configure and/or reconfigure the firewalls to potentially improve cybersecurity of the system 2300 by changing an attack surface of the system 2300. For example, the cyber controller 2374 can program the firewalls 2372 and 2350 to enable or block particular network addresses, to open or close communication ports, and so forth.

The sensors 2340 can be used to perform real-time measurements of physical properties of systems of the remote substation 2320. As a specific example, the remote substation 2320 can be an electrical substation that is part of an electrical generation and transmission system. Inputs and/or outputs of the electrical components within the sub-station 2320 can be measured by the sensor 2340, such as a phasor measurement unit (PMU). A PMU is a device that can be used to measure or estimate a magnitude and/or phase angle of an electrical quantity such as voltage or current using a common time source for synchronization. By using a common time source, the measurements of a given component can be synchronized for the component and across different components. Thus, a synchronized measurement of the system 2300 can be taken across all of the components of the system 2300. One method for synchronizing the measurements is by using a Global Positioning System (GPS) reference source. For example, a GPS satellite 2310 can transmit a time synchronization signal 2315 which can be received by an antenna 2330 connected to sensor 2340 including a GPS receiver. The sensor 2340 can communicate the synchronized measurement to the firewall 2350 so that the measurement can be transmitted to the control center 2370. As one example, the sensor 2340 can generate a timestamp based on the GPS reference signal, and the timestamp can be combined with the measurement of the electrical quantity to generate synchrophasor data. The sensor 2340 can capture samples of the electrical quantities at a rate of 30, 60, or 90 samples per second, for example. Thus, the input and/or output waveforms can be reconstructed from the measurement with relatively high accuracy.

The sensor 2340 can include hardware, software, or a combination of hardware and software. For example, the sensor 2340 can include a processor, a microcontroller, programmable logic (e.g., a field-programmable gate array), hardwired finite state machines, programmable microcode, or other suitable control circuits for measuring an electrical quantity, synchronizing the measurement with a reference time source, and communicating with one or more devices of the synchrophasor system. The sensor 2340 can include circuits for measuring an electrical quantity, such as current, voltage, and/or phase angle. The sensor 2340 can include circuits for communicating over an interconnection network, such as the interconnection network 2360. In one example, the sensor 2340 can include a GPS receiver.

The control center 2370 can include a firewall 2372, a cyber controller 2374, a vulnerability assessment module 2376, and additional computer systems 2378 (such as a phasor data concentrator (PDC), human resources, operational, monitoring, and maintenance computer systems, and so forth). The firewall 2372, the cyber controller 2374, the vulnerability assessment module 2376, and the additional computer systems 2378 can communicate with each other over direct connections, a local unencrypted network, or an encrypted network, for example. A PDC can collect and synchronize synchrophasor data and other information from the various electrical components of the system 2300, correlate the data from the various electrical components, and pass the correlated data to monitoring and/or control logic. The monitoring and/or control logic can be executed on a processor (not shown) that can generate control signals that control equipment and systems of the remote sub-stations 2320. The control signals can be communicated to the remote sub-stations 2320 via the network 2360 or via a dedicated control path 2380. For example, the control signals can be received by the control logic 2322 and used to change operating parameters of the components within the remote sub-stations 2320. Human resources computer systems and databases can track information about employees such as working schedules, account privileges, passwords, and so forth. Maintenance computer systems can track when machines and other systems are due for or are offline for maintenance.

A cyber attacker can attack the system 2300 at various points of attack depending on skills and goals of the cyber attacker and/or vulnerabilities of the system 2300. The various points of attack of the system 2300 can be referred to as an attack surface of the system 2300. The attack surface can include network, software, hardware, and/or human vulnerabilities. For example, the attack surface can include various services available within the control center 2370 (such as those executing on the additional computer systems 2378), ports accessible over the firewalls 2372 and 2350, data being communicated between the remote substations 2320 and the control center 2370, the network devices 2362, timing signals (such as the GPS signal 2315), computer code communicating with the accessible ports, computer code that processes electronic mail and other files, user and administrative accounts for users of the control center, employees with access to the control center, and so forth.

As a specific example, one potential target for a cyber-attack of the system 2300 is the synchronized timing information that is embedded with the synchrophasor data. A cyber-attacker could potentially exploit vulnerabilities within the system 2300 to delete and/or modify the timing information so that the synchrophasor data reports no or corrupt information. The missing and/or corrupt synchrophasor data could potentially cause monitoring and/or control logic to report erroneous problems with components of the remote sub-station 2320 and/or to adjust control parameters of the components so that the components are damaged and/or taken out of service. A cyber-attack can attempt to modify the timing information at different points within the system 2300. For example, an attacker can try to jam, spoof, or meacon the GPS signal 2315. Meaconing includes intercepting and rebroadcasting a navigation signal (such as the GPS signal 2315).

When the GPS signal is rebroadcast, an attacker can modify the signal with incorrect timing information and rebroadcast the modified signal at the received frequency. By rebroadcasting the modified signal at a higher power than the original signal, the GPS receivers (e.g., the GPS receiver on sensor 2340) of the components may use the information encoded within the modified signal instead of the information encoded within the original signal. Thus, incorrect timing information may be propagated along with the synchrophasor data. Alternatively or additionally, an attacker can attempt to strip out or modify the timing information as it passes through the network 2360 or the firewalls 2350 and 2372. It should be appreciated by one of ordinary skill in the art having the benefit of the present disclosure, that a timing attack is one form of cyberattack, and other forms of cyberattack are also possible.

The cyber controller 2374 and/or the vulnerability assessment module 2376 can be used to monitor and/or control elements of the attack surface of the system 2300. For example, the attack surface can include the data (e.g., the GPS signal 2315), services, and users of the system 2300. The attack surface can include the hardware and software components of the satellite 2310, the sensors 2340, the control logic 2322, the firewall 2350, the network devices 2362, the firewall 2372, the additional computer systems 2378, and the dedicated communication path 2380. The cyber controller 2374 can monitor the attack surfaces of the system 2300. The cyber controller 2374 can directly control (e.g., reconfigure) elements of the system 2300, such as the firewalls 2350 and 2372, the control logic 2322 and/or the additional computer systems 2378. For example, the cyber controller 2374 can configure these elements by causing configuration data to be loaded onto one or more of the elements to change or reconfigure the respective elements. The vulnerability assessment module 2376 can perform a vulnerability analysis using different rank-weight analysis tools described in more detail below The vulnerability assessment module 2376 can receive attack data from the cyber controller 2374 and, using the received attack data and an attack graph, determine that a potential cyber-attack is underway. The attack data can represent the likelihood or probability that the different components of the system 2300 are vulnerable to or under cyberattack. The attack data can be binary indicating that each of the components is or probably is under attack or that each of the components is not or probably is not under attack. Alternatively, the attack data can be analog indicating a percentage chance that each of the components is vulnerable to or under attack.

The rank-weights and PGA/EPGA approaches can be used to determine vulnerability assessments for different configurations of the network. The vulnerability assessments for the different configurations of the system 2300 can be sent to the cyber controller 2374, so that the cyber controller 2374 can select between the different configurations, and control the system 2300 based on the vulnerability assessments. As a specific example, the system 2300 can be adapted by changing an operating parameter of a component of the system 2300 based on the vulnerability assessments. Changing the operating parameter of the component of the system 2300 can include removing the component from the system 2300. As another example, changing the operating parameter of the component of the system 2300 can include selecting an alternative timing source. In this manner, the cyber controller 2374 can be used to adapt the system 2300 in response to detecting a potential cyber-attack to potentially improve the cybersecurity of the system 2300.

As illustrated, the vulnerability assessment module 2376 can be separate from the cyber controller 2374, but in other examples the vulnerability assessment module 176 can be integrated within the cyber controller 2374. The cyber controller 2374 and the vulnerability assessment module 2376 can be computer hardware, software, or a combination of computer hardware and software. The cyber controller 2374 and the vulnerability assessment module 2376 can include software, a processor, a microcontroller, programmable logic (e.g., a field-programmable gate array), hardwired finite state machines, programmable microcode, or other suitable control circuits.

The implementation of a vulnerability assessment module can include many features from the cybersecurity realm. An example is the use of artificial intelligence to correlate cyber activity patterns with attack graphs and in predicting the potential attack path with a degree of confidence. Security information and event management (SIEM) software can address problems associated with correlation and detection probabilities. Event and fault trees can be customized to account for variability within one or more domains. Other frameworks can aid in identifying failure propagation paths and delineating nominal from abnormal system behavior. An example of such a framework is Function-Failure Identification and Propagation (FFIP). The developed trees herein can be further customized for a variety of enterprise control systems; business specific process equipment data and configuration information can be mapped to the event tree. Fault and event tree structures can persist in an ASCII-text file format. Data associated with events (e.g., likelihood and vulnerabilities) can be stored in a database. The file format for structures and data together can be collectively called Models and Results Database (MAR-D). PRA software, such as CAFTA, can be used for the development of trees. Other tools can also be used.

The vulnerability assessment module can additionally use attack graphs or similar graph structures (e.g., Petri nets, Bayes nets, and Markov models) outside the module that can provide situational awareness information on demand and/or at the trigger of an event. Note that such structures can have different file formats. The execution of a cyber controller in an operational mode can use information on rank weights with a certain degree of confidence. The former may either be a confirmed fact, the result of a machine-learned analysis, or a combination of both. Asset vulnerability information can be obtained through mapping enterprise assets against a publicly available vulnerability database supported by a normalized scoring system or through an incident management system.

In some implementations, vulnerability mitigation can be taken based on an observe, orient, decide, and act loop theory. The cyber controller observes an intrusion, orients itself using disclosed vulnerability assessment methodologies, and acts to implement a security control within the bounds of a unified operating plan if running in autonomous mode or makes a recommendation for a human in the loop to consider.

V. Recitations

Additional examples include:

A cybersecurity vulnerability mitigation system, comprising: a processor; and one or more computer-readable storage media storing computer-readable instructions that, when executed by the processor, cause the system to perform operations comprising: using cybersecurity maturity criteria, determining a current cybersecurity maturity of a target system, wherein the respective cybersecurity maturity criteria comprise a plurality of security controls; ranking the cybersecurity maturity criteria; using a rank-weight approach, determining a relative weight for the respective cybersecurity maturity criteria based on the ranking; applying one or more filters to the ranked cybersecurity maturity criteria and a cybersecurity maturity goal for the system; determining, based on outputs of the applied filters, a plurality of solution candidates for increasing the cybersecurity maturity of the system to the cybersecurity maturity goal, wherein the respective solution candidates specify maturity levels for the respective cybersecurity maturity criteria; calculating a present state value reflecting the current cybersecurity maturity of the system, wherein the present state value is based on current maturity levels for the cybersecurity maturity criteria; for the respective solution candidates: determining an implementation state value representing implementation of the maturity levels specified by the solution candidate, and determining a transition state value representing a transition from the present state value to the implementation state value; based on the transition state values for the solution candidates, selecting a solution candidate for use with the system; and generating a data visualization representing the selected solution candidate, the data visualization illustrating target maturity levels for security controls to reach the cybersecurity maturity goal for the system.

The system, wherein the operations further comprise modifying the target system based on the target maturity levels illustrated by the data visualization.

The system, wherein the operations further comprise determining dependencies among the plurality of security controls, wherein the dependencies are used in determination of the implementation state value and transition state value.

The system, wherein the applied filters consider maturity indicator levels of the security controls of the respective cybersecurity maturity criteria and eliminate potential solutions from being determined to be solution candidates.

The system, wherein a plurality of rank-weight approaches are used to determine the relative weights for the cybersecurity maturity criteria, the plurality of rank-weight approaches including at least two of: rank sum analysis, reciprocal rank analysis, rank exponent analysis, and rank order centroid analysis.

VI. General Considerations, Example Computing Systems and Implementation Environments This disclosure is set forth in the context of representative embodiments that are not intended to be limiting in any way.

As used in this application, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "adjust," "deploy," and "perform" to describe the disclosed methods. These terms are high-level descriptions of the actual operations that are performed. The actual operations that correspond to these terms will vary depending on the particular implementation and are readily discernible by one of ordinary skill in the art.

Figure 24:
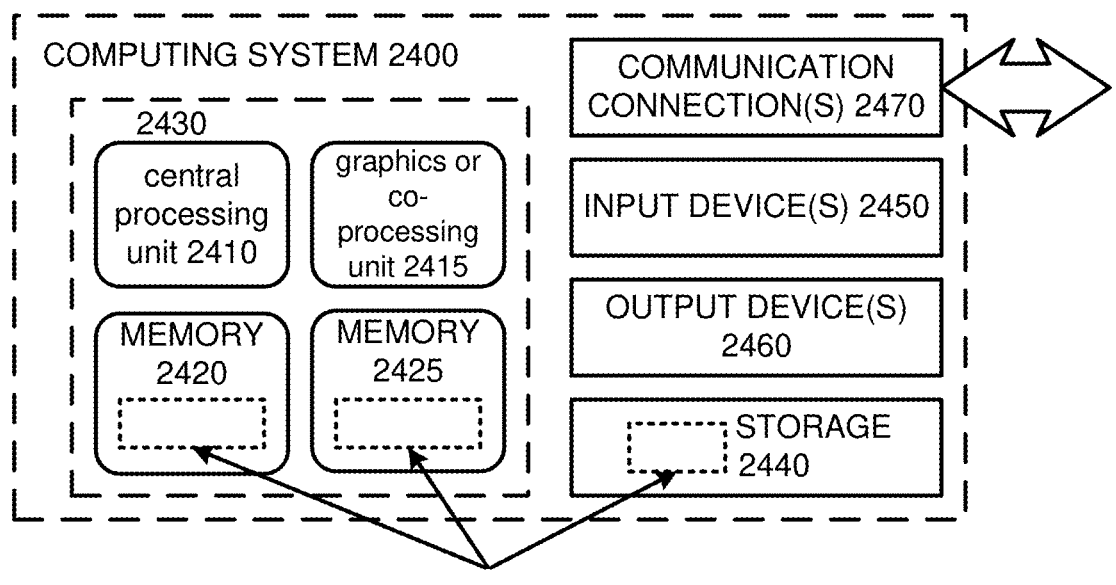
FIG. 24 is an example generalized computing environment in which some of the described examples can be implemented.

FIG. 24 depicts a generalized example of a suitable computing system 2400 in which some of the described innovations may be implemented. The computing system 2400 is not intended to suggest any limitation as to scope of use or functionality, as the innovations may be implemented in diverse general-purpose or special-purpose computing systems.

With reference to FIG. 24, the computing system 2400 includes one or more processing units 2410, 2415 and memory 2420, 2425. In FIG. 24, this basic configuration 2430 is included within a dashed line. The processing units 2410, 2415 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 24 shows a central processing unit 2410 as well as a graphics processing unit or co-processing unit 2415. The tangible memory 2420, 2425 may be volatile memory (e.g., registers, cache, RAM), non-volatile memory (e.g., ROM, EEPROM, flash memory, etc.), or some combination of the two, accessible by the processing unit(s). The memory 2420, 2425 stores software 2480 implementing one or more innovations described herein, in the form of computer-executable instructions suitable for execution by the processing unit(s). For example, memory 2420 and 2425 can store a software application configured to execute the processes of FIGS. 1-4 and 12 and generate the data visualization of FIGS. 6-11 and 15-22.

A computing system may have additional features. For example, the computing system 2400 includes storage 2440, one or more input devices 2450, one or more output devices 2460, and one or more communication connections 2470. An interconnection mechanism (not shown) such as a bus, controller, or network interconnects the components of the computing system 2400. Typically, operating system software (not shown) provides an operating environment for other software executing in the computing system 2400, and coordinates activities of the components of the computing system 2400.

The tangible storage 2440 may be removable or non-removable, and includes magnetic disks, magnetic tapes or cassettes, CD-ROMs, DVDs, or any other medium which can be used to store information and which can be accessed within the computing system 2400. The storage 2440 stores instructions for the software 2480 implementing one or more innovations described herein. For example, storage 2440 can store a software application configured to execute the processes of FIGS. 1-4 and 12 and generate the data visualization of FIGS. 6-11 and 15-22.

The input device(s) 2450 may be a touch input device such as a keyboard, mouse, pen, or trackball, a voice input device, a scanning device, or another device that provides input to the computing system 2400. For video encoding, the input device(s) 2450 may be a camera, video card, TV tuner card, or similar device that accepts video input in analog or digital form, or a CD-ROM or CD-RW that reads video samples into the computing system 2400. The output device(s) 2460 may be a display, printer, speaker, CD-writer, or another device that provides output from the computing system 2400.

The communication connection(s) 2470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including microcontrollers or servers that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved. Furthermore, any features or aspects of the disclosed embodiments can be used in various combinations and subcombinations with one another.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or coupled to components of energy delivery systems, including, for example, electrical generators, inverted-connected power sources, energy storage devices, transforms, AC/DC and DC/AC converters, and power transmission systems.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the claimed subject matter is defined by the following claims. We therefore claim as our invention all that comes within the scope of these claims.

We claim:

1. A method of mitigating cybersecurity vulnerability of a system, comprising:
   generating one or more solution candidates for improving the cybersecurity of a system based on a prioritization of cybersecurity maturity criteria and a current cybersecurity maturity of the system, wherein the prioritization is based on rankings and relative weights for security controls of the cybersecurity maturity criteria, and wherein the relative weights for the respective cybersecurity maturity criteria are determined using a rank-weight approach;
   for the respective solution candidates, quantifying a transition difficulty to change from the current cybersecurity maturity of the system to a cybersecurity maturity specified by the solution candidate, wherein quantifying the transition difficulty comprises
      calculating a present state value reflecting the current cybersecurity maturity of the system,
      determining an implementation state value representing implementation of the maturity levels specified by the solution candidate, and
      determining a transition state value representing a transition from the present state value to the implementation state value; and
   based on the transition difficulties and solution candidates, sending a signal to cause a modification of the system to improve the cybersecurity maturity of the system.

2. The method of claim 1, wherein the prioritization is based on dependencies among security controls of the cybersecurity maturity criteria.

3. A computer-readable storage device storing computer-executable instructions that, when executed by a computer, cause the computer to perform the method of claim 1.

4. The method of claim 1, wherein the system is an energy distribution system, and wherein the signal is sent to a controller associated with the energy distribution system.

5. A method of mitigating cybersecurity vulnerability of a system, comprising:
   determining a current cybersecurity maturity of the system based on cybersecurity maturity criteria;
   ranking the cybersecurity maturity criteria based on importance of the criteria, wherein the ranking comprises determining relative weights for the cybersecurity maturity criteria using a rank-weight analysis, and wherein the rank-weight analysis comprises at least one of a rank sum analysis, a reciprocal rank analysis, a rank exponent analysis, or a rank order centroid analysis;
   determining, based on the ranked cybersecurity maturity criteria, a plurality of solution candidates for increasing the cybersecurity maturity of the system to a cybersecurity maturity goal, wherein the respective solution candidates specify maturity levels for the respective cybersecurity maturity criteria;
   calculating a present state value reflecting the current cybersecurity maturity of the system, wherein the present state value is based on current maturity levels for the cybersecurity maturity criteria;
   for the respective solution candidates:
      determining an implementation state value representing implementation of the maturity levels specified by the solution candidate; and determining a transition state value representing a transition from the present state value to the implementation state value;

based on the transition state values, selecting a solution candidate for use with the system; and generating a cybersecurity vulnerability mitigation recommendation for modifying the system based on the solution candidate.

6. The method of claim 5, further comprising applying one or more filters to the ranked cybersecurity maturity criteria and the cybersecurity maturity goal for the system, and wherein the plurality of solution candidates are determined based on outputs of the applied filters.

7. The method of claim 6, wherein the applied filters consider at least one of: maturity indicator levels of security controls of the respective cybersecurity maturity criteria, time constraints, or resource constraints.

8. The method of claim 5, further comprising generating a data visualization representing the cybersecurity vulnerability mitigation recommendation.

9. The method of claim 8, wherein the respective cybersecurity maturity criteria comprise one or more security controls, and wherein the data visualization illustrates target maturity levels for the security controls to reach the cybersecurity maturity goal for the system.

10. The method of claim 5, wherein the respective cybersecurity maturity criteria comprise one or more controls, the method further comprising determining dependencies among controls, wherein the dependencies are used in determination of the implementation state values and transition state values.

11. The method of claim 5, wherein the current cybersecurity maturity of the system is determined at least in part based on data obtained by one or more sensors associated with the system.

12. The method of claim 5, wherein the respective cybersecurity maturity criteria comprise one or more security controls, wherein the security controls have an integer maturity level range between one and four, and wherein the system is modified to reflect the selected solution candidate based on security controls of the selected solution candidate that have transitioned to a value of four.

13. The method of claim 5, further comprising modifying the system based on the cybersecurity vulnerability mitigation recommendation.

14. The method of claim 13, wherein modifying the system comprises at least one of: requiring a password, restricting user access, implementing a firewall, implementing or modifying encryption techniques, or modifying user accounts.

15. A cybersecurity vulnerability mitigation system, comprising:
a processor; and
one or more computer-readable storage media storing computer-readable instructions that, when executed by the processor, cause the system to perform operations comprising:
performing a cybersecurity maturity assessment for the system, the assessment identifying current maturity levels for security controls of cybersecurity maturity criteria;
identifying a cybersecurity maturity goal for the system;
prioritizing the cybersecurity maturity criteria, wherein prioritizing comprises ranking the cybersecurity maturity criteria and determining relative weights for the respective criteria using a rank-weight approach;
based on one or more maturity level constraints and the relative weights, identifying solution candidates for achieving the cybersecurity maturity goal for the system, wherein the respective solution candidates specify maturity levels for the security controls of the cybersecurity maturity criteria;
for the respective solution candidates, quantifying a transition difficulty of modifying the maturity levels of the security controls to the maturity levels specified in the solution candidate, wherein quantifying the transition difficulty comprises:
calculating a present state value reflecting a current cybersecurity maturity of the system,
determining an implementation state value representing implementation of the maturity levels specified by the solution candidate, and
determining a transition state value representing a transition from the present state value to the implementation state value;
based on the transition difficulties, selecting one or more of the solution candidates for use in increasing the cybersecurity maturity of the system; and
generating a data visualization representing the one or more selected solution candidates.

16. The system of claim 15, wherein the mitigating further comprises determining dependencies among the security controls, wherein the dependencies are used in determination of the quantification of the implementation difficulties.

* * * * *

UNITED STATES PATENT AND TRADEMARK OFFICE
CERTIFICATE OF CORRECTION

PATENT NO. : 11,409,887 B2
APPLICATION NO. : 16/869378
DATED : August 9, 2022
INVENTOR(S) : Gourisetti et al.

It is certified that error appears in the above-identified patent and that said Letters Patent is hereby corrected as shown below:

In the Specification

Column 5,
Line 28, "discussed in below" should be --discussed below--

Column 9,
Line 5, "using one a rank weight" should be --using a rank weight--

Column 11,
Line 54, "above constrain" should be --above constraint--

Column 30,
Line 3, "an element in that shows" should be --an element that shows--

Column 37,
Line 32, "significantly efficient" should be --significantly more efficient--

Column 47,
Line 18, "nominal from abnormal" should be --normal from abnormal--

Signed and Sealed this
Fourteenth Day of March, 2023

Katherine Kelly Vidal
*Director of the United States Patent and Trademark Office*